(12) United States Patent  (10) Patent No.: US 7,839,007 B2
Filardo  (45) Date of Patent: Nov. 23, 2010

(54) PLIANT MECHANISMS FOR EXTRACTING POWER FROM MOVING FLUID

(75) Inventor: Benjamin Pietro Filardo, New York, NY (US)

(73) Assignee: Pliant Energy Systems LLC, New York, NY (US)

( * ) Notice: Subject to any disclaimer, the term of this patent is extended or adjusted under 35 U.S.C. 154(b) by 0 days.

(21) Appl. No.: 12/569,762

(22) Filed: Sep. 29, 2009

(65) Prior Publication Data
US 2010/0084871 A1 Apr. 8, 2010

Related U.S. Application Data

(63) Continuation of application No. 12/242,144, filed on Sep. 30, 2008, now Pat. No. 7,696,634, which is a continuation of application No. 12/150,910, filed on May 1, 2008, now abandoned.

(60) Provisional application No. 60/926,984, filed on May 1, 2007.

(51) Int. Cl.
F03B 13/12 (2006.01)
H01L 41/08 (2006.01)
(52) U.S. Cl. ............................. 290/43; 290/54; 310/330
(58) Field of Classification Search ................... 290/43, 290/44, 53, 54, 55; 310/330, 367
See application file for complete search history.

(56) References Cited

U.S. PATENT DOCUMENTS

| 2,436,517 A | 2/1948 | Lewis |
| 3,190,618 A | 6/1965 | Raphael |

(Continued)

FOREIGN PATENT DOCUMENTS

AU  2006203202  2/2007

(Continued)

OTHER PUBLICATIONS

"Anaconda wave-power generator snakes into next stage of production," by Alok Jham, http://www.guardian.co.uk/environment/2009/may/06/anaconda-wave-power, May 6, 2009 (printed Jun. 4, 2009) (also see video embedded in the article).

(Continued)

*Primary Examiner*—Nicholas Ponomarenko
(74) *Attorney, Agent, or Firm*—Chadbourne & Parke LLP; Walter G. Hanchuk

(57) ABSTRACT

Flexible and elastic mechanisms for extracting power from a moving fluid. Sheet-like material is deformed during fabrication through an applied force so as to create undulations in said material, whose stresses are maintained through restraining components, thereby maintaining the occurrence of said deformations in the material. When placed in moving fluid, the resulting pressure differentials cause the positions of the undulations within the material to travel along said material in the same direction as the moving fluid. Power is extracted in one of two principle ways. The first is via a mechanical coupling of the sheet-like material to a rotating mechanism, which turns an electro-magnetic dynamo or other output device. The second is via the utilization of a flexible material which exhibits an electrical response to mechanical strain, whereby the strains caused by the travel of undulations along the material create an electrical current which is extracted via two or more electrodes.

24 Claims, 32 Drawing Sheets

U.S. PATENT DOCUMENTS

| | | | |
|---|---|---|---|
| 3,467,013 A | | 9/1969 | Conner |
| 3,816,774 A * | | 6/1974 | Ohnuki et al. .............. 310/332 |
| 3,961,863 A | | 6/1976 | Hooper, III |
| 4,056,742 A * | | 11/1977 | Tibbetts ...................... 310/357 |
| 4,164,383 A | | 8/1979 | French |
| 4,257,640 A | | 3/1981 | Wiley |
| 4,269,906 A | | 5/1981 | Schmechtig |
| 4,310,264 A | | 1/1982 | Brownlee |
| 4,371,788 A | | 2/1983 | Smith |
| 4,375,151 A | | 3/1983 | French |
| 4,387,318 A * | | 6/1983 | Kolm et al. ................. 310/330 |
| 4,448,020 A | | 5/1984 | Wood et al. |
| 4,469,596 A | | 9/1984 | Kantor |
| 4,488,854 A | | 12/1984 | Miller |
| 4,558,954 A | | 12/1985 | Barr |
| 4,830,315 A | | 5/1989 | Presz et al. |
| 5,152,674 A | | 10/1992 | Marx |
| 5,192,197 A | | 3/1993 | Culp |
| 5,230,656 A | | 7/1993 | Paterson et al. |
| 5,826,535 A | | 10/1998 | Shaw |
| 5,950,726 A | | 9/1999 | Roberts |
| 5,961,289 A | | 10/1999 | Lohmann |
| 5,961,298 A | | 10/1999 | Bar-cohen et al. |
| 5,975,865 A | | 11/1999 | Manabe |
| 6,079,214 A | | 6/2000 | Bishop |
| 6,106,249 A | | 8/2000 | Barak |
| 6,109,888 A | | 8/2000 | Marshall |
| 6,153,944 A | | 11/2000 | Clark |
| 6,250,585 B1 * | | 6/2001 | Pell ............................ 244/22 |
| 6,327,994 B1 | | 12/2001 | Labrador |
| 6,357,997 B1 * | | 3/2002 | Rosefsky ..................... 415/60 |
| 6,361,284 B2 | | 3/2002 | Drevet |
| 6,411,015 B1 * | | 6/2002 | Toda .......................... 310/334 |
| 6,424,079 B1 * | | 7/2002 | Carroll ....................... 310/339 |
| 6,435,849 B1 | | 8/2002 | Guilmette |
| 6,579,068 B2 | | 6/2003 | Bridger et al. |
| 6,628,040 B2 | | 9/2003 | Pelrine et al. |
| 6,911,764 B2 | | 6/2005 | Pelrine et al. |
| 6,948,910 B2 | | 9/2005 | Polacsek |
| 6,952,058 B2 | | 10/2005 | Mccoin |
| 7,034,432 B1 | | 4/2006 | Pelrine et al. |
| 7,064,472 B2 | | 6/2006 | Pelrine et al. |
| 7,148,579 B2 | | 12/2006 | Pinkerton |
| 7,166,952 B2 * | | 1/2007 | Topliss et al. ............... 310/330 |
| 7,196,450 B2 | | 3/2007 | Pinkerton |
| 7,352,073 B2 | | 4/2008 | Ames |
| 7,362,032 B2 | | 4/2008 | Pelrine et al. |
| 7,470,086 B2 | | 12/2008 | Jennings et al. |
| 7,492,054 B2 | | 2/2009 | Catlin |
| 7,493,759 B2 | | 2/2009 | Bernitsas et al. |
| 7,573,143 B2 * | | 8/2009 | Frayne ....................... 290/1 R |
| 7,696,634 B2 * | | 4/2010 | Filardo ........................ 290/54 |
| 2004/0008853 A1 | | 1/2004 | Pelrine et al. |
| 2006/0192389 A1 | | 8/2006 | Perry et al. |
| 2008/0229745 A1 | | 9/2008 | Ghouse |
| 2009/0134623 A1 | | 5/2009 | Krouse |
| 2010/0026003 A1 * | | 2/2010 | Filardo ........................ 290/54 |
| 2010/0045036 A1 * | | 2/2010 | Filardo ........................ 290/43 |
| 2010/0078941 A1 * | | 4/2010 | Filardo ........................ 290/52 |
| 2010/0084871 A1 * | | 4/2010 | Filardo ........................ 290/54 |

FOREIGN PATENT DOCUMENTS

| | | |
|---|---|---|
| CA | 2 554 316 | 1/2007 |
| DE | 102005046516 A1 | 4/2007 |
| GB | 2081816 A | 2/1982 |
| GB | 2129059 A | 5/1984 |
| RU | 2347944 C2 | 2/2009 |
| WO | WO 2007/029275 | 3/2007 |

OTHER PUBLICATIONS

"Checkmate Seaenergy are proud to present the Anaconda Wave Energy Converter," Introduction page, http://www.checkmateuk.com/seaenergy/introduction.html (printed Jun. 4, 2009).

"Checkmate Seaenergy are proud to present the Anaconda Wave Energy Converter," The Anaconda System page, http://www.checkmateuk.com/seaenergy/system.html (printed Jun. 4, 2009).

"Checkmate Seaenergy are proud to present the Anaconda Wave Energy Converter," Economics page, http://www.checkmateuk.com/seaenergy/economics.html (printed Jun. 4, 2009).

"Checkmate Seaenergy are proud to present the Anaconda Wave Energy Converter," Technology page, http://www.checkmateuk.com/seaenergy/technology.html (printed Jun. 4, 2009).

"Checkmate Seaenergy are proud to present the Anaconda Wave Energy Converter," Wave Energy Potential page, http://www.checkmateuk.com/seaenergy/potential.html (printed Jun. 4, 2009).

"Checkmate Seaenergy are proud to present the Anaconda Wave Energy Converter," The Anaconda Team page, http://www.checkmateuk.com/seaenergy/team.html (printed Jun. 4, 2009).

"Checkmate Seaenergy are proud to present the Anaconda Wave Energy Converter," Downloads and Links page, http://www.checkmateuk.com/seaenergy/links.html (printed Jun. 4, 2009).

"Checkmate Seaenergy are proud to present the Anaconda Wave Energy Converter," Project News page, http://www.checkmateuk.com/seaenergy/news.html (printed Jun. 4, 2009).

"VIVACE (Vortex Induced Vibrations Aquatic Clean Energy)," Technology page, http://www.vortexhydroenergy.com/html/technology.html (printed Jun. 10, 2009).

"Harnessing river whirlpools puts energy on tap," by Jim Giles, http://www.newscientist.com/article/mg19826516.200-harnessing-river-...1, Apr. 11, 2008 (printed Jun. 10, 2009).

PCT International Search Report and Written Opinion dated Aug. 1, 2008 (PCT/US08/05605).

PCT International Search Report and Written Opinion dated Dec. 24, 2009 (PCT/US09/62257).

PCT International Search Report and Written Opinion dated Jan. 27, 2010 (PCT/US09/64241).

* cited by examiner

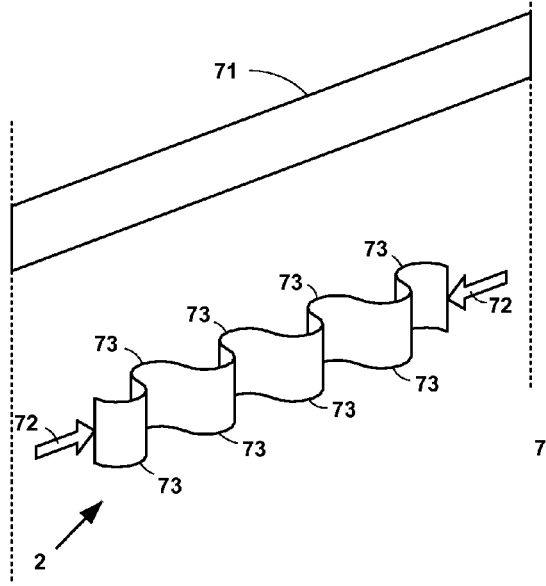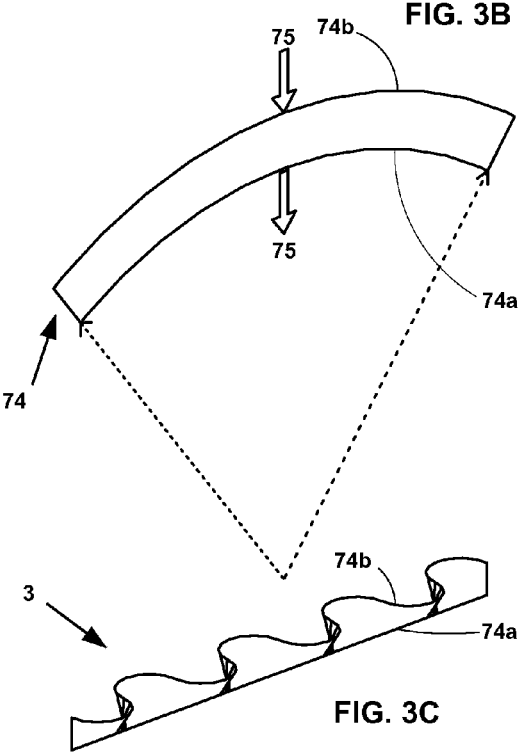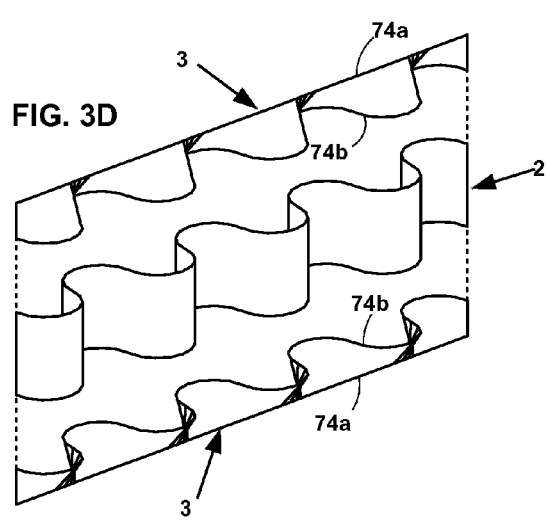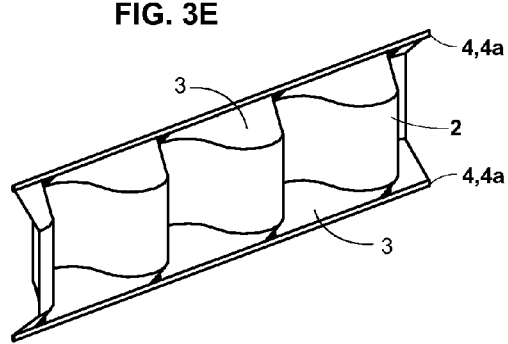

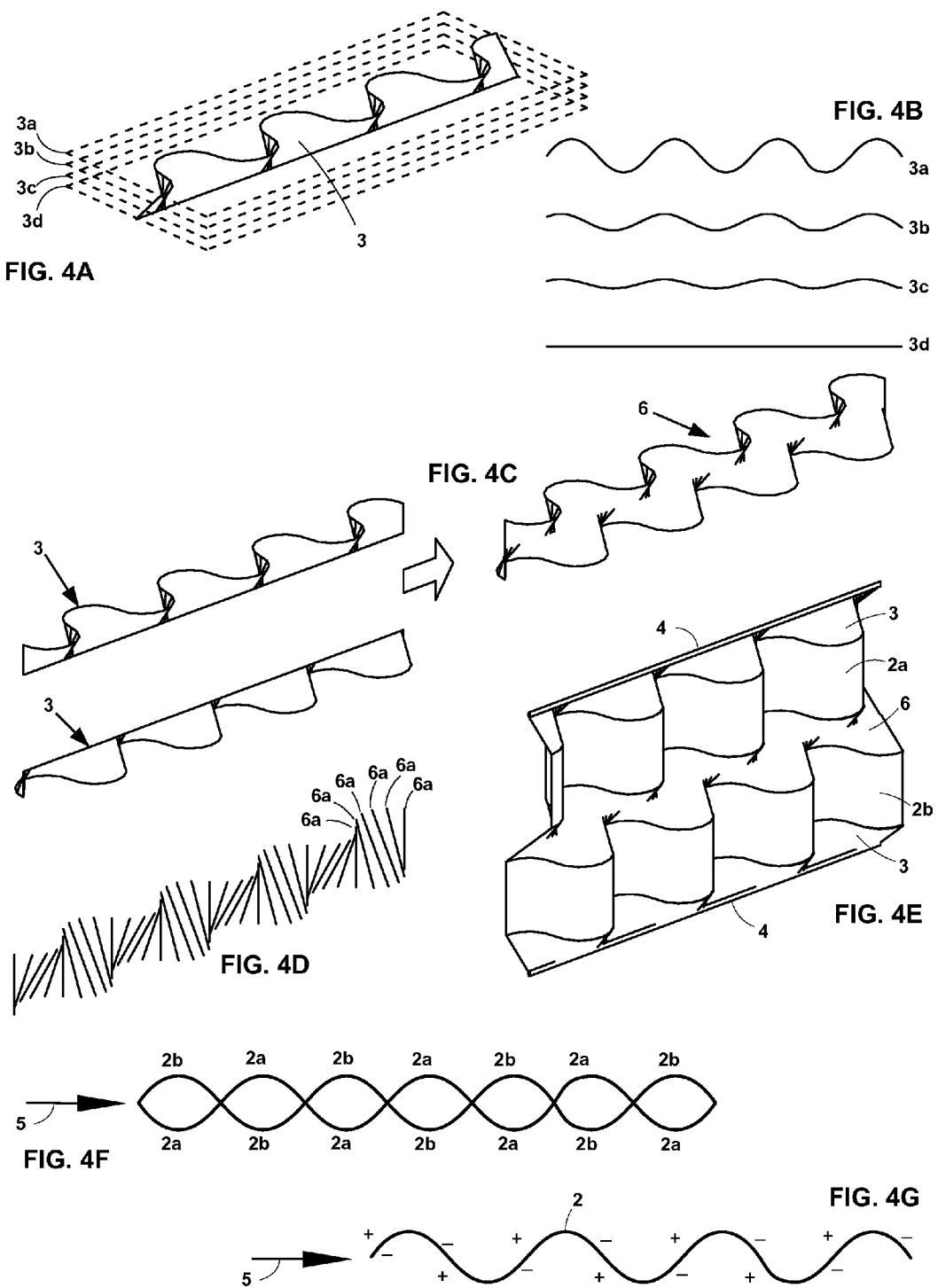

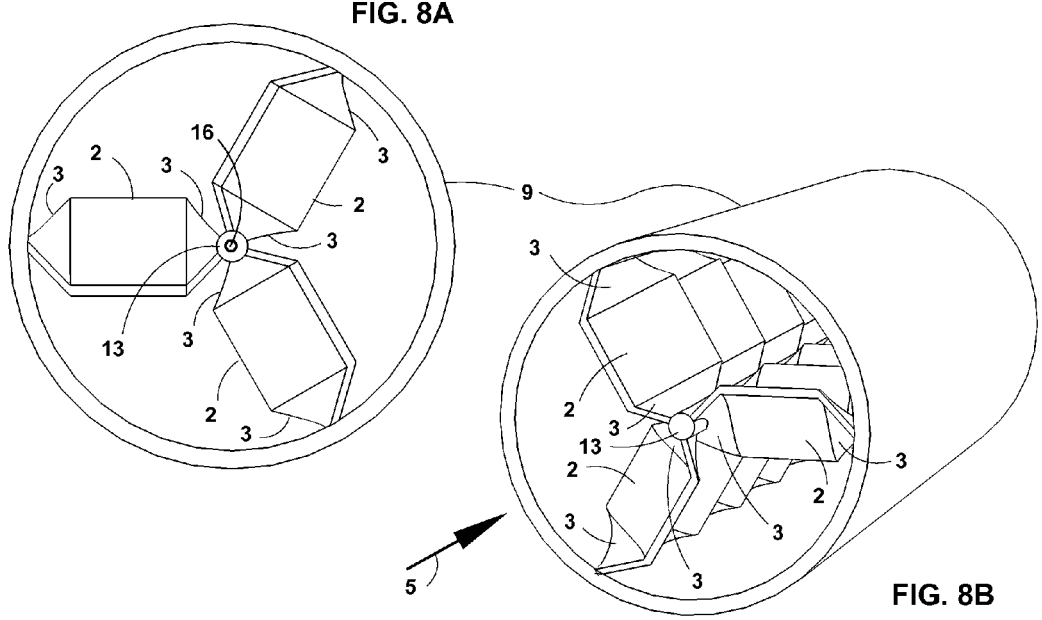
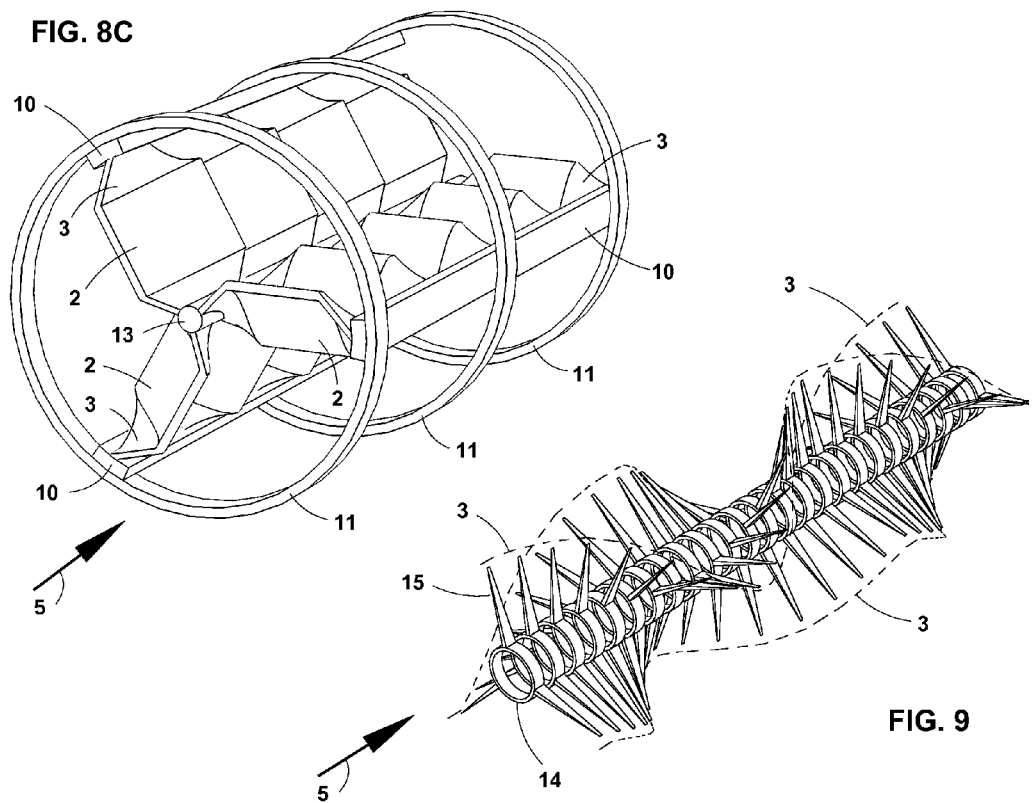

FIG. 11 A - I
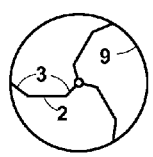
A
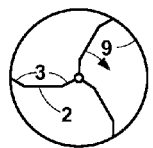
B
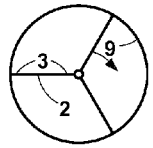
C
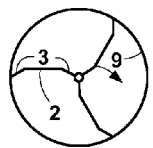
D
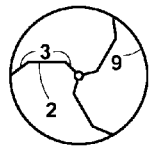
E
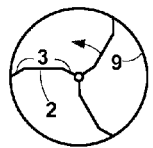
F
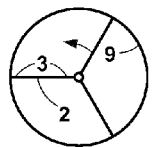
G
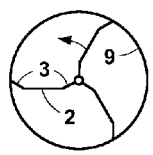
H
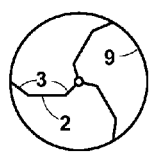
I
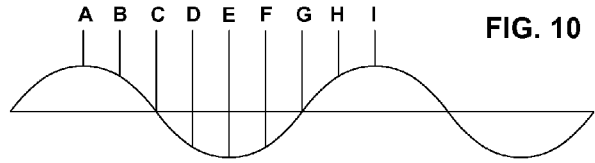
FIG. 10
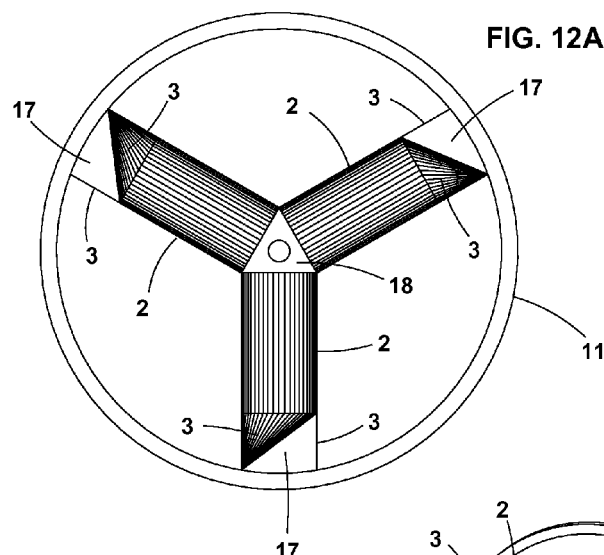
FIG. 12A
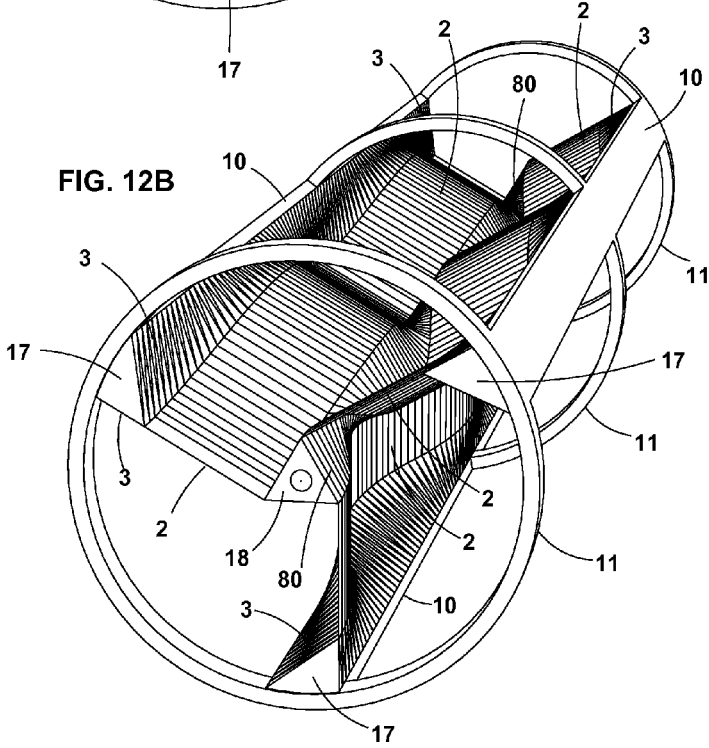
FIG. 12B

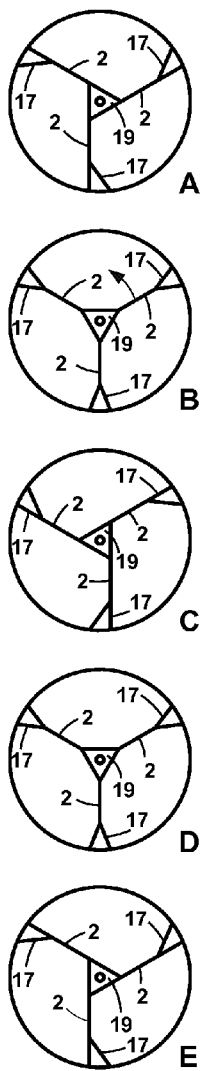
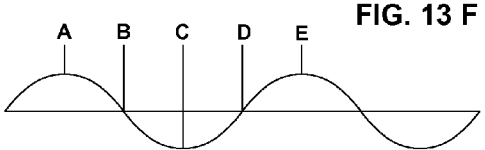
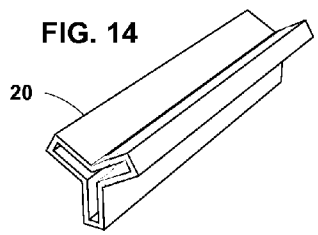
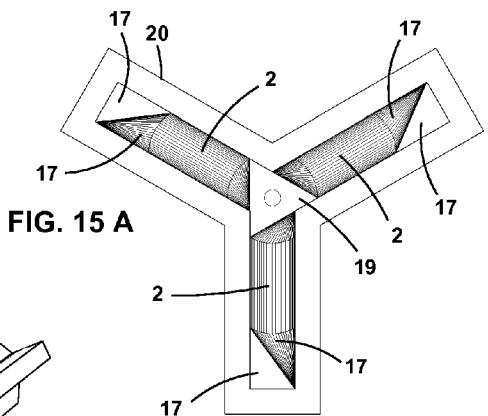
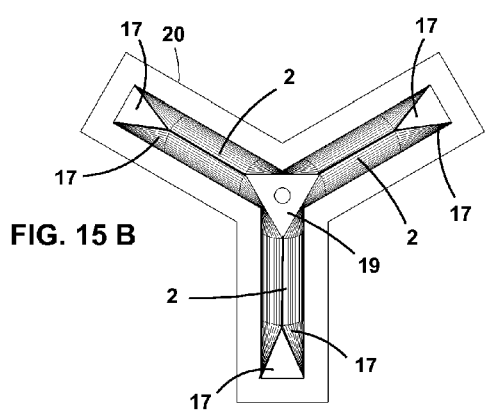
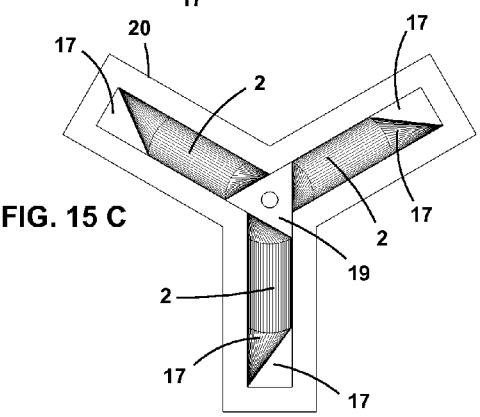
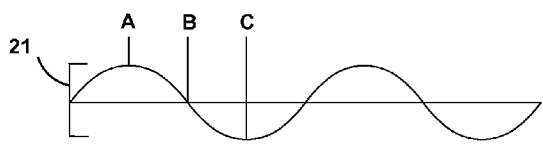

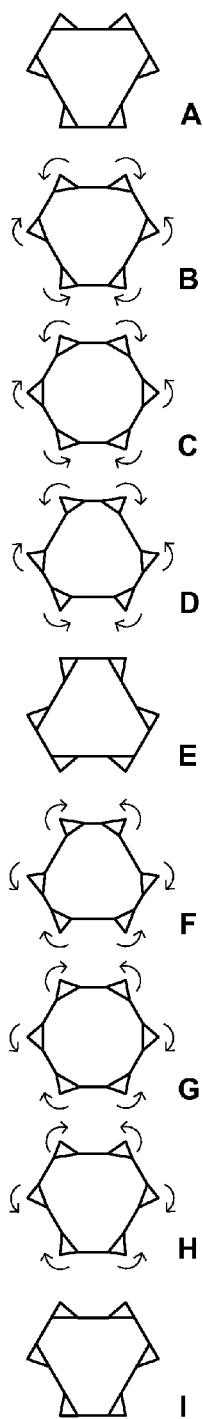
FIG. 20A - I
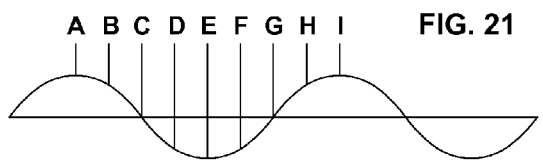
FIG. 21
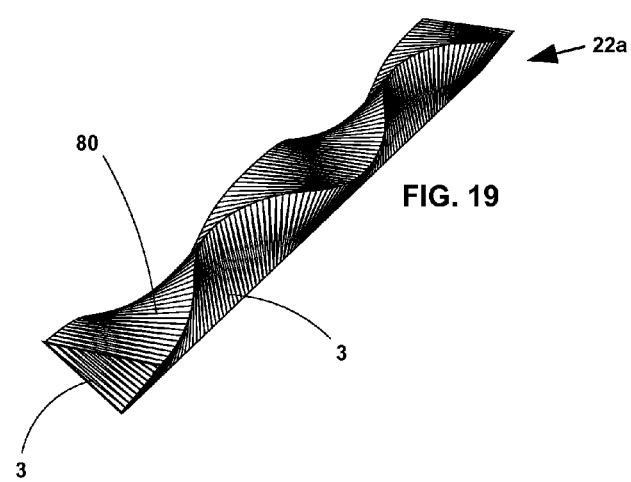
FIG. 19
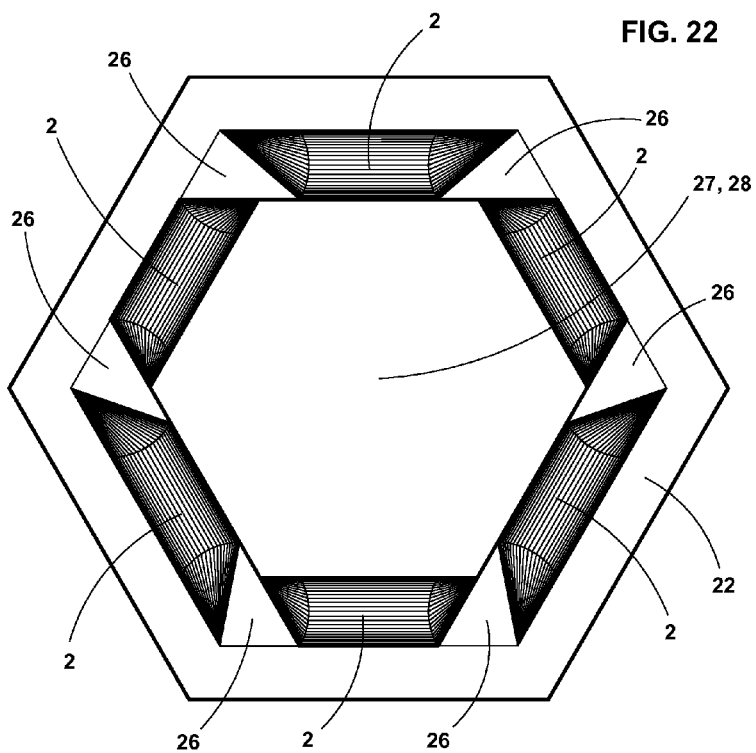
FIG. 22

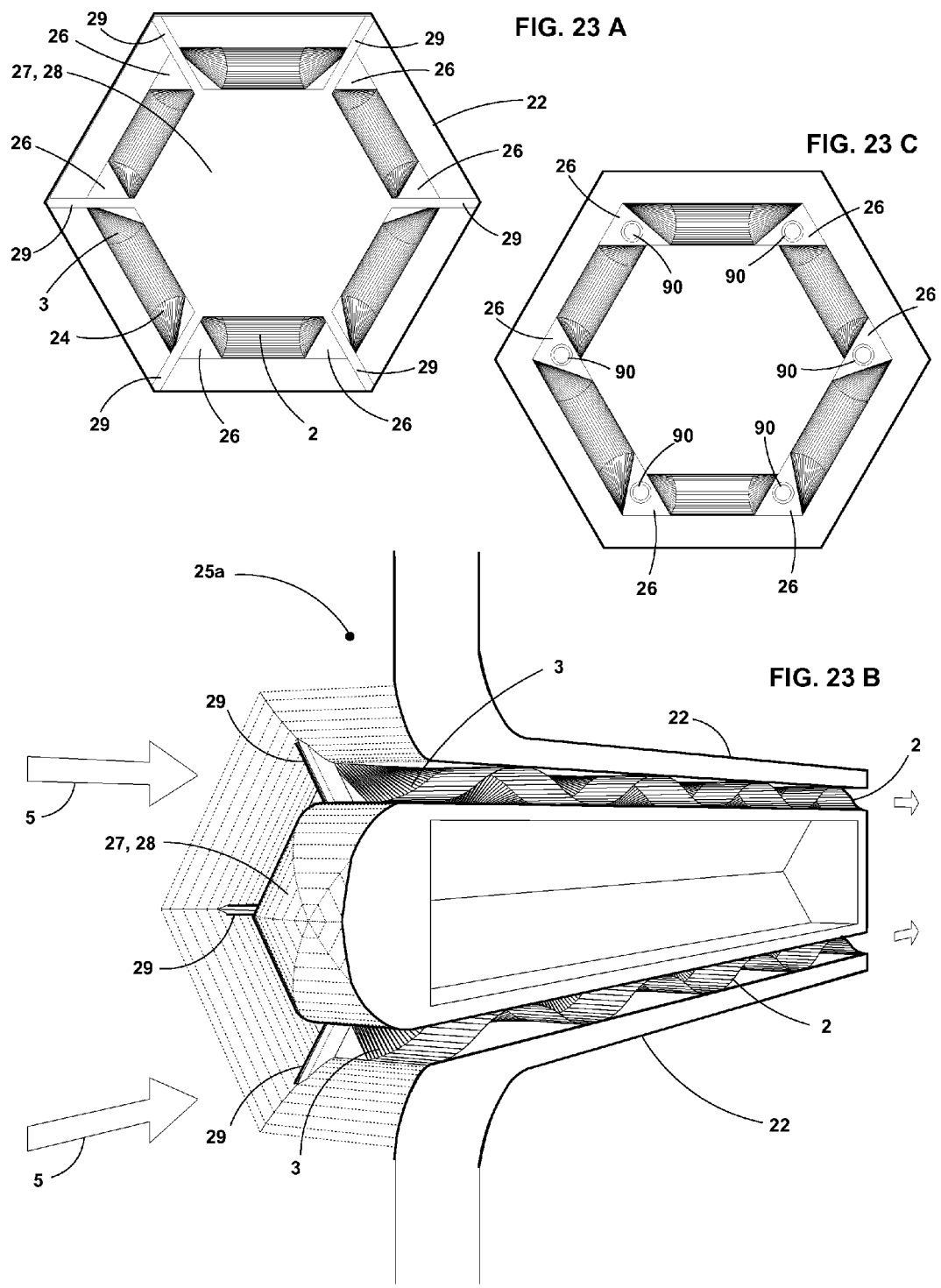

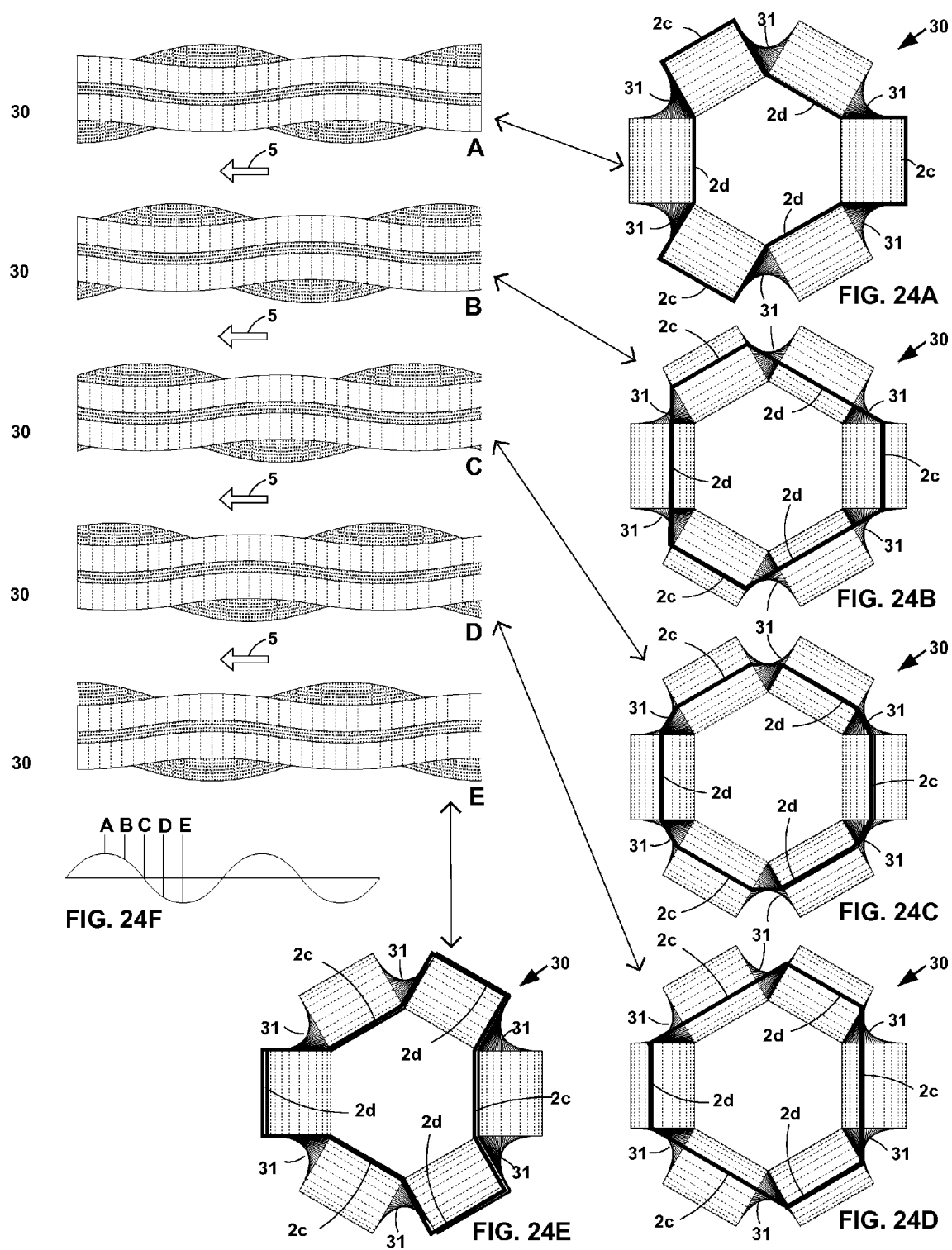

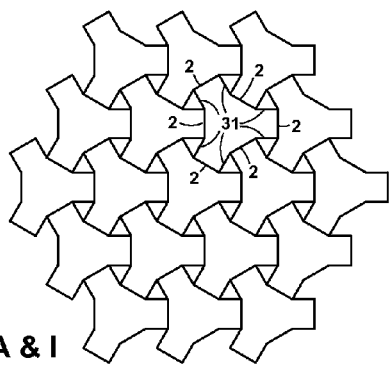
FIG. 26A & I
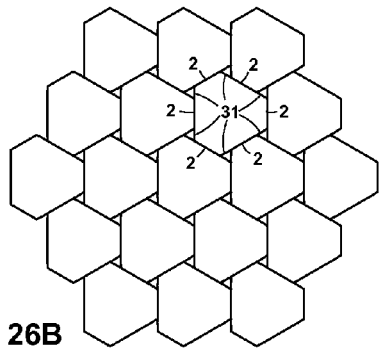
FIG. 26B
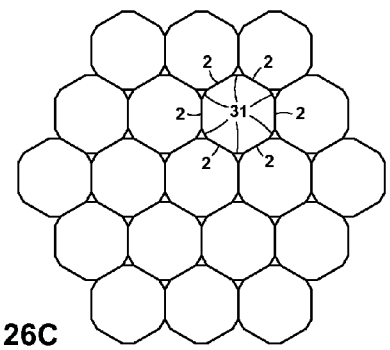
FIG. 26C
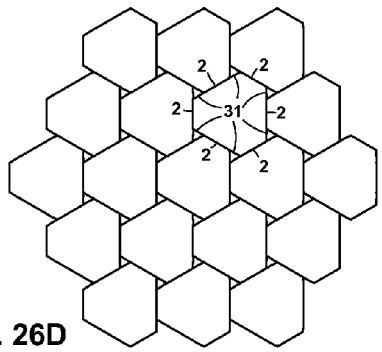
FIG. 26D
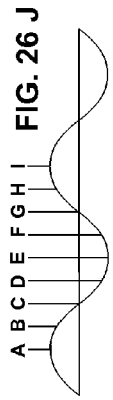
FIG. 26 J
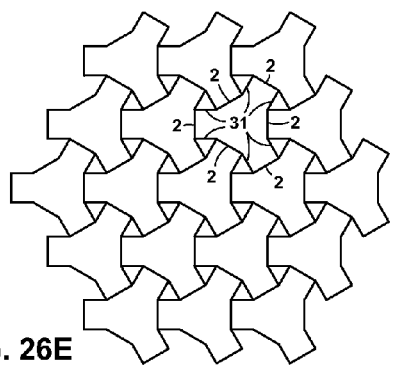
FIG. 26E
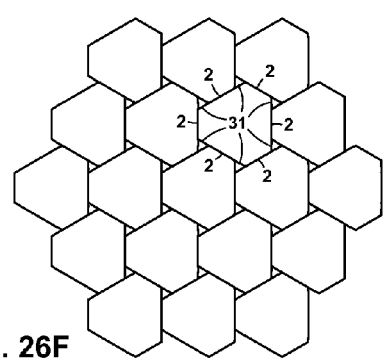
FIG. 26F
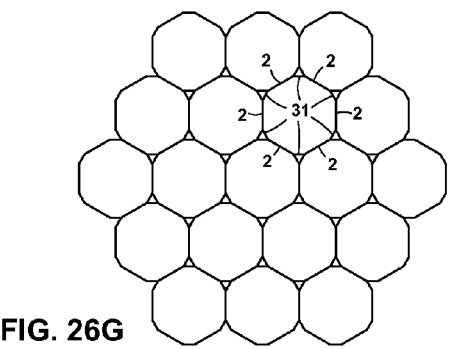
FIG. 26G
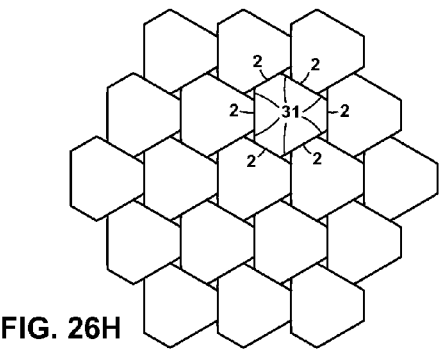
FIG. 26H

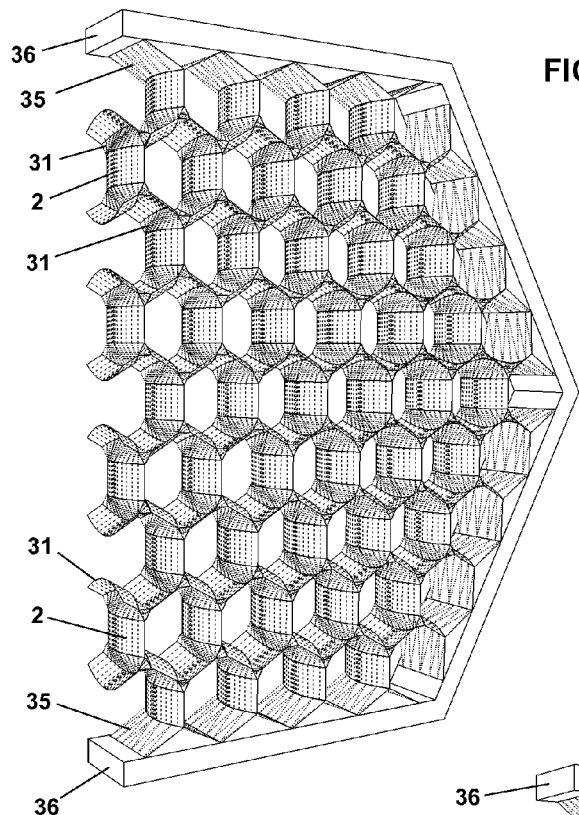
FIG. 30A
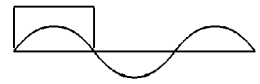
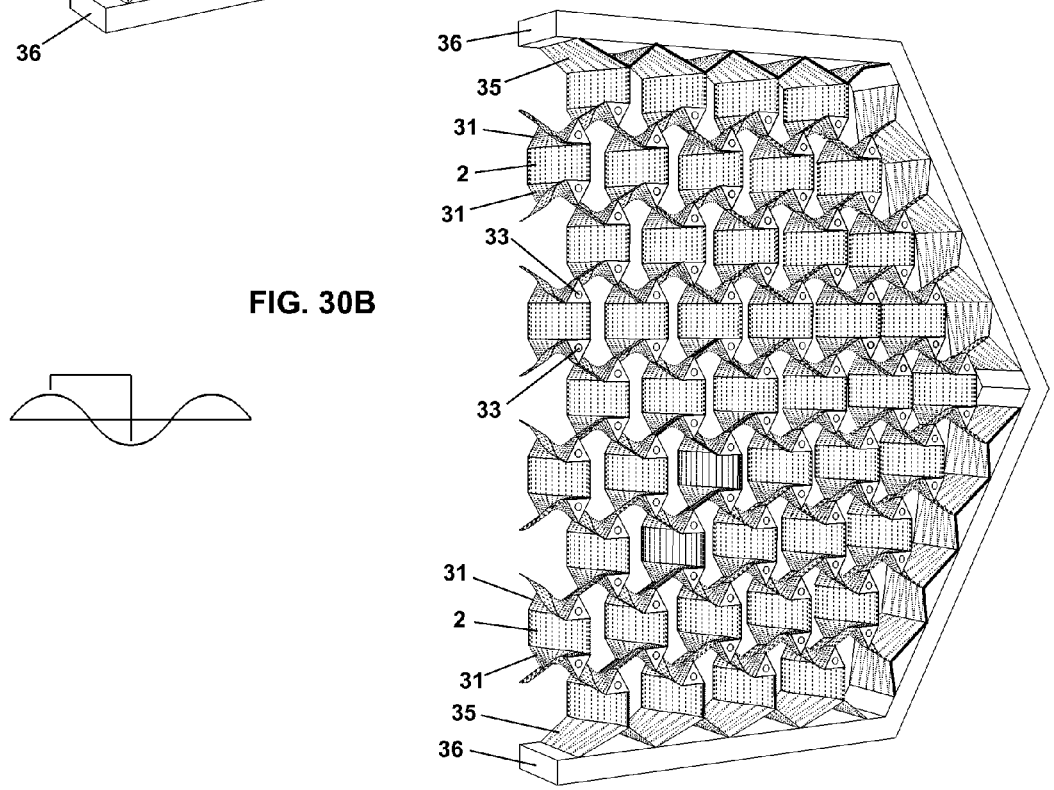
FIG. 30B
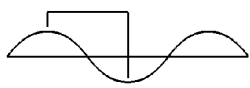

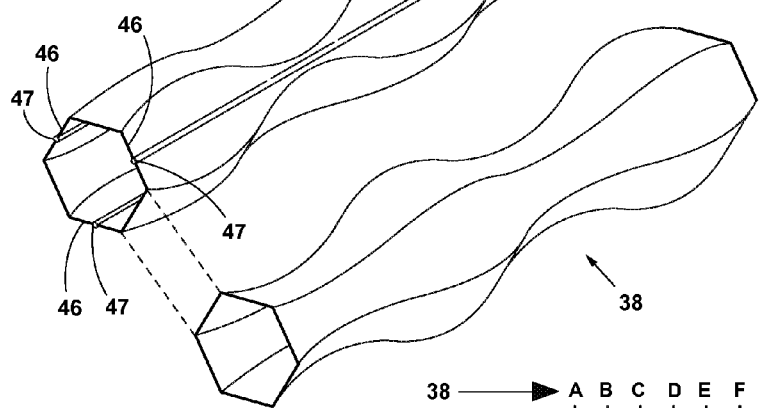
FIG. 32
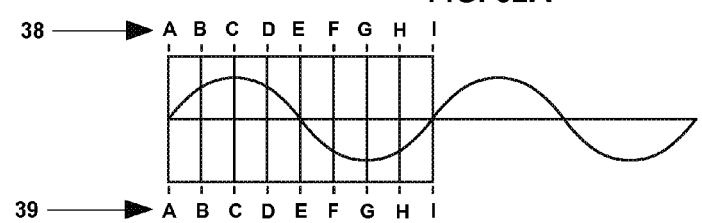
FIG. 32A
FIG. 33 A-I
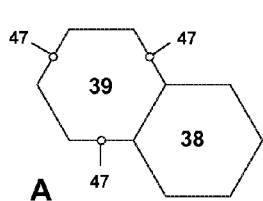
A
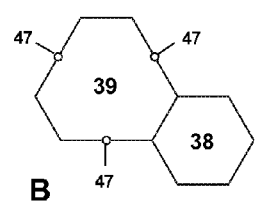
B
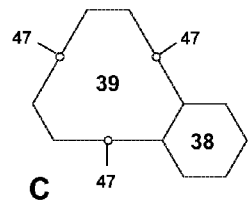
C
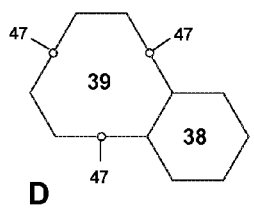
D
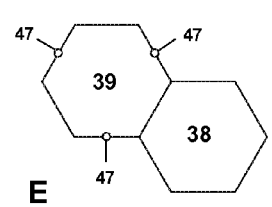
E
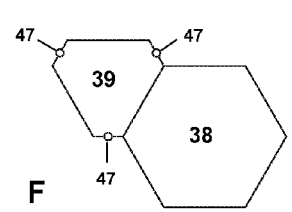
F
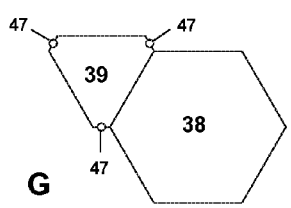
G
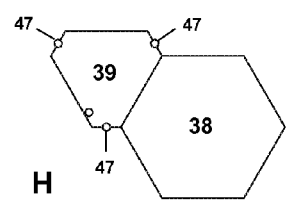
H
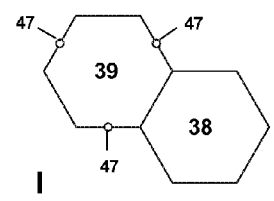
I

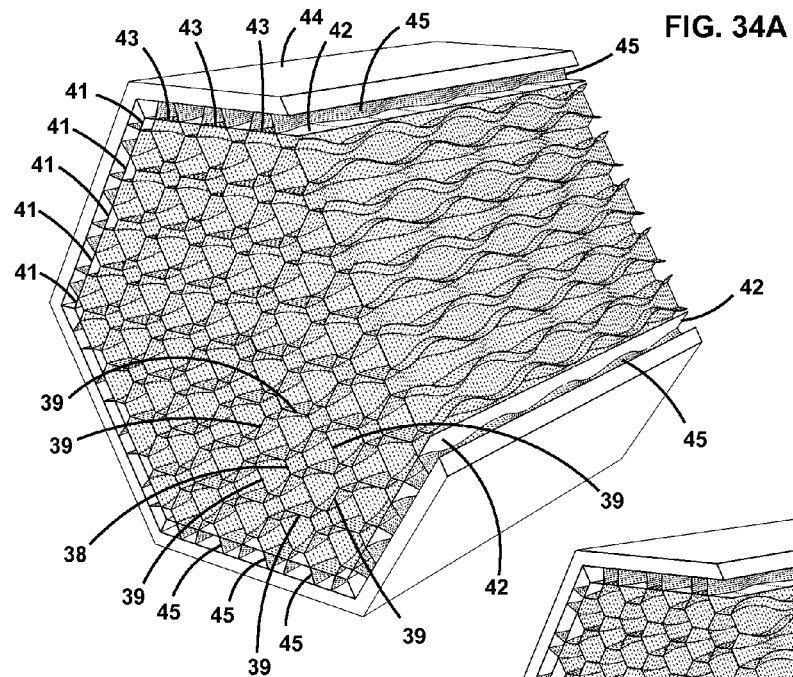
FIG. 34A
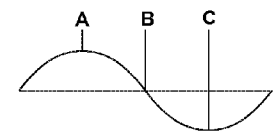
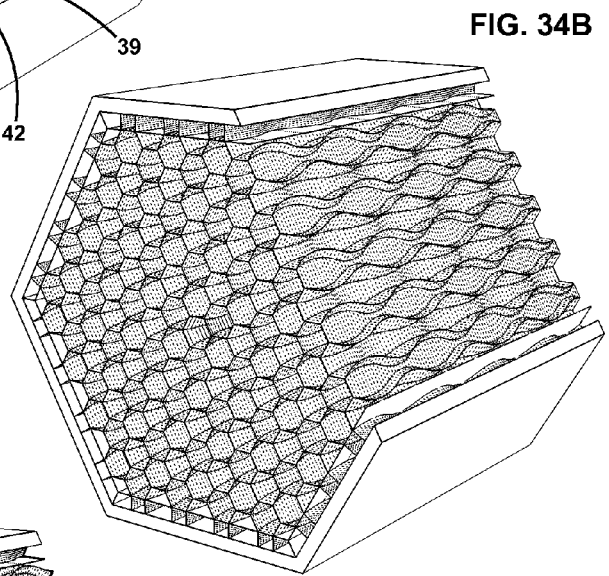
FIG. 34B
FIG. 34C
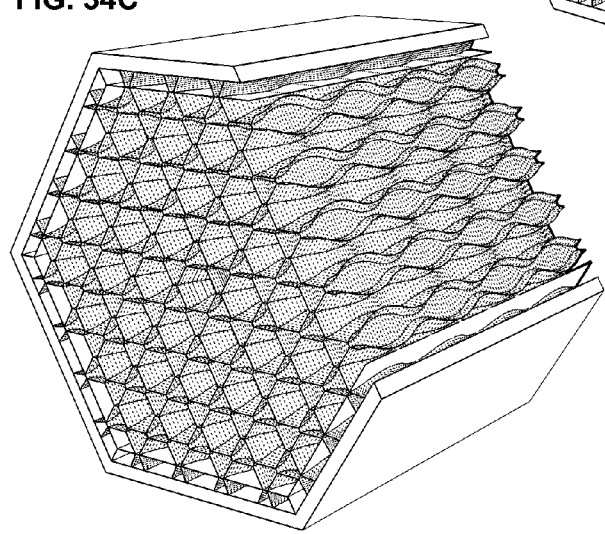

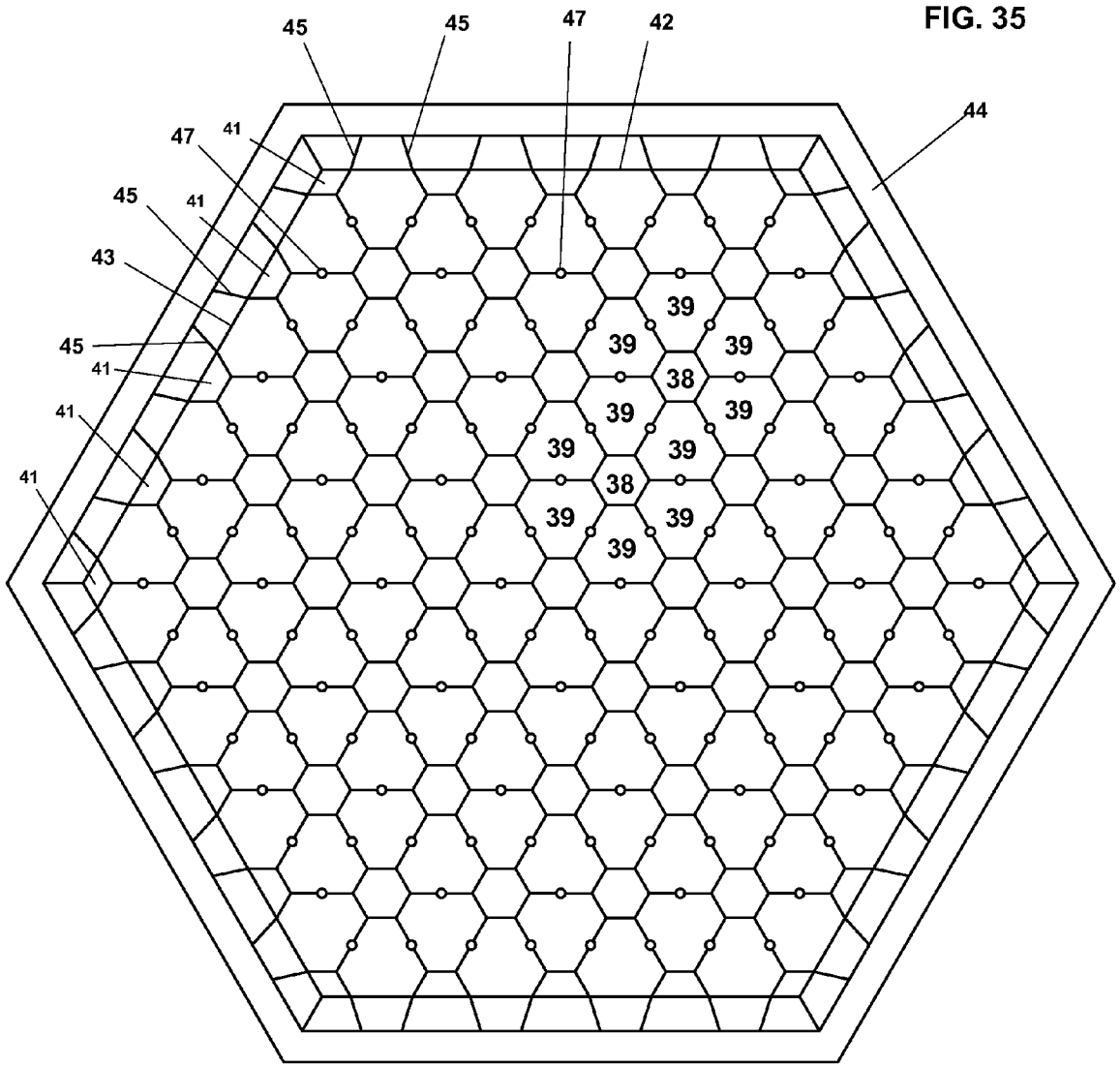

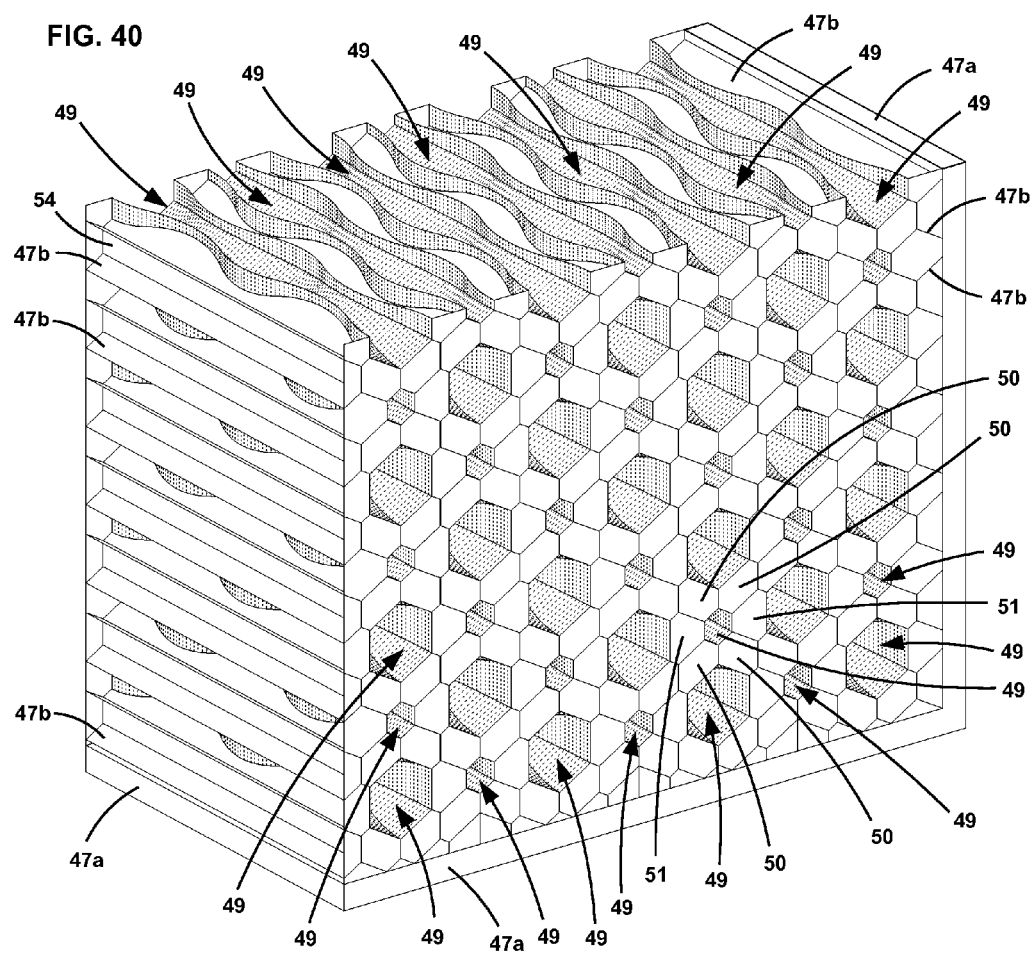
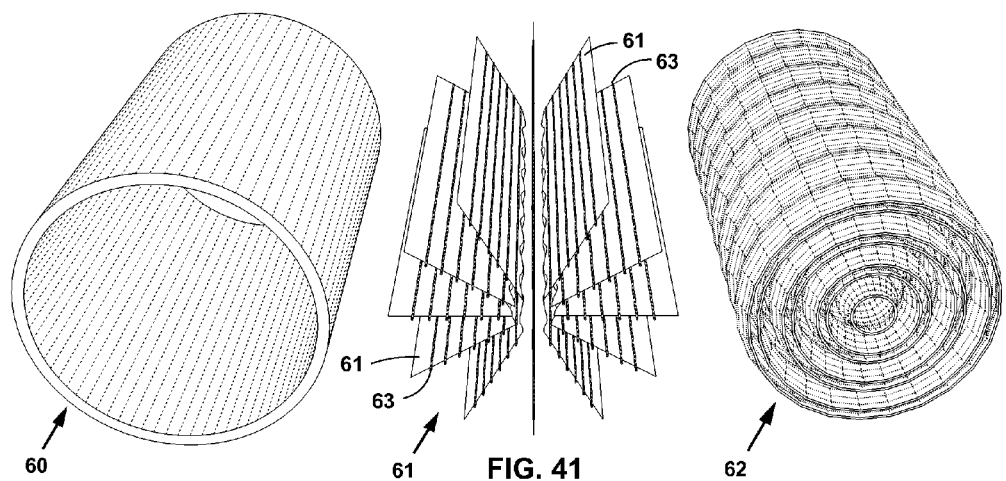

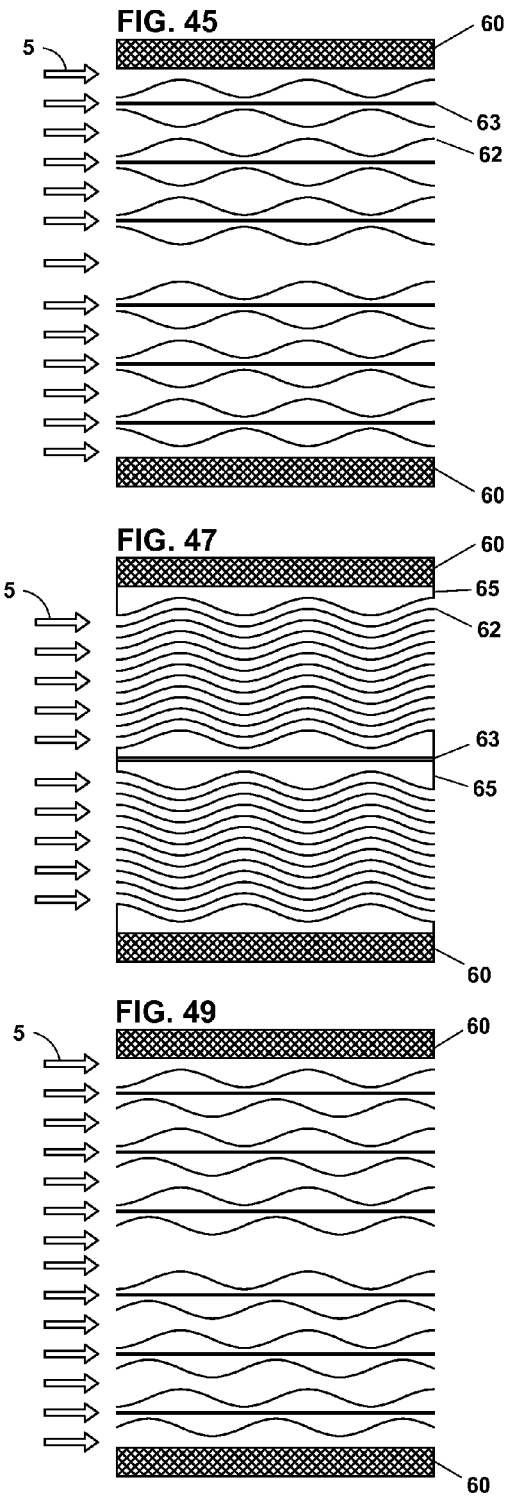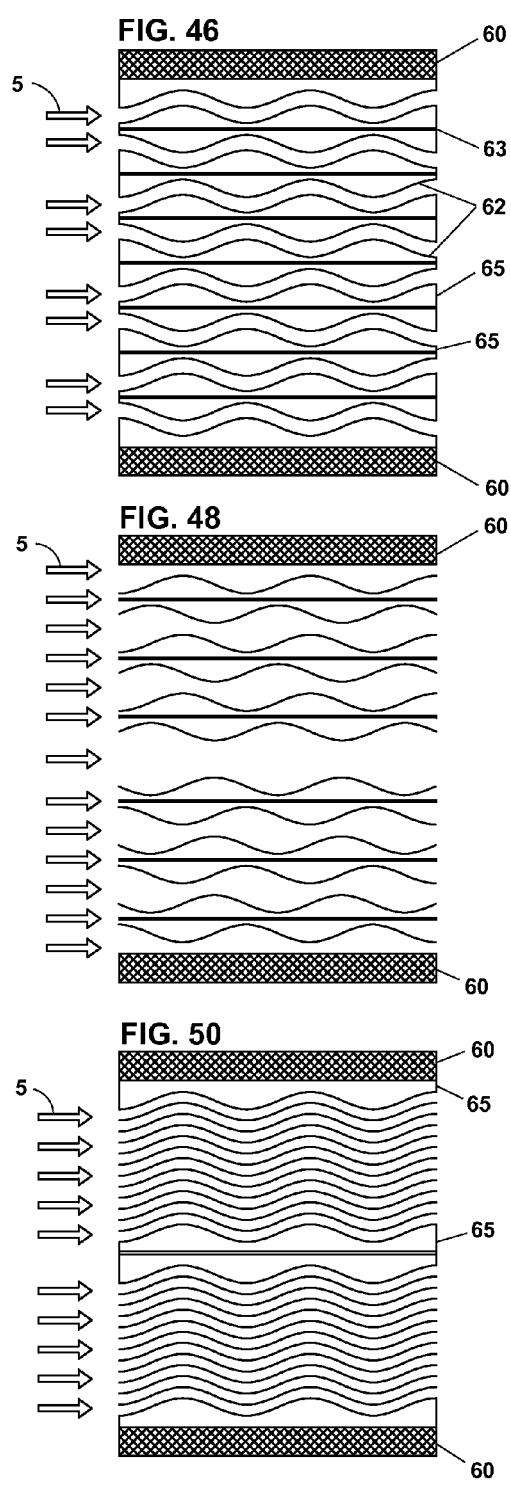

US 7,839,007 B2

PLIANT MECHANISMS FOR EXTRACTING POWER FROM MOVING FLUID

CROSS-REFERENCE TO RELATED APPLICATIONS

This is a Continuation of prior U.S. patent application Ser. No. 12/242,144, filed Sep. 30, 2008, entitled, "PLIANT MECHANISMS FOR EXTRACTING POWER FROM MOVING FLUID," now U.S. Pat. No. 7,696,634, to which priority under 35 U.S.C. §120 is claimed, which in turn is a Continuation of and claims priority to U.S. patent application Ser. No. 12/150,910 filed May 1, 2008, which in turn claims priority to U.S. provisional application 60/926,984, filed May 1, 2007, each of which are hereby incorporated by reference. This application is also related to co-pending U.S. patent application Ser. No. 12/575,434, filed Oct. 7, 2009, entitled, "PLIANT MECHANISMS FOR EXTRACTING POWER FROM MOVING FLUID," and U.S. patent application Ser. No. 12/617,618, filed Nov. 12, 2009, entitled, "PLIANT OR COMPLIANT ELEMENTS FOR HARNESSING THE FORCES OF MOVING FLUID TO TRANSPORT FLUID OR GENERATE ELECTRICITY".

TECHNICAL FIELD

The present application relates generally to extracting power from a moving current of fluid with flexible mechanisms, and more specifically provides a power generator for converting the kinetic energy of fluid motion into useable mechanical energy and/or electrical energy.

BACKGROUND

The kinetic energy of moving water has been utilized by man for thousands of years, and has been harnessed to generate electricity since the 19th century. Today hydroelectric power supplies 20% of global electricity demand and is by far the largest source of renewable energy. Electricity from a typical hydroelectric mechanism is generated by harnessing the forces of moving water via kinetic-energy-receiving turbine-blades, which transfer these forces into the rotational movement of a shaft, which turns an electro-magnetic dynamo.

Progress in the field of materials science is seeing the emergence of novel materials capable of converting mechanical strain within a material into electrical energy without a rotating mechanism, and therefore, without a turbine and electro-magnetic dynamo. The potential advantages of turbine-free power generation include simplicity of design with fewer or no articulated moving parts and potentially greater efficiency. This invention embodies a range of mechanisms that share common principles for the creation of scalable hydro-electric generators, employing these novel materials and designed to anticipate the utilization of novel materials yet to be discovered or invented.

One important but not exclusive application of this invention is in the field of so-called "free-flow" or "run-of-the-river" hydroelectric power generation, where the kinetic energy of rivers, streams or tidal currents is harnessed without the need for dams. A dam built in the path of flowing water creates a high energy potential differential above and below the dam, allowing water to pass through turbines at high speed and pressure. However, dams are expensive to construct and have a high environmental impact.

Efforts to harness the low-speed-high-volume flow of naturally-occurring water-ways have not yet proven viable largely due to the following: (1.) the high-cost of the energy-harnessing mechanisms relative to the low quantity of energy harnessed; and (2.) the physical vulnerability of existing energy-harnessing mechanisms. With this invention, problem 1 is solved with the utilization of large "capture" surface-areas that collectively harness a significant quantity of energy using a potentially cheap mass-produced material. Problem 2 is solved because the mechanism primarily includes flexible and elastic components which are more capable of deflecting or absorbing shocks such as an impacting log or tree branch. A further and related advantage is a more gentle physical interaction with fish and other aquatic animals.

The advantages of this invention for free-flow hydropower generation notwithstanding, the mechanisms of this invention are also applicable as an alternative to conventional turbines in dammed hydropower installations, and certain embodiments of this invention are designed to power a conventional electromagnetic dynamo, or other power output device such as a pump.

OVERVIEW

Embodiments of the present invention utilize a sheet-like elastic material which may be comprised of a single layer, multiple layers, a woven mesh or other composite sheet-like elastic material, and where said sheet-like material has been deformed and therefore stressed, with an applied first force. The material may accommodate this applied first force through a combination of deflection, compression and stretching of the material. If the material is appropriately restrained prior to the removal of this applied first force, the energy of this applied force will remain as potential energy within the material.

The shape of this material in its relaxed state prior to the application the first force is defined by the spatial arrangement of molecules within the material. After the application of this first force and the restraining of the material so that this first force is maintained as potential energy within the material, the shape of the material is defined by the spatial arrangement of its molecules but also by its internal energy state, which, with the introduction of a second force, can take on a virtually infinite number of configurations.

The mechanisms of this invention utilize a plurality of undulations in said material, where these undulations result from a first force applied to the material, and where these undulations are maintained in existence but not in position, by at least one restraining component. When a length of this material prepared in this way is then secured in a stream of fluid, and arranged so that the longitudinal axis of the length of material is parallel to the direction of the moving fluid, the upstream-sides of the material's undulations will obliquely face the direction of the movement of the fluid, and be subjected to the vector forces of the moving fluid. Therefore, higher water pressures will result on the upstream-facing surfaces of the undulations in the material. Conversely, the downstream surfaces of the undulations will experience lower water pressures. The pressure differential between the upstream and downstream surfaces of the undulations causes the positions of the undulations within the material to move in the direction of the moving fluid.

The presence of undulations in the material is an expression of internal forces held as potential energy within the material by a restraining component. Therefore, when an undulation being moved along the length of material moves off the end of this length of material, a new undulation must take its place at the upstream end of this length of material, because the internal energy state of this length of material has not changed, and the undulations are an expression of restrained forces within the material.

The various embodiments of the present invention can be divided into two categories, or "groups". The embodiments in the first group all utilize a single ribbon or a plurality of ribbons, said ribbons being made of a flexible or elastic sheet of material as described above. During operation of the mechanisms, this ribbon maintains a uniform or substantially uniform width. Said ribbon of material as defined in this way is referred to hereafter as a "frond".

The embodiments of this first group all incorporate fronds, and are further categorized for convenience by their visual appearance when viewed from a plane perpendicular to the direction of fluid movement. Said first group is comprised of: A parallel array, an asterisk, a polygonal ring, a dodecahedral honeycomb and an octagonal honeycomb.

The embodiments of the second group all lack the fronds common to each embodiment of the first group. The embodiments of this second group are comprised of a tube of the same material described above, but do not incorporate fronds into their structure. The embodiments of this second group are further categorized for convenience by their visual appearance when viewed from a plane perpendicular to the direction of fluid movement. Said second group is comprised of a first hexagonal honeycomb, second hexagonal honeycomb and concentric rings.

Embodiments of the first group contain single fronds or fronds connected to each other along their longitudinal axes in various ways, including in a manner which forms tubes, and in a manners whereby said tubes connect laterally to one another to create honeycomb-like patterns.

It should be noted that tubes from the first group, being comprised of fronds, are distinct in form and action from tubes that comprise the second group. The tubes of the second group are comprised either of circular tubes of different diameters arranged concentrically one within another, or of polygonal tubes connected to each other laterally to create honey-comb like patterns. The polygonal tubes of this second group are distinct from the polygonal tubes in the first group because the sides of the tubes in this second group vary in width during operation, whereas the widths of fronds, comprising the sides of tubes in the first group, remain constant or substantially constant during operation.

A further distinction can be made between embodiments of the first group with tubes comprised of fronds, and embodiments of the second group with no fronds. Specifically, the overall diameter of tubes without fronds periodically increase and decrease under operation, whereas the overall diameters of tubes of the first group comprised of fronds, remain constant or substantially constant under operation.

The deformations in material described above will remain so long as the material is prevented from returning to its relaxed state by at least one restraining component. Since most of the embodiments of this invention utilize a plurality of deformations along a single length of material, another principal element of the mechanisms is a method for preventing the wave undulations in said length of material from combining into one single, larger deformation. Various methods and configurations are described in the detailed description as to how this summing together of multiple deformations into a single deformation is prevented, thereby maintaining a series of wave undulations along the longitudinal axis of the material.

Power is harnessed by the mechanisms embodied in the present invention in two different ways. In the first way, as the forces of the moving water cause the wave undulations to move along the fronds, stresses are created within the sheet-like material or composite sheet-like material that comprise the fronds or tubes. This sheet-like material consists in whole or in part of a material which exhibits an electrical response to strains exerted within the material. As the wave undulations move along the material in the direction of the moving fluid, stresses also move through the material in the direction of the moving fluid, and electrical energy is generated from these stresses in the material. Existing examples of such materials include electroactive polymers (EAPs), which may exhibit electrostrostrictive, electrostatic, piezoelectric, and/or pyroelectric responses to electrical or mechanical fields, as well as ionic EAPs, shape memory alloys, and nano-wires. At least two electrodes are utilized for embodiments extracting power in this first way.

The second way that energy is harnessed by the mechanisms embodied in the present invention is by coupling the mechanical action of the traveling undulating motions of the material as described above to a shaft or axle. This axel turns an electromagnetic dynamo or other output device, such as for example, a pump.

This invention does not rely on vortex currents to force the energy harnessing components of the embodiments into a morphology that is able to harness energy, distinguishing the present invention from the "Piezoelectric Eel" U.S. Pat. No. 7,034,432 B1. When subject to the forces of moving fluid, the morphologies of the energy-harnessing components of the mechanisms of the present invention fluctuate in a periodic manner between states that lie within a range of possible morphology configurations. When not subject to the forces of moving fluid, the morphologies of the energy harnessing components of these mechanisms remain fixed in just one morphology configuration within that range. The mechanisms of the present invention are capable of receiving the forces of moving fluid regardless of whether the flow is laminar or turbulent, and the mechanisms are capable of receiving much higher loads. An additional advantage that the present invention has over the Piezoelectric Eel, with its reliance on vortices in the moving fluid, is scalability because there, are in principle, no upward limits on the dimensions to which embodiments of the present invention can be built.

BRIEF DESCRIPTION OF DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 3A illustrates how a frond is formed, in, accordance with an embodiment of the present invention;

FIGS. 3B-C illustrate how flexible or elastic crenated strips are formed.

FIG. 3D illustrates how the frond is combined with the flexible or elastic crenated strips, in accordance with an embodiment of the present invention;

FIG. 3E illustrates a perspective view of the arrangement of a frond and two connecting flexible or elastic crenated strips, in accordance with an embodiment of the present invention;

FIGS. 4A-B illustrate the morphology of the flexible or elastic crenated strip, in accordance with an embodiment of the present invention;

FIG. 4C illustrates how a first crenated strip and a second crenated strip are attached together to form a double crenated strip, in accordance with an embodiment of the present invention;

FIG. 4D illustrates an array of rigid members inserted into the double crenated strip, in accordance with an embodiment of the present invention;

FIG. 4E illustrates how the double crenated strip is configured with and attached to adjacent fronds, in accordance with an embodiment of the present invention;

FIG. 4F illustrates a schematic view of the positions of wave undulations of two connected fronds adjacent to each other and with respect to a direction of the fluid flow, in accordance with an embodiment of the present invention;

FIG. 4G illustrates a pressure differential across wave undulations of a frond, in accordance with an embodiment of the present invention;

FIGS. 8A-C illustrate an asterisk formed by a plurality of fronds, crenated strips and restraining components, in accordance with another embodiment of the present invention;

FIG. 9 illustrates stiffening, synchronizing and rotating components, in accordance with an embodiment of the present invention;

FIG. 10 references points of section cuts shown in FIGS. 11A-I during one cycle of operation of the asterisk, in accordance with an embodiment of the present invention;

FIGS. 11A-I illustrate a series of sections cut through the asterisk at a given position, during one cycle of operation, in accordance with an embodiment of the present invention;

FIGS. 12A-B illustrate various mechanical couplings and the fronds in the asterisk, in accordance with an embodiment of the present invention;

FIGS. 13A-E illustrates a series of sections cut through the asterisk at a given position, during one cycle of operation, while FIG. 13F illustrates the corresponding cycle of operation, in accordance with another embodiment of the present invention;

FIG. 14 and FIGS. 15A-D illustrate a non-free-flow application of the asterisk, in accordance with another embodiment of the present invention;

FIG. 19 illustrates one of the three-sided tubes positioned at the corners of the hexagonal ring of fronds, in accordance with an embodiment of the present invention;

FIGS. 20A-I illustrate a series of sections cut through the hexagonal ring of fronds at a given point during one cycle of operation; and FIG. 21 illustrates the corresponding cycle of operation, in accordance with an embodiment of the present invention;

FIG. 22 and FIGS. 23A-B illustrate a non-free-flow application of the polygonal ring, in accordance with another embodiment of the present invention;

FIGS. 24A-E illustrate a series of sections cut through a hexagonal ring of fronds that comprise the dodecahedral honeycomb at a given point, during one half of a cycle of operation; and FIG. 24F illustrates the corresponding one half of a cycle of operation, in accordance with still another embodiment of the present invention;

FIGS. 26 A-I illustrate a series of sections cut through a dodecahedral honeycomb at a given position, during one cycle of operation, in accordance with an embodiment of the present invention, and FIG. 26J locates that position within one cycle of operation;

Figure 31A:
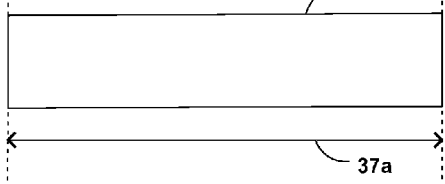
Figure 31B:
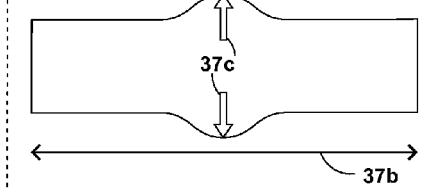
Figure 31C:
Figure 31D:
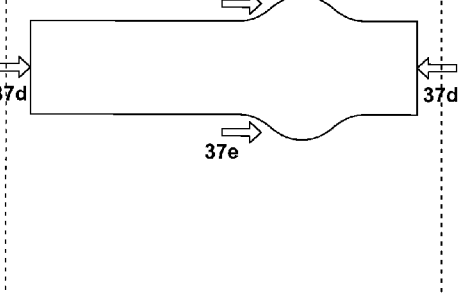
Figure 31E:
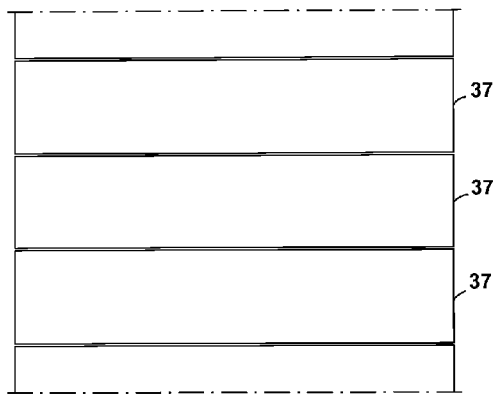
Figure 31F:
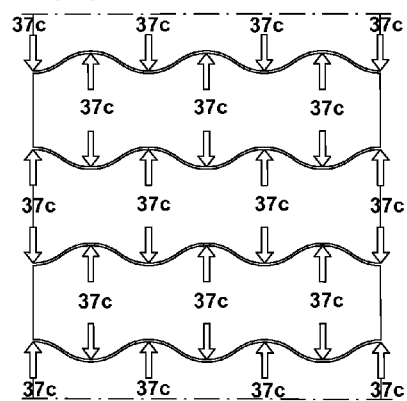
Figure 31G:
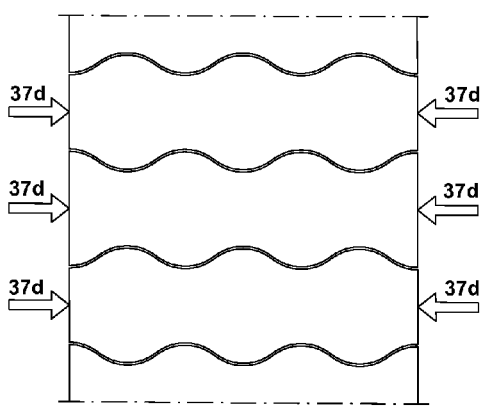

FIG. J illustrates an octagonal honeycomb formed by a plurality of octagonal-shaped tubes, each octagonal tube comprised of a ring of fronds and connecting strips, in accordance with an embodiment of the present invention;

FIGS. 31A-D illustrate how wave undulations may be formed in a circular tube, in accordance with an embodiment of the present invention;

FIGS. 31E-G illustrates how a plurality of circular tubes are arranged adjacent to each other, in accordance with an embodiment of the present invention;

FIG. 32 illustrates two distinct types of hexagonal tubes, in accordance with the first hexagonal honeycomb embodiment of the present invention;

FIG. 32A illustrates one cycle of operation; and

Figure 36:
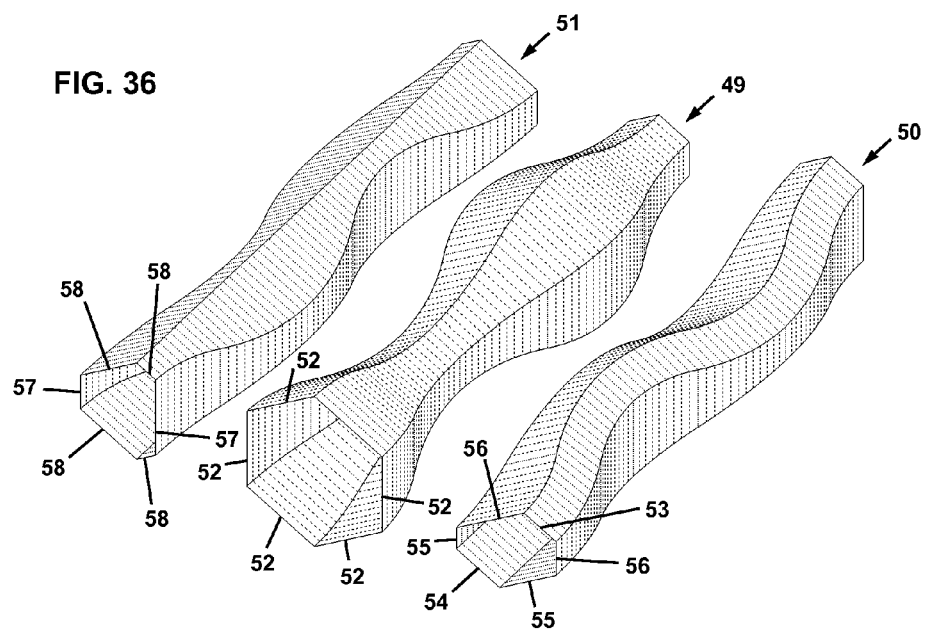
Figure 37:
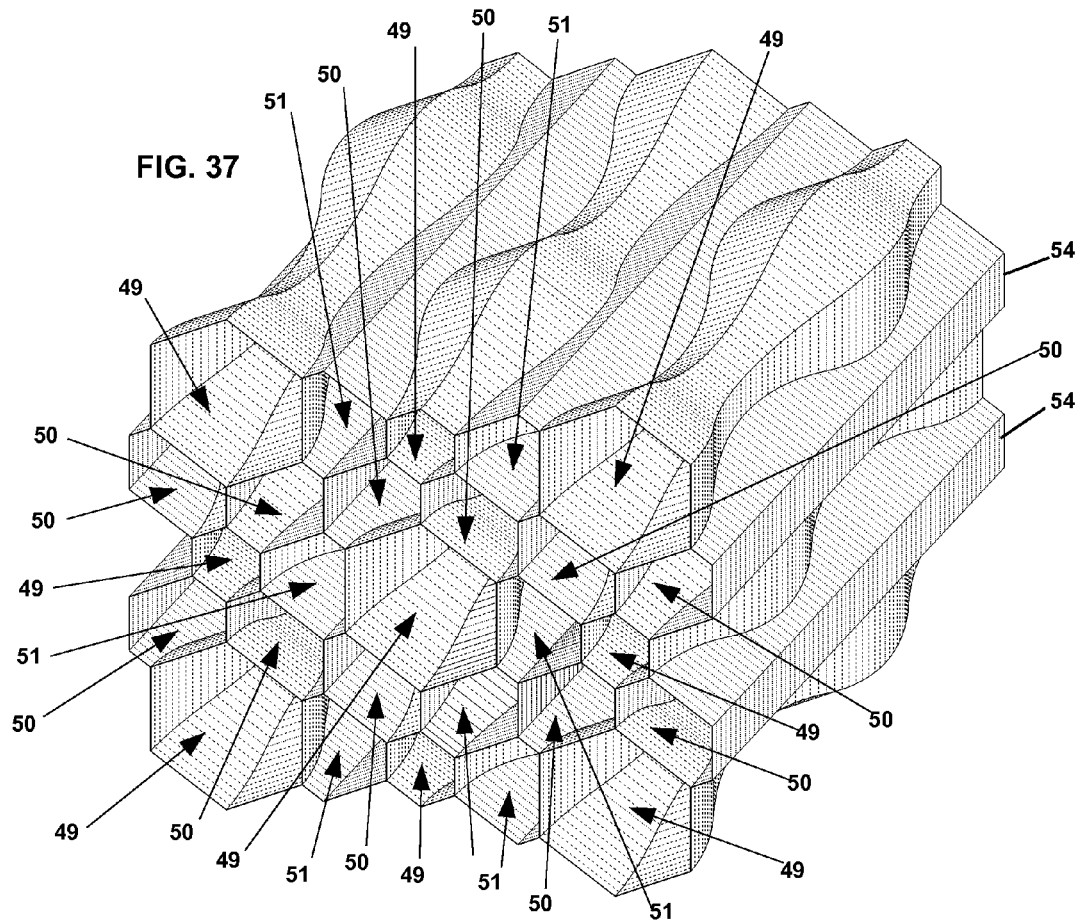
Figure 38:
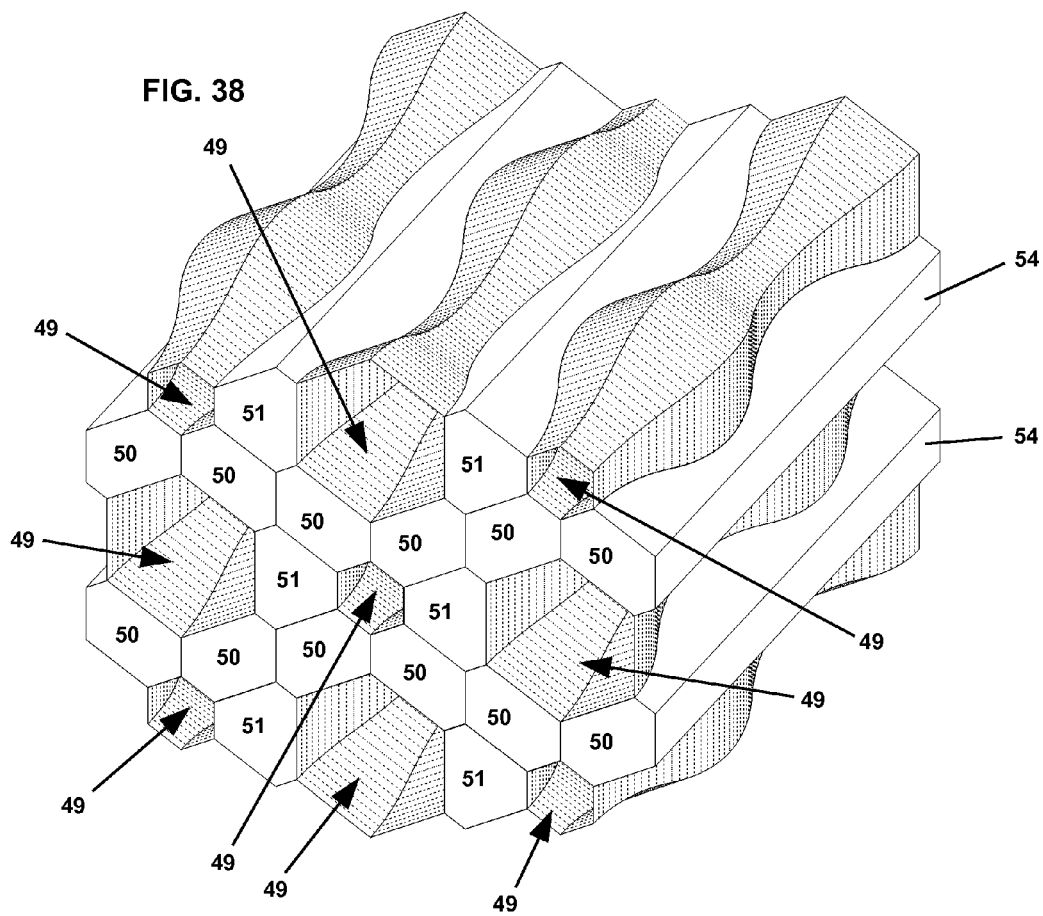
Figure 39:
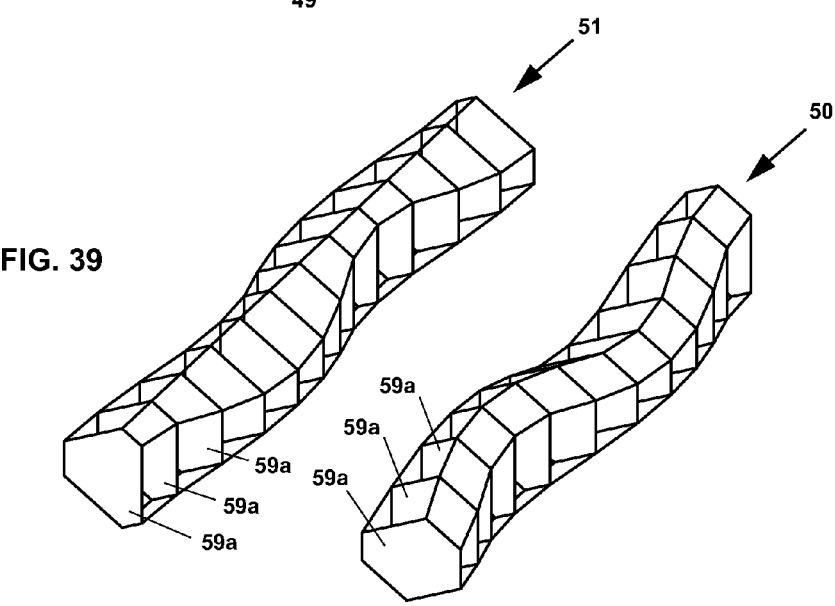
Figures 42, 43:
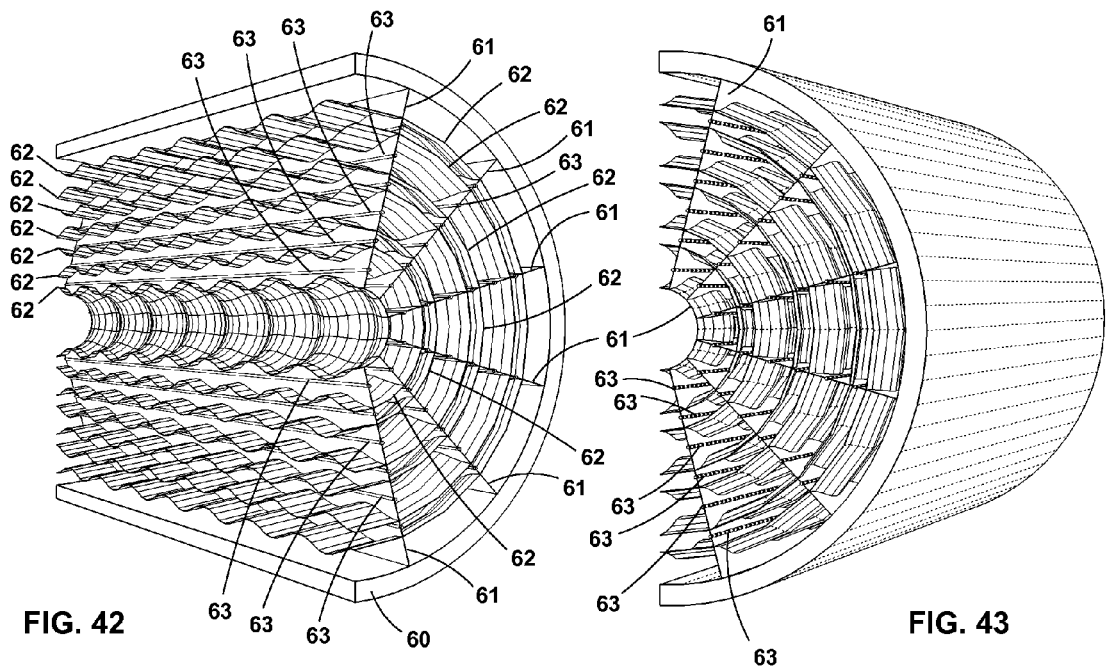
Figure 44:
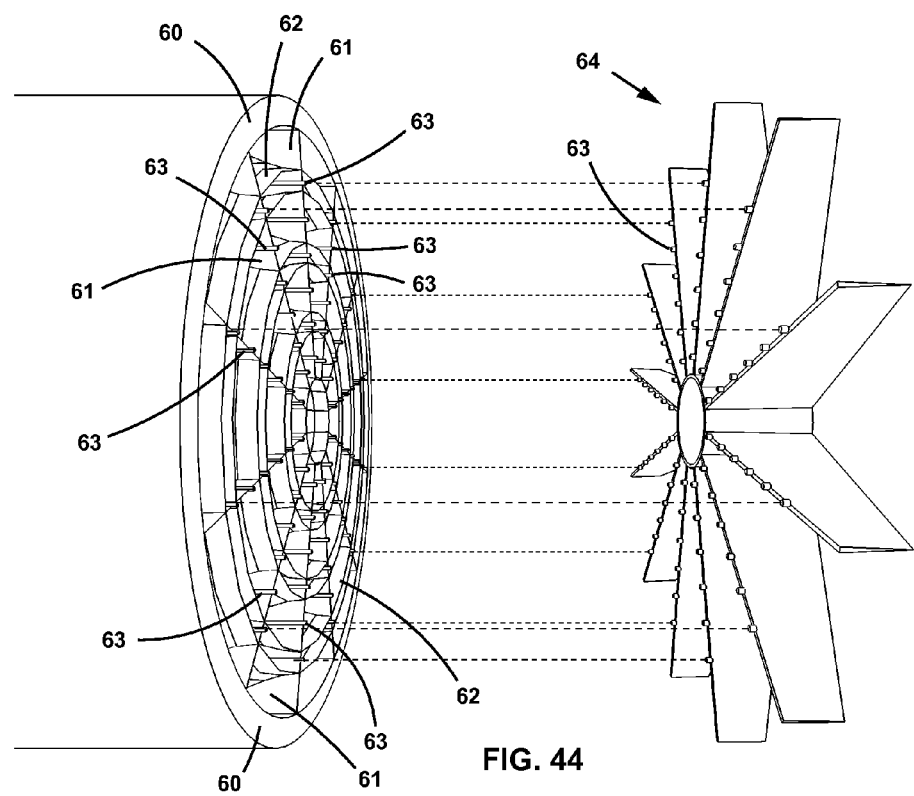

FIG. 33A-I illustrate a series of sections cut through the same point during one cycle of operation, in accordance with the first hexagonal honeycomb embodiment of the present invention;

FIGS. 34A and 35 illustrate how a hexagonal honeycomb is formed by a plurality of Type A hexagonal tubes and a plurality of Type B hexagonal tubes, in accordance with the first hexagonal honeycomb embodiment of the present invention;

FIGS. 34A-C illustrate a series of sections cut through a hexagonal honeycomb at the same point, during one half of a cycle of operation, in accordance with this embodiment of the present invention;

FIG. 36 illustrates three distinct types of hexagonal tubes, in accordance with the second hexagonal honeycomb embodiment of the present invention;

FIG. 37 illustrates how a hexagonal honeycomb is formed by a plurality of Type C hexagonal tubes, a plurality of Type D hexagonal tubes and a plurality of Type E hexagonal tubes, in accordance with the second hexagonal honeycomb embodiment of the present invention;

FIGS. 38-39 illustrate a hexagonal honeycomb where the Type D and Type E tubes are closed by a series of elastic plates, in accordance with yet another embodiment of the present invention;

FIG. 40 illustrates how a hexagonal honeycomb is connected at its perimeter to a rigid frame or tube, in accordance with an embodiment of the present invention;

FIG. 41 illustrates concentric circular tubes and their corresponding restraining components, in accordance with the concentric rings embodiment of the present invention;

FIGS. 42 and 43 illustrate a longitudinal section cut through concentric tubes, in accordance with an embodiment of the present invention;

FIG. 44 illustrates how the restraining components restrain the concentric tubes, in accordance with an embodiment of the present invention; and FIGS. 45-50 illustrate longitudinal sections cut through the concentric tubes, in accordance with various concentric rings embodiments of the present invention.

DETAILED DESCRIPTION OF EXAMPLE EMBODIMENTS

Embodiments of the present invention provide undulating mechanisms for generating electricity from a moving stream of fluid in two ways, the first is by utilizing materials that exhibit an electrical response to material strain, the second is by mechanically coupling the undulating motions of the mechanisms to an electromagnetic dynamo, or other output device. In the descriptions herein for embodiments of the present invention, numerous specific details are provided, such as examples of components and/or mechanisms, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1A:
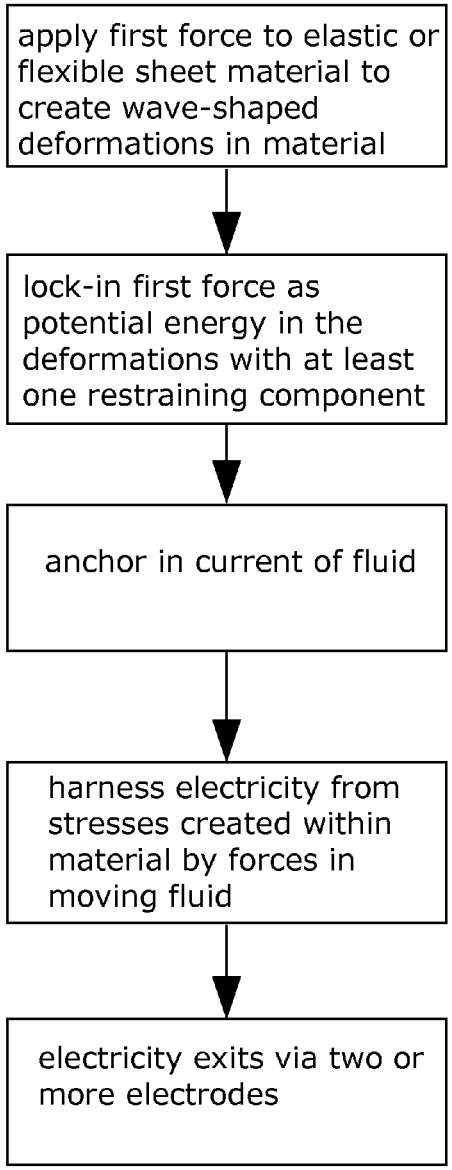
FIG. 1A is a diagram illustrating basic steps in the creation and operation of an embodiment of the present invention utilizing a flexible electroactive material.
Figure 1B:
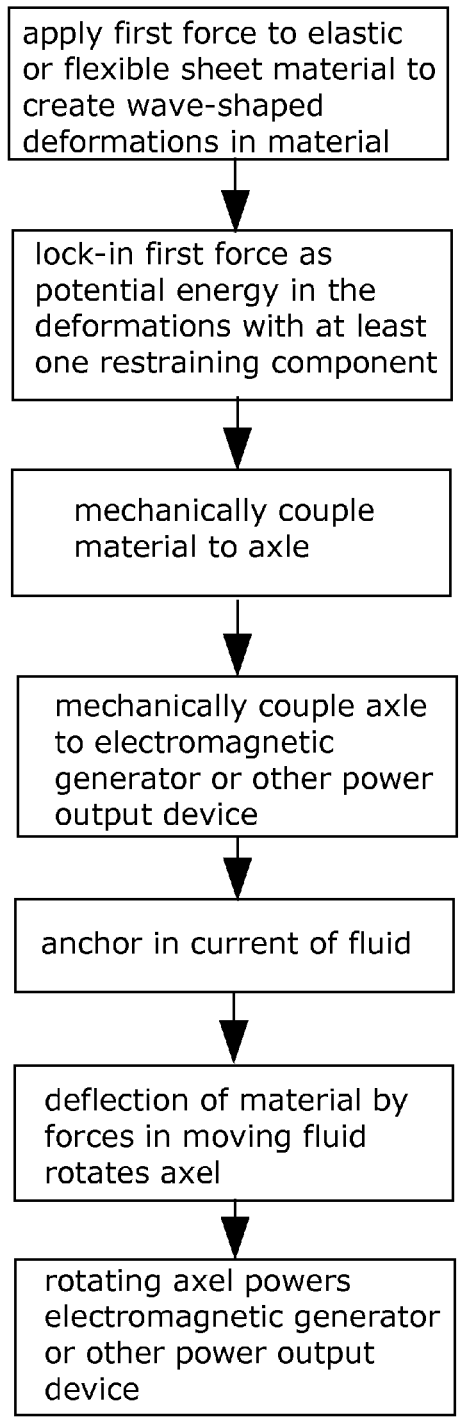
FIG. 1B is a diagram illustrating basic steps in the creation and operation of an embodiment of the present invention utilizing the deflection of a flexible material.

FIG. 1A is a diagram illustrating basic steps in the creation and operation of embodiments of the present invention utilizing an elastic or flexible material which exhibits an electrical response to material strain. FIG. 1B is a diagram illustrating basic steps in the creation and operation of embodiments of the present invention utilizing the deflection of an elastic or flexible material to perform mechanical work which is then harnessed via an electromagnetic dynamo or other power output device.

Figure 2A:
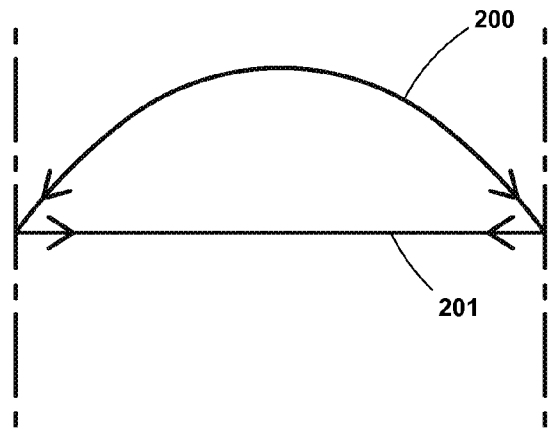
FIG. 2A is a diagram showing the internal energy state at rest of an undulation in the material of a component of the present invention.
Figure 2B:
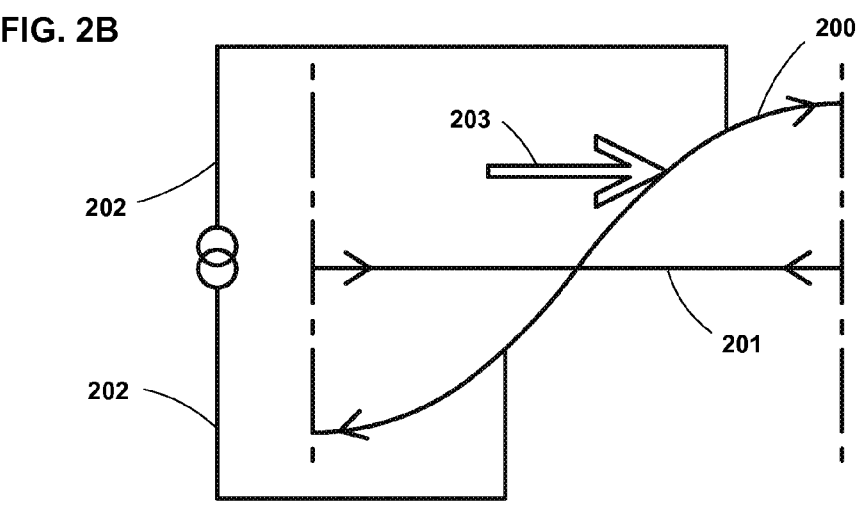
FIG. 2B is a diagram showing how energy is extracted from an embodiment of the present invention utilizing a flexible electroactive material.

FIG. 2A is a diagrammatic representation of the internal energy states of a single deformation 200 in the material and a single restraining component 201. The deformation 200 in the material is in overall compression, and the restraining component 201 is in tension. FIG. 2B is a diagrammatic representation showing an external force 203 exerted by a moving fluid upon said deformation 200 and the resulting change in position of said deformation 200, and the retrieval of electricity generated by resulting stresses in the material via two electrodes 202. The principles illustrated in this diagram are common to all embodiments of the present invention in which strains within the material are converted into electrical energy by utilizing an appropriate elastic or flexible material as described above, whether said material exists today or whether said material will be discovered or invented in the future.

Figure 2C:
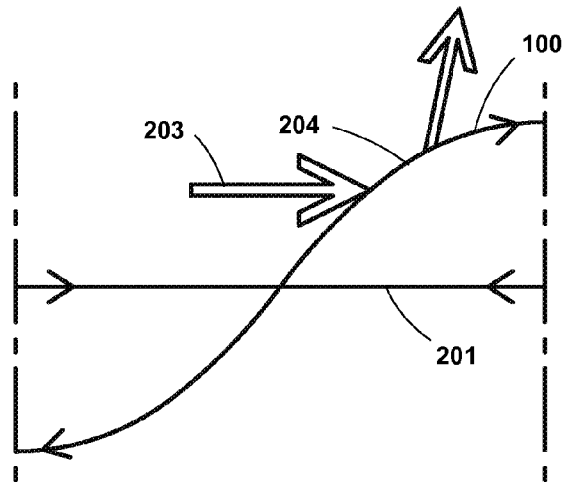
FIG. 2C is a diagram showing how energy is extracted from an embodiment of the present invention utilizing a flexible material coupled to a mechanical output.

FIG. 2C is a diagrammatic representation showing an external force 203 exerted by a moving fluid upon the deformation 200 in FIG. 2A and the resulting change in position of said deformation 200, causing deflection of the material 204 which can be mechanically coupled to an electromagnetic dynamo or other output device. The principles illustrated in this diagram are common to all embodiments of the present invention in which deflection of the material is converted into mechanical energy, which is mechanically coupled to an electromagnetic dynamo or other output device.

As has been mentioned in the Summary above, fronds are a universal component in a first group of embodiments which are further categorized according to their visual appearance as viewed from a plane perpendicular to the direction of moving fluid. This first group consists of a parallel array, an asterisk, a polygonal ring, a dodecahedral honeycomb and an octagonal honeycomb.

FIG. 3A illustrates how this frond 2 is formed, in accordance with the first group of embodiments of the present invention. The frond 2 is formed by pre-stressing a ribbon 71 of a flexible or elastic material. As described above, the flexible material can be any material or composite of material that exhibits an electrical response to mechanical strain. In an un-stressed state, the ribbon 71 is straight. When a force 72 is applied parallel to a longitudinal axis of the material, a series of wave undulations 73 occur within the material, and cause the ribbon 71 to take a form of an undulating ribbon. When no additional force is acting upon the frond 2, it maintains a motion-less sine-wave profile along its longitudinal axis.

The regularity of the wave undulations 73 can be set by a guiding mechanism to ensure that the applied force 72 causes deformation to occur in the desired periodic manner. As long as the frond 2 is restrained by a restraining component from returning to its unstressed state, the potential energy of the applied force 72 remains in the frond 2, and therefore, the presence of wave undulations 73 remain.

Along both edges of the frond 2 are flexible or elastic strips 3 that take the form of geometrically hyperbolic planes, more commonly described as "scalloped" or "crenated". The edge of a crenated strip 3 that is connected to the frond 2 is formed so as to follow the undulating profile of the frond 2 along the undulating line of attachment, creating a transition between the wavy edge of the frond and the straight line of attachment to a restraining component 4. FIGS. 3B-C illustrate how the crenated strips 3 are created and combined with the frond 2, in accordance with various embodiments of the first group in this invention. A first arch-shaped strip 74 of the flexible or elastic material is formed or cut from a flat sheet, multi-layered, woven or other composite sheet of the flexible or elastic material. The geometry of the first strip 74 has an inner edge 74*a* and an outer edge 74*b* formed by two arcs with a common center, such that the outer edge 74*b* has a greater radius and a proportionally greater arc length than the inner edge 74*a*. A force 75 is applied to the first strip 74 until the inner edge 74*a* forms a straight line. In such a case, the inner edge 74*a* is in tension and the outer edge 74*b* is in overall compression. Since the outer edge 74*b* has a greater length than the inner edge 74*a*, as defined by its greater arc length prior to the application of the force 75, the outer edge 74*b* becomes deformed into one or more wave undulations. The number of wave undulations and the regularity of wave undulations can be controlled by a guiding mechanism. This first flexible crenated strip 3 has a tendency to return to its unstressed state, and therefore, maintains the applied force 75 as potential energy as long as it is restrained from returning to its unstressed state.

A second crenated strip 3 of flexible or elastic material with the same dimensions as the first is formed with the same number and shape of wave undulations as the first crenated strip 3, except that the wave undulations of the second crenated strip 3 are out-of-phase with the wave undulations of the first crenated strip 3. FIG. 3D illustrates how the frond 2 is attached to the two crenated strips 3, in accordance with various embodiments of the present invention. The frond 2 has the same wave undulations as the first strip 3, and is attached continuously along the undulating outer edge 74*b* of the first strip 3. The second strip 3 is rotated 180 degrees, and is fixed continuously along its outer edge 74*b* to the frond 2.

The energy state of the frond 2 and the two crenated strips 3 is in equilibrium, as the internal energy of the first crenated strip 3 causes the first strip to "want" to straighten-out in one direction, but the internal energy state of the second crenated strip 3 causes this second strip to "want" to straighten-out in the opposite direction. The tension within the inner edges 74*b* of the flexible crenated strips 3 therefore prevent the frond 2 from straightening-out. Thus the crenated strip 3 also serves as the first restraining component. While the positions of the wave undulations in the crenated strips 3 and the frond 2 may move under the force of flowing fluid in the direction of the flowing fluid, the crenated strips 3 and the frond 2 remain synchronized with one another. Waves that are moved off the end of the frond 2 must re-appear at the start of the frond 2 because the potential energy in the mechanism, expressed as stressed undulations in the material, has not been removed.

FIG. 3E illustrates a perspective view of the arrangement of the frond 2 and the crenated strips 3, in accordance with the first group of embodiments of the present invention. The inner edges 74*a* of the crenated strips 3 may be reinforced with a non-elastic material 4, such as a cable. As mentioned above, each frond 2 is electrically coupled to at least one electrode, so as to retrieve harnessed electricity. Wiring 4*a* associated with the retrieval of harnessed electricity from the electrodes runs along the reinforced area 4 of the crenated strips 3.

FIGS. 4A-B illustrate the morphology of the crenated strip 3, in accordance with an embodiment of the present invention. A series of sections 3*a*, 3*b*, 3*c*, and 3*d* cut through the crenated strip 3 shows that the wave undulations of the crenated strip 3 decrease further away from the outer edge 74*b*, and are eliminated altogether at the inner edge 74*a*.

FIG. 4C illustrates how the first strip and the second strip are attached together to form a double flexible or elastic crenated strip 6, in accordance with an embodiment of the present invention. The inner edge 74*a* of the second crenated strip 3 is attached to the inner edge 74*a* of the first crenated strip 3, as shown. The potential energy in the first crenated strip 3 "wants" to straighten-out the first crenated strip 3 in one direction and the potential energy in the second crenated strip 3 "wants" to straighten-out the second crenated strip 3 in the opposite direction. Therefore, the two attached crenated strips form a double crenated strip 6 that is in energy equilibrium.

FIG. 4E illustrates how the double crenated strip 6 is used to attach adjacent fronds 2, in accordance with an embodiment of the present invention. The double crenated strip 6 is mechanically coupled with a frond 2*a* above it and another frond 2*b* below it. Wave undulations of a frond are out-of-phase with wave undulations of adjacent fronds. A plurality of fronds may be connected one above another, as described.

FIG. 4D illustrates how wave undulations between the two edges of the double crenated strip 6 are synchronized and in opposite phase to each other, in accordance with an embodiment of the present invention. The synchronicity of wave undulations between the two edges of the double crenated strip 6 may be further ensured by the insertion of rows of narrow, straight, rigid members 6*a* that run from the top of one edge to the bottom of the other edge. As the wave undulations pass along the double crenated strip 6, these rigid members 6*a* rotate partially about a central axis of the double crenated strip 6. The synchronicity of the two edges of the double crenated strip 6 ensures the synchronicity of the fronds 2*a* and 2*b*.

FIG. 4F illustrates a schematic view of the wave undulations of the fronds 2*a* and 2*h* with respect to a direction 5 of the flow of the fluid. When anchored in the flowing fluid, higher fluid pressures result on faces of wave undulations that obliquely face upstream and lower fluid pressures result on faces of wave undulations that obliquely face downstream. FIG. 4G illustrates a pressure differential across the wave undulations of two connected fronds 2, in accordance with an embodiment of the present invention. This pressure differential causes the wave undulations to travel down along the fronds 2*a* and 2*b* in the direction 5 of the flow.

Figure 5:
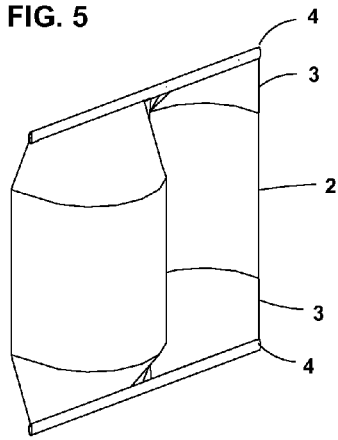
FIG. 5 illustrates a frond with the preferred minimum number of wave undulations per frond, in accordance with an embodiment of the present invention.

FIG. 5 illustrates a frond 2 with the preferred minimum number of wave undulations per frond. The preferred minimum number of wave undulations per frond 2 is two, one to each side of the longitudinal central axis of the frond 2, in accordance with an embodiment of the present invention. As the fluid pressure moves the first wave in the direction 5 of the flow, a new wave begins to form upstream from the first wave, while at the same time the second wave begins to move off the end of the frond. The maximum number of wave undulations per frond 2 depends on the physical strength of the materials used to form fronds 2 and crenated strips 3 and double crenated strips 6.

As mentioned above in the summary, the sequence of wave undulations in a given length of frond 2 must be prevented from summing together into fewer or a single larger undulation. When viewing FIG. 3A it is easy to visualize how the undulations 73 created by the applied force 72 would tend to converge into a single bulge. FIG. 3E shows how each undulation is restrained from converging with one another, by restraining the frond 2 between two crenated strips 3 and non-elastic reinforcing material 4. The straight edged side of the crenated strips 3 defines a line that passes through an axis which is the midpoint of the wave cycle, which is to say that this edge defines a straight line across which the waves extend either side to equal amplitudes. Configured in this manner, one wave will not merge with another because to do so would require the wave to "leap" over the barrier of the maximum amplitude of the wave immediately adjacent to it.

As the wave undulations move along the fronds 2 in the direction of the moving fluid, stresses move along the fronds 2 in the direction of moving fluid, and electrical energy is generated from these stresses created in the material.

A plurality of fronds and restraining components are arranged in a prescribed pattern selected from the first group, said pattern being visible when viewed in a plane perpendicular to the direction of moving fluid. The pattern group consists of an array, an asterisk, a polygonal ring, a dodecahedral honeycomb and an octagonal honeycomb. Details of the parallel array, the asterisk, the polygonal ring, the dodecahedral honeycomb and the octagonal honeycomb have been provided in conjunction with FIGS. 6-7, FIGS. 8A-16B, FIGS. 7-23C, FIGS. 24A-30B, and FIGS. 30C-30J respectively.

Pattern: Parallel Array

Figure 6:
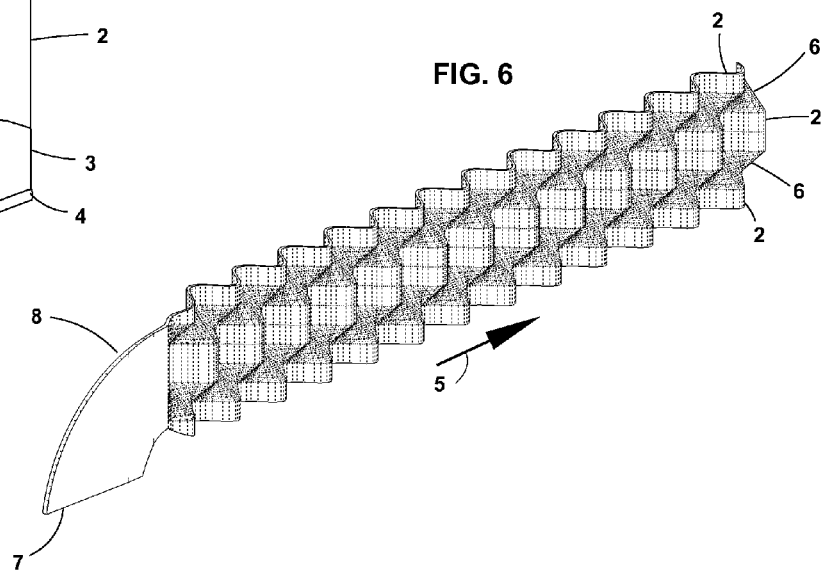
FIG. 6 illustrates a frond line, in accordance with an embodiment of the present invention.

In accordance with an embodiment of the present invention, at least two fronds 2 are mechanically coupled to each other along a common longitudinal edge to form a frond line. FIG. 6 illustrates a frond line formed by three fronds 2 and two double crenated strips 6. Wave undulations of each frond 2 are out-of-phase with wave undulations of adjacent fronds 2 in the same frond line, in accordance with an embodiment of the present invention.

The fronds 2 can be anchored in various ways to the floor of the fluid channel, to a structure spanning across the fluid channel, or through anchors 7 attached to vertical component 8. The vertical components 8 can be formed in various designs so as to improve the hydrodynamics of the anchors 7 and the anchor's point of attachment to the frond, and therefore, how the fluid interacts with the fronds.

Figure 7:
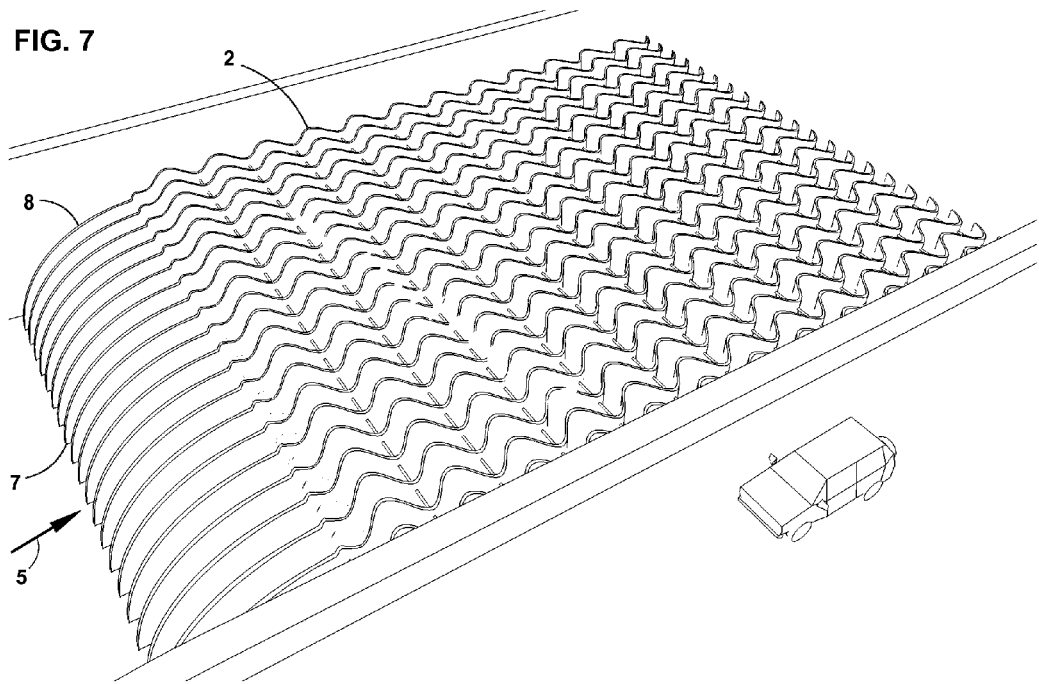
FIG. 7 illustrates a parallel array of a plurality of frond lines, in accordance with an embodiment of the present invention.

FIG. 7 illustrates an array of a plurality of frond lines, in accordance with an embodiment of the present invention. The frond lines are arranged parallel to each other, within the fluid channel, such that the frond lines undulate in unison. This creates greater fluid pressure by restricting the available paths through which the fluid can travel, and therefore creates stronger forces acting upon the frond undulations.

Pattern: Asterisk

FIGS. 8A-C illustrate an asterisk formed by a plurality of fronds 2 and restraining components, in accordance with another embodiment of the present invention.

With reference to FIGS. 8A-C, the asterisk is formed of three fronds 2. It should be noted here that further variations of the asterisk are possible with more or less than the three fronds 2 shown, and that such variations are intended to be included in the definition of the term "asterisk".

Each of three fronds 2 are connected to two crenated strips 3, one crenated strip being attached to either edge of each frond 2. The inner crenated strip 3 of each frond is mechanically coupled to a second restraining component 13 comprised of a hollow tube, and this component prevents the fronds from straightening-out to their pre-stressed state. The outer crenated strip 3 of each frond is mechanically coupled to third restraining component, and this third restraining component also prevents the fronds from straightening-out to their pre-stressed state. This third restraining component may, for example, be a tube 9 surrounding the fronds 2, or for example, rigid members 10 attached to radial rings 11.

The wave undulations of the fronds 2 are in-phase with each other so that the second and third fronds are duplicates of the first frond rotated twice about the central axis of the mechanism, which each rotation being 120 degrees, in the example shown here incorporating three fronds. As the wave undulations move along the fronds 2 in the direction of the moving fluid, stresses move along the fronds 2 in the direction of moving fluid, and electrical energy is generated from these stresses in the material.

Figure 8D:
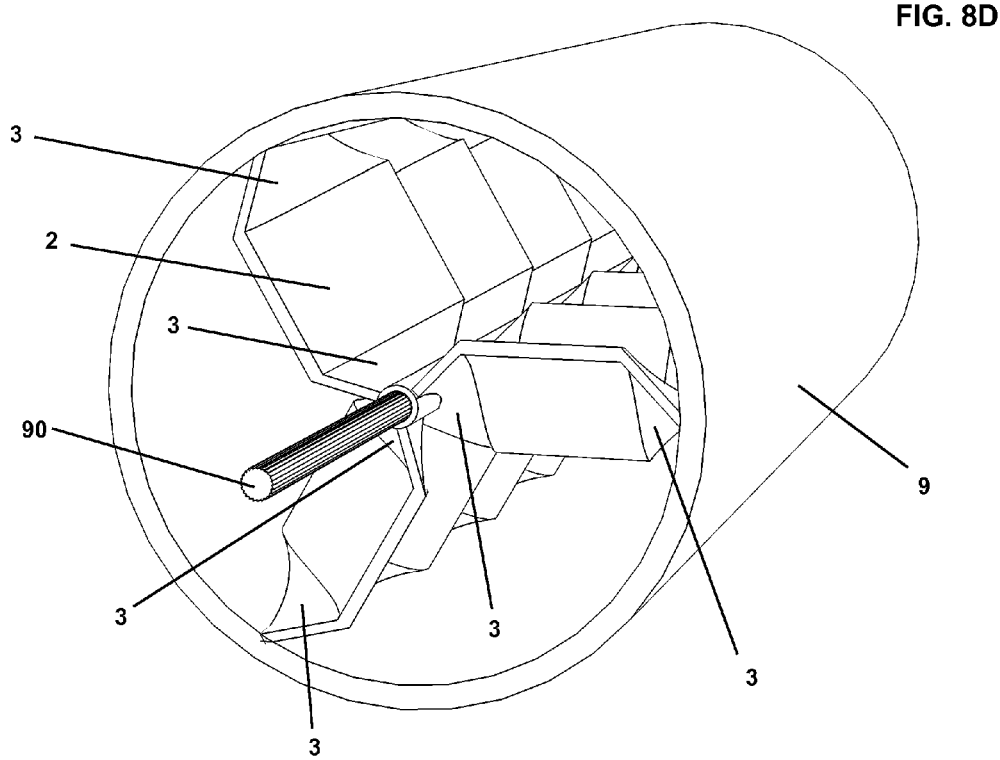
FIG. 8D illustrates the mechanical coupling to a rotating axle of an asterisk formed by a plurality of fronds, crenated strips and restraining components, in accordance with another embodiment of the present invention.

FIG. 8D illustrates yet another embodiment comprised as above in FIGS. 8A-C, with an additional component being a central ratcheted axle 90. The fronds 2 are mechanically coupled via the crenated strips 3 to the axle 90 by a ratchet system so that the clockwise and counter-clockwise rotation of the fronds 2 and connected crenated strips 3 as illustrated in FIGS. 11A-I, causes the axle 90 to rotate in one direction, thus mechanically powering an electromagnetic generator or other output device.

Figure 8E:
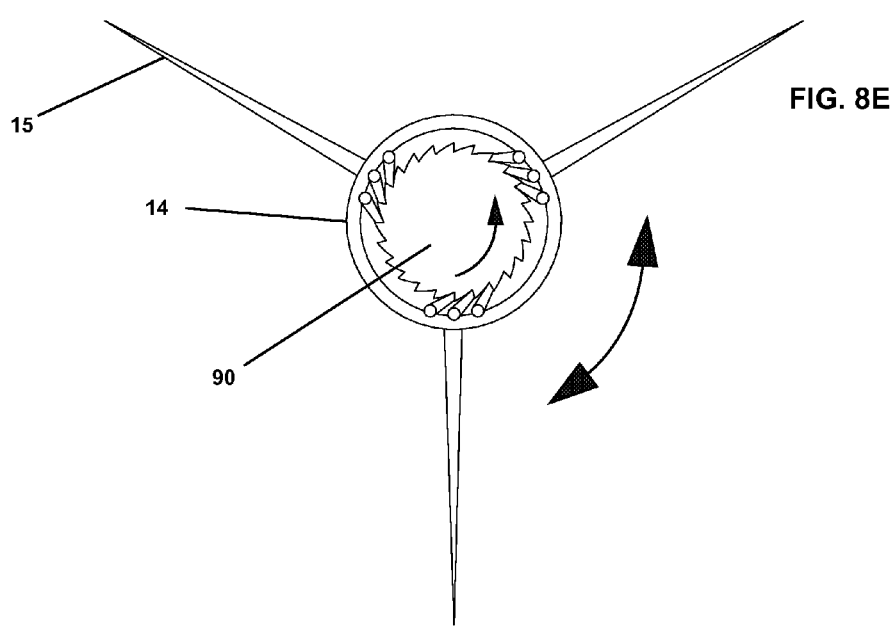
FIG. 8E illustrates a detail of a mechanical coupling to a rotating axle, in accordance with an embodiment of the present invention.

FIG. 8E illustrates a detail of an axle 90 and ratchet system, whereby forces received on the fronds 2 from moving fluid, and transferred to the inner crenated strips 3, are transferred to rigid projections 15 which are embedded into the inner crenated strips 3, and transferred to rigid rings 14, causing the rigid rings to rotate clockwise and counter-clockwise. The rigid rings engage the axle 90 when rotating in one direction, and disengage from the axle 90 when rotating in the other direction, ensuring that the axle rotates continuously in only one direction. Other mechanisms exist in prior art that will allow the rigid rings 14 to perform work on both their clockwise and counter-clockwise cycles. Mechanisms for achieving such desired rotation of the axle 90 are known to those skilled in the art of mechanical engineering and need not be described here. In embodiments containing an axle 90, the axle 90 may also serve as an additional restraining component.

FIG. 9 illustrates internal details of the arrangement relative to each other, of the rigid rings 14 and rigid projections 15 of the ratcheted asterisk embodiment above, as illustrate in FIGS. 8D-E. FIG. 9 also illustrates equally well, stiffening mechanisms for incorporation into the non-ratcheted asterisk embodiment as shown in FIG. 8A-C: Coupled to the inside of the hollow tube 13 is a plurality of rigid rings 14 running along the length of the tube 13. Each ring 14 has three rigid projections 15 radiating out from the centre at an angle of 120 degrees from each other. Each projection 15 is embedded into one of the three fronds 2 via the inner crenated strip 3 of each frond 2. The rigid projections 15 attached to the rigid rings 14 maintain the position of the fronds 12 relative to each other, as the wave undulations travel down the fronds in the direction 5 of the flowing fluid. This, in turn, causes the rings 14 and rigid projections 15 to rotate clockwise and counter clockwise. The hollow tube 13 is made of a flexible or elastic material which allows the tube 13 to rotate partially clockwise and counter-clockwise, but which does not allow the tube to lengthen. Wiring 16 associated with the retrieval of harnessed electricity may pass through the aforementioned flexible tube 13, in accordance with an embodiment of the present invention, as shown in FIG. 8A.

FIG. 10 references points of section cuts shown in FIGS. 11A-I during one cycle of operation of the asterisk, in accordance with an embodiment of the present invention. A cycle of operation is defined here as the travel of a single wave from outset through transition to its original position. FIGS. 11A-I illustrate a series of sections cut through the asterisk at a given position, during one cycle of operation. Fluid flowing through the tube 9 forces the wave undulation of a given frond 2 to move in the direction of the moving fluid. This causes the rigid rings 14 to rotate. This rotation is reinforced by the fluid pressure on the other two fronds 2, causing the wave undulations of all three fronds 2 to travel in synchronization.

FIGS. 12A-B illustrate an alternative mechanical coupling of the fronds 2 in the asterisk, in accordance with another embodiment of the present invention. The mechanical couplings of the outer longitudinal edges of the fronds 2 to the second restraining component, form V-shaped cross-sections, whose both halves are comprised of flexible or elastic crenated strips 3. The V-shaped cross-sections can be open allowing the passage of fluid through, or closed, as shown in the figure, with a plurality of elastic plates 17 stacked, along a longitudinal axis, with planes parallel to each other.

Figure 12C:
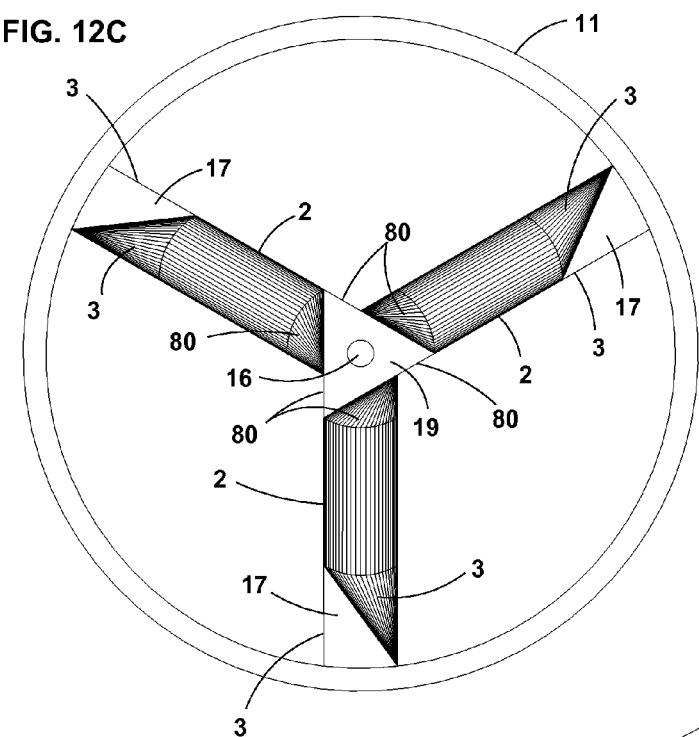
FIGS. 12C-D illustrate the use of rigid plates, instead of elastic plates, in accordance with another embodiment of the present invention.
Figure 12D:
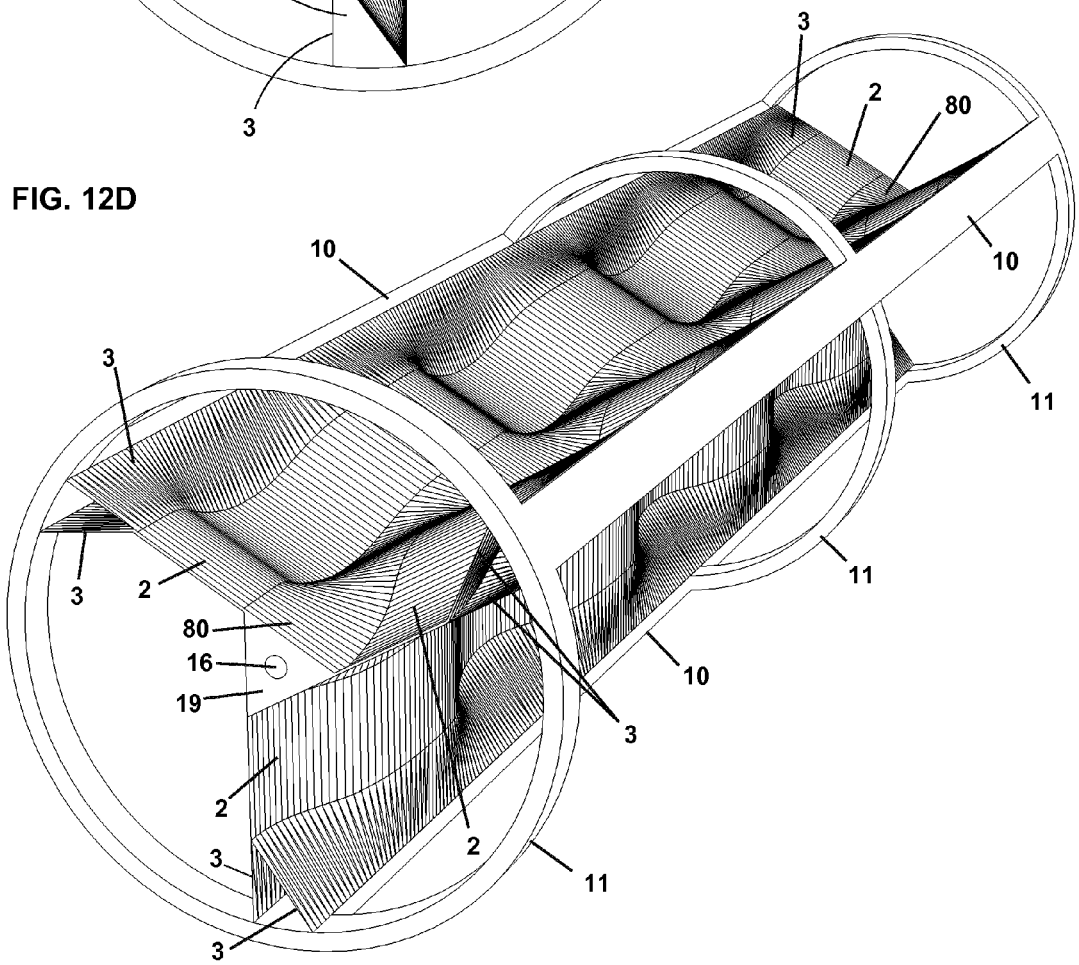

The inner edges of the three fronds 2 are not coupled to crenated strips 3 along their longitudinal edges but to each other via flexible bands 80. This mechanical coupling of the inner longitudinal edges of the fronds 2 forms a triangular cross-section, whose sides are comprised of three flexible bands 80. The polygonal cross-section can be closed by a plurality of elastic plates 18, stacked along the longitudinal axis, with planes parallel to each other and each plate connecting at its corners to the three fronds 2. As the waves move down the fronds 2, the polygonal cross-section and the elastic plates 18 rotate clockwise and counterclockwise about the longitudinal axis. The elastic plates 18 expand and contract in area with clockwise and counter-clockwise rotation. A small flexible tube passes through the elastic plates 18a along the longitudinal axis and is coupled to these elastic plates 18a. This tube is made of a material which allows the tube to twist clockwise and counter-clockwise but does not allow the tubes to lengthen, acting as a fourth restraining component. Wiring 16 associated with the retrieval of harnessed electricity passes through this tube FIGS. 12C-D illustrate the use of rigid plates 19, instead of the elastic plates 18, in accordance with another embodiment of the present invention. The polygonal cross-section can be closed by a plurality of rigid plates 19 stacked along the longitudinal axis. The size of the polygonal cross-section remains constant throughout the cycle of operation. A small flexible tube passes through the rigid plates 19 along the longitudinal axis. This tube is made of a material which allows the tube to twist clockwise and counter-clockwise with the rotation of the rigid plates 19. Wiring 16 associated with the retrieval of harnessed electricity passes through this tube. The polygonal cross-section and the rigid plates 19 rotate 60 degrees clockwise and 60 degrees counter-clockwise. However, the degree of rotation can be different, and depends on various design factors.

Figure 12E:
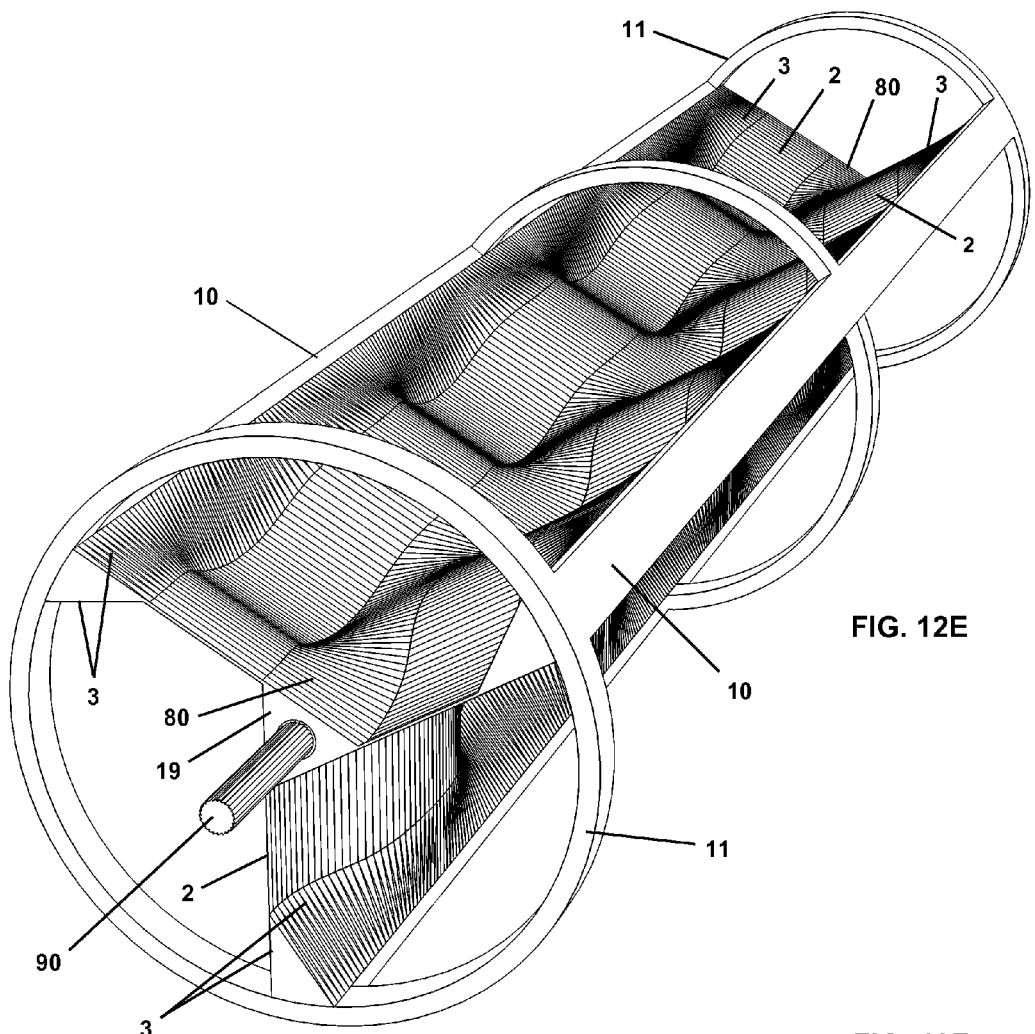
FIG. 12E illustrates a coupling of rigid plates to an axle for mechanical power output, in accordance with another embodiment of the present invention.

FIG. 12E illustrates yet another embodiment with a central axle 90 passing through the plurality of rigid plates 19 and mechanically coupled to the rigid plates 19 through a ratchet system, so that the rotation of the rigid the plates 19 as described above clockwise and counter-clockwise, rotates the axle 90 in one direction but not the other, thus mechanically powering an electromagnetic generator or other output device.

Figure 12F:
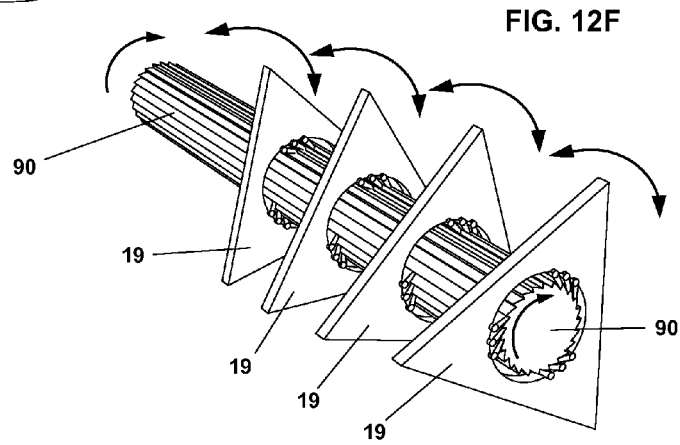
FIG. 12F illustrates a detail of a mechanical ratcheted coupling of rigid plates to an axle for mechanical power output, in accordance with an embodiment of the present invention.

FIG. 12F illustrates details of one possible mechanism for achieving the one-directional rotation of the axle from rigid plates 19 that rotate clockwise and counter-clockwise. Other mechanisms exist in prior art that will allow the rigid plates 19 to perform work on both their clockwise and counter-clockwise cycles. Several mechanisms for achieving such desired rotation of the axle 90 are well known to those skilled in the art of mechanical engineering and need not be described here. In embodiments containing an axle 90, the axle 90 serves as a fifth restraining component.

FIGS. 13A-E illustrates a series of sections cut through the asterisk of the embodiment above at a given position, during one cycle of operation, while FIG. 13F illustrates the corresponding cycle of operation.

FIG. 14 and FIGS. 15A-D illustrate a non-free-flow application of the asterisk, in accordance with another embodiment of the present invention. The asterisk is encased in a rigid tube 20 that takes the form of the extruded profile of the asterisk. Flowing fluid is channeled through a restricted space enclosed on all sides by the rigid tube 20. The inner dimensions of this rigid tube 20 can be defined by wave amplitude 21 of the three fronds 2, as shown in FIG. 15D. Dimensioned in this way, the rigid tube 20 restricts the passage of fluid so that a minimum amount of fluid is able to bypass the fronds 2 without exerting a force upon them. FIGS. 15A-C show three sections cut through the asterisk at the same position during one half of a cycle of operation.

Figure 16A:
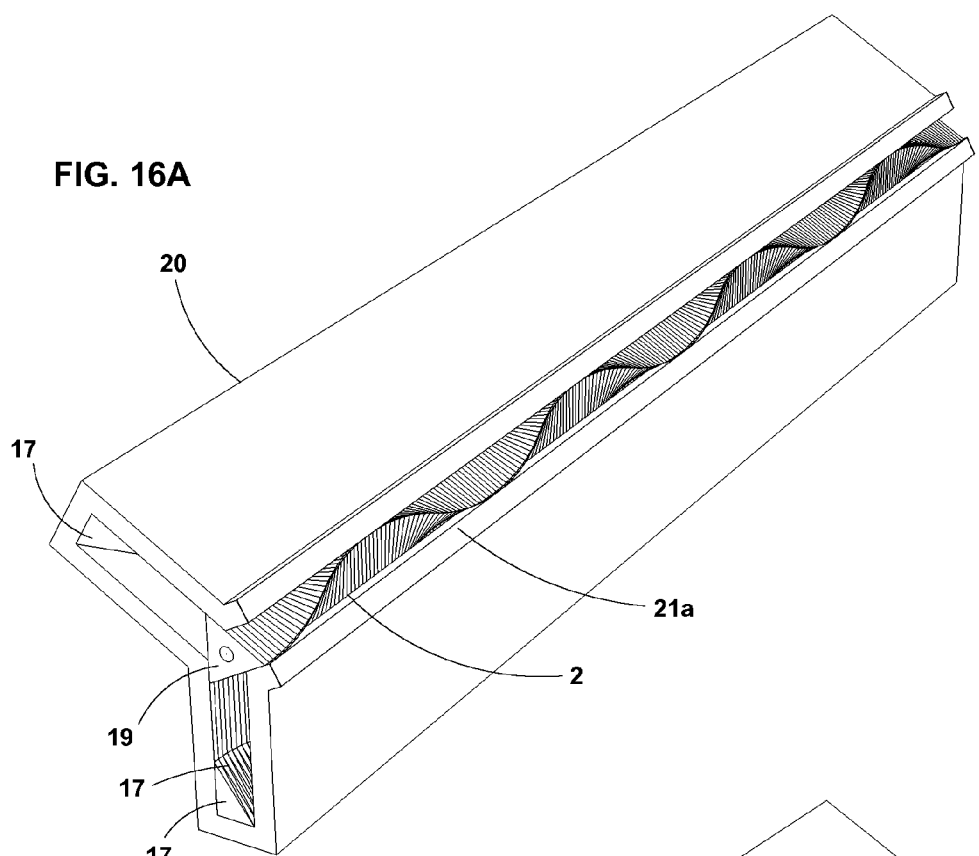
FIGS. 16A-B illustrate a series of moving pockets formed inside a rigid tube, in accordance with an embodiment of the present invention.
Figure 16B:
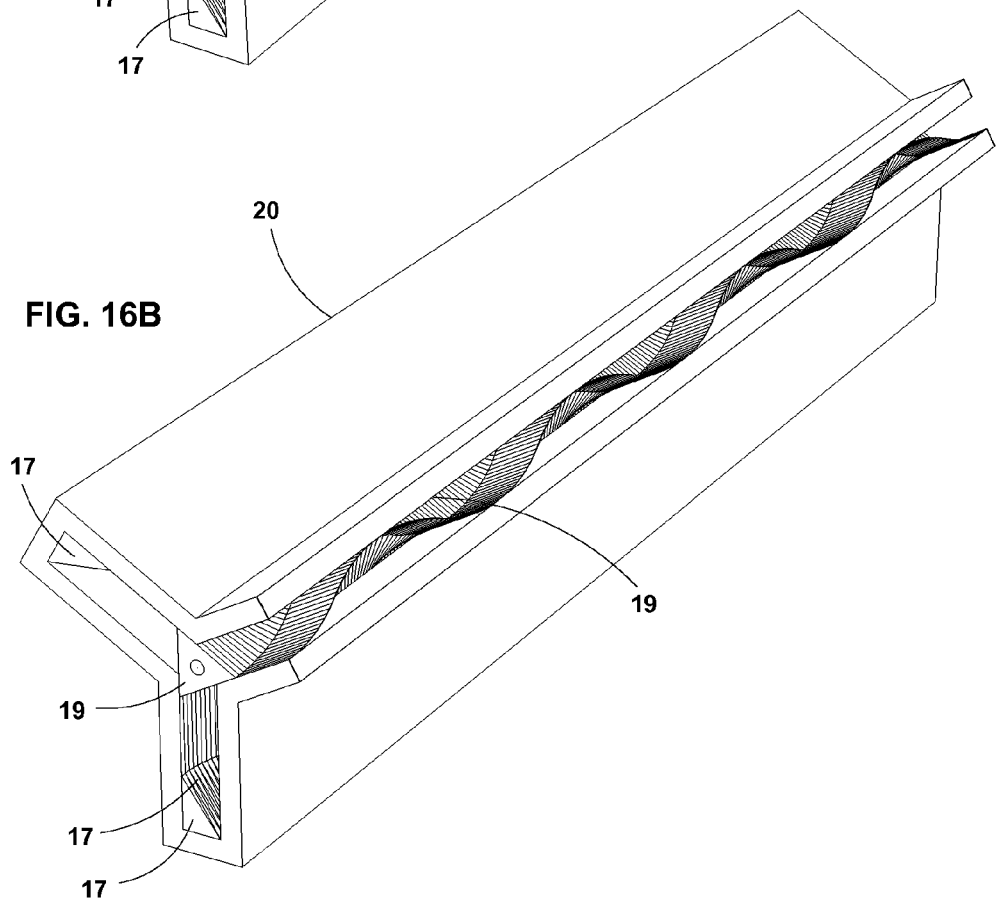

FIGS. 16A-B illustrates a series of moving pockets formed inside the rigid tube 20. Fluid entering the rigid tube 20 is enclosed in the series of moving pockets. Consequently, the pressure on each wave undulation of a frond 2 is transferred to the next downstream wave undulation through the incompressible fluid in a pocket 21a between the alternating wave undulations. Fluid pressure at a first wave undulation overcomes the resistance in the first wave undulation. Fluid pressure at the next wave undulation is reduced, and so on for each successive wave down the frond 2. In an application where the asterisk is subject to very high fluid pressures, the fronds 2 can have very large number of wave undulations so as to provide appropriate resistance.

The asterisk embodiment described above as a non-free-flow mechanism, and illustrated in FIGS. 14-16B, is nevertheless much less destructive to fish and other aquatic mammals than a conventional hydro-turbine. Depending on the speed of water flow through the mechanism, fish migration upstream is still possible, in principle, thus overcoming one of the negative environmental impacts of traditional hydro-electric installations.

Pattern: Polygonal Ring

Figure 17:
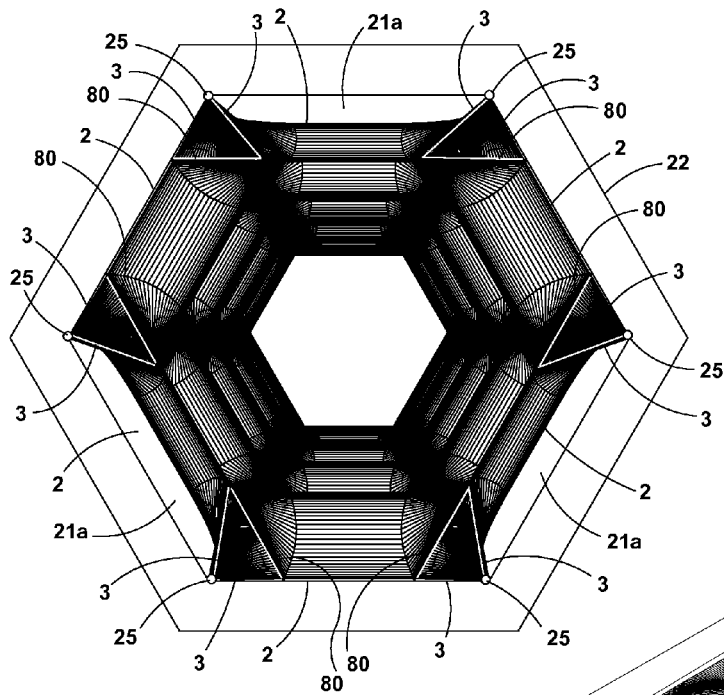
FIGS. 17-18 illustrate a hexagonal ring formed by six fronds, in accordance with yet another embodiment of the present invention.
Figure 18:
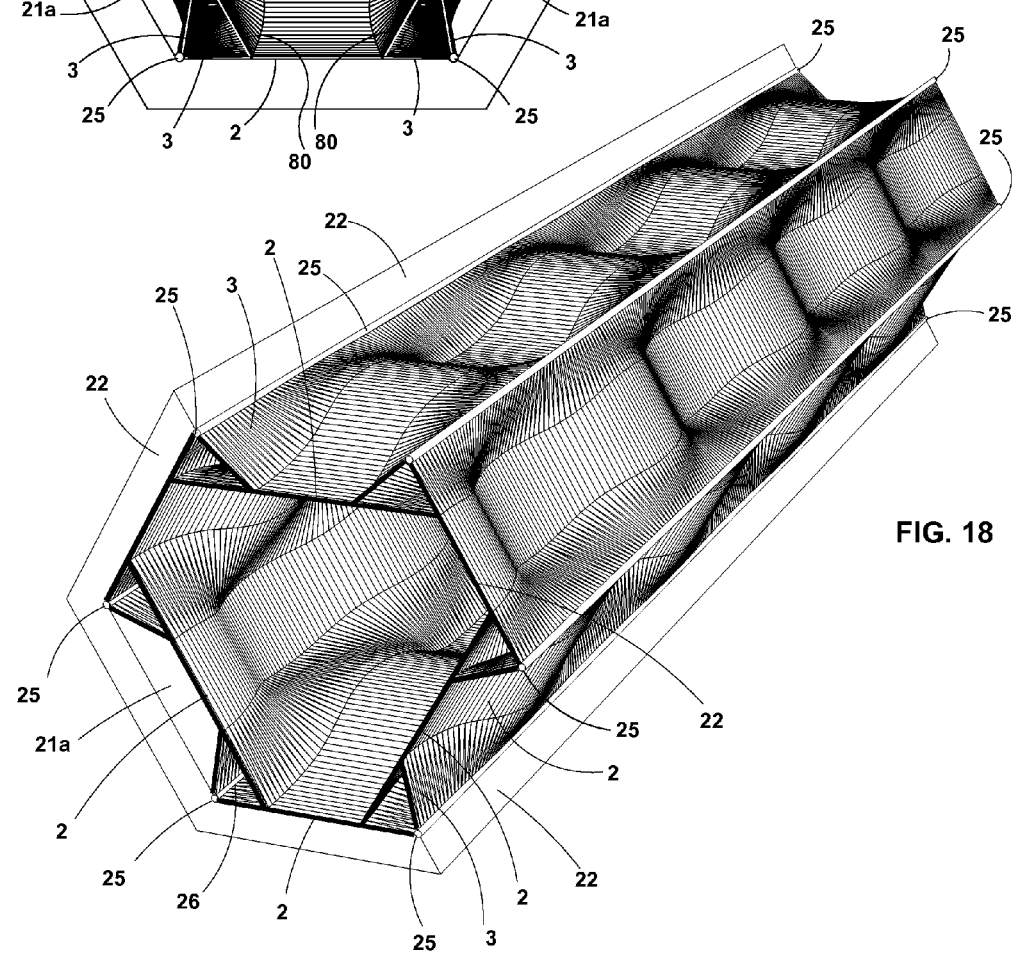

In accordance with yet another embodiment of the present invention, a plurality of fronds 2, crenated strips 3 and restraining components are arranged in a polygonal ring. A hexagonal ring is chosen here for simplicity but rings with a greater or lesser number of sides are intended to be included in this embodiment. Each frond 2 is mechanically coupled to two other fronds through a flexible band 80 and crenated strips 3 such that the fronds 2, flexible bands 80 and crenated strips 3 form a tube that in cross-section forms a hexagon or dodecahedron, depending on the position of the cross-section within the cycle of operation as shown in FIGS. 20A-1. FIGS. 17-18 illustrate a ring formed by six fronds 2.

The crenated strips 3 are mechanically coupled to a sixth restraining component from the restraining components. The sixth-restraining component is a hexagonal outer-casing 22 which takes the form of an extruded hexagon and is composed of a rigid material. The fronds are connected to the crenated strips 3 which are connect continuously along the inside corners of the outer-casing 22 via a hinged or flexible connection 25. Each frond 2 is also connected continuously along both edges via flexible bands 80 to the fronds 2 on either side of it. The junctions of two adjacent fronds and the sixth restraining component, via flexible strips 3 and flexible bands 80, form a triangular tube 22a which takes the form of a triangle in cross section. FIG. 19 illustrates this triangular tube 22a.

FIGS. 20A-I illustrate a series of cross-sections at a given point during one cycle of operation; and FIG. 21 illustrates the corresponding cycle of operation, in accordance with this embodiment of the present invention. One cycle of operation is defined here as the travel of a single wave from outset through transition to the point where this wave takes the position formerly occupied at outset by the next downstream wave.

The wave undulations of the fronds 2 travel along the fronds 2 in the direction 5 of the fluid flow. As a series of undulations pass along the material, a series of stresses pass along the material, from which electrical energy is harnessed. The wave undulations of each frond 2 are out-of-phase with wave undulations of adjacent fronds 2. The triangular cross-sections rotate clockwise and counter-clockwise, accommodating the wave undulations of the fronds 2 and maintaining the synchronization of wave undulations between the fronds 2.

In yet another embodiment of the polygonal ring pattern, a rigid plate 26 closes-off the opening of the triangular tube 22a to the flow of water, and a series of rigid plates 26 is stacked parallel to this rigid plate 26 along the length of the triangular tube 22a.

The rigid triangular plates 26 used to close the triangular tube may also be elastic. It should be noted that rigid and elastic plates affect the behavior of the fronds 2 differently in multiple ways that do not affect the overall principles embodied in the present invention, and therefore, do not need to be described in detail. One affect of utilizing rigid as opposed to elastic plates is that the widths of the fronds 2 will increase and decrease slightly in a periodic manner corresponding to the cycles of operation.

FIG. 22 and FIGS. 23A-B illustrate a non-free-flow application of the polygonal ring, in accordance with yet another embodiment of the present invention using rigid plates 26. Flowing fluid is channeled through a restricted space enclosed on all sides, such as an opening in the wall 25a of a dam. Each triangular cross-section is closed by a plurality of plates stacked along a longitudinal axis, preventing the fluid from entering the triangular cross-sections. A second rigid hexagonal tube 27, forming a seventh restraining component, is set within the first rigid hexagonal tube 22 so that the fronds occupy a ring of space between the first rigid hexagonal tube 22 and the second rigid hexagonal tube 27. The upstream end of the second rigid hexagonal tube 27 is closed by a cap 28 to the flow of fluid. In this way, the flowing fluid is forced to enter only through the ring of space occupied by the hexagonal ring of fronds. The inner rigid tube 27 is secured by secondary members 29 to the outer rigid tube 22.

FIG. 23C illustrates yet another polygonal ring embodiment in which the rigid triangular plates 26 are mechanically coupled to a ratcheted axle 90 as described above in the asterisk embodiments of this invention which utilizes a ratcheted axle 90, whereby rotational movement clockwise and counter-clockwise is mechanically coupled to an electromagnetic generator or other power-receiving output device, such as a pump. In embodiments containing an axle 90, the axle 90 serves as the fifth restraining component.

The polygonal ring embodiment described above as a non-free-flow mechanism, and illustrated in FIGS. 22-23B, is nevertheless much less destructive to fish and other aquatic mammals than a conventional hydro-turbine. Depending on the speed of water flow through the mechanism, fish migration upstream is still possible, in principle, thus overcoming one of the negative environmental impacts of traditional hydro-electric installations.

Pattern: Dodecahedral Honeycomb

In accordance with still another embodiment of the present invention, a plurality of fronds 2, flexible or elastic strips 31 and restraining components are arranged in a dodecahedral honeycomb. The "cells" of the honeycomb are dodecahedral tubes 30 having six sides which are fronds 2, and another six sides which are flexible or elastic strips 31. Each frond 2 is mechanically coupled to flexible or elastic strips 31 along the length of both edges of the frond 2. A plurality of dodecahedral tubes 30 aligned parallel to each other, and laterally connected to each other, comprise the dodecahedral honeycomb. In cross-section, each tube 30 takes the form of a dodecahedron whose cross-sectional shape changes through time during one cycle of operation in a manner which is repeated with each cycle of operation. FIGS. 24A-E illustrate a series of sections cut through a dodecahedral tube 30 at a given point, during one half of a cycle of operation; and FIG. 24F illustrates the corresponding one half of a cycle of operation, in accordance with this embodiment of the present invention.

For this dodecahedral honeycomb embodiment, the wave undulations of each frond 2 of a tube 30 are out-of-phase with the wave undulations of its adjacent two fronds 2. The wave undulations of three fronds 2c of a tube 30 are synchronized with each other, and are out-of-phase with the wave undulations of the other three fronds 2d of a tube 30. The wave undulations of the other three fronds 2d are synchronized with each other. The force of fluid flowing through the polygonal ring 30 causes the wave undulations to travel down the lengths of the fronds 2 in the direction 5 of the flowing fluid. The sum of the lengths of the sides of the dodecahedron remains substantially the same at any point during the cycle of operation because the overall diameter of the dodecahedral tube 30 does not change during operation. When three of the fronds 2 comprising the tube 30 bulge outwards their most, the other three fronds 2 comprising the tube 30 bulge inwards their most. In this embodiment of the dodecahedral honeycomb, only the elastic strips 31 change in dimension, with a correlating minor change in the sum of the lengths of the sides of the dodecahedron.

Figures 25A, 25B:
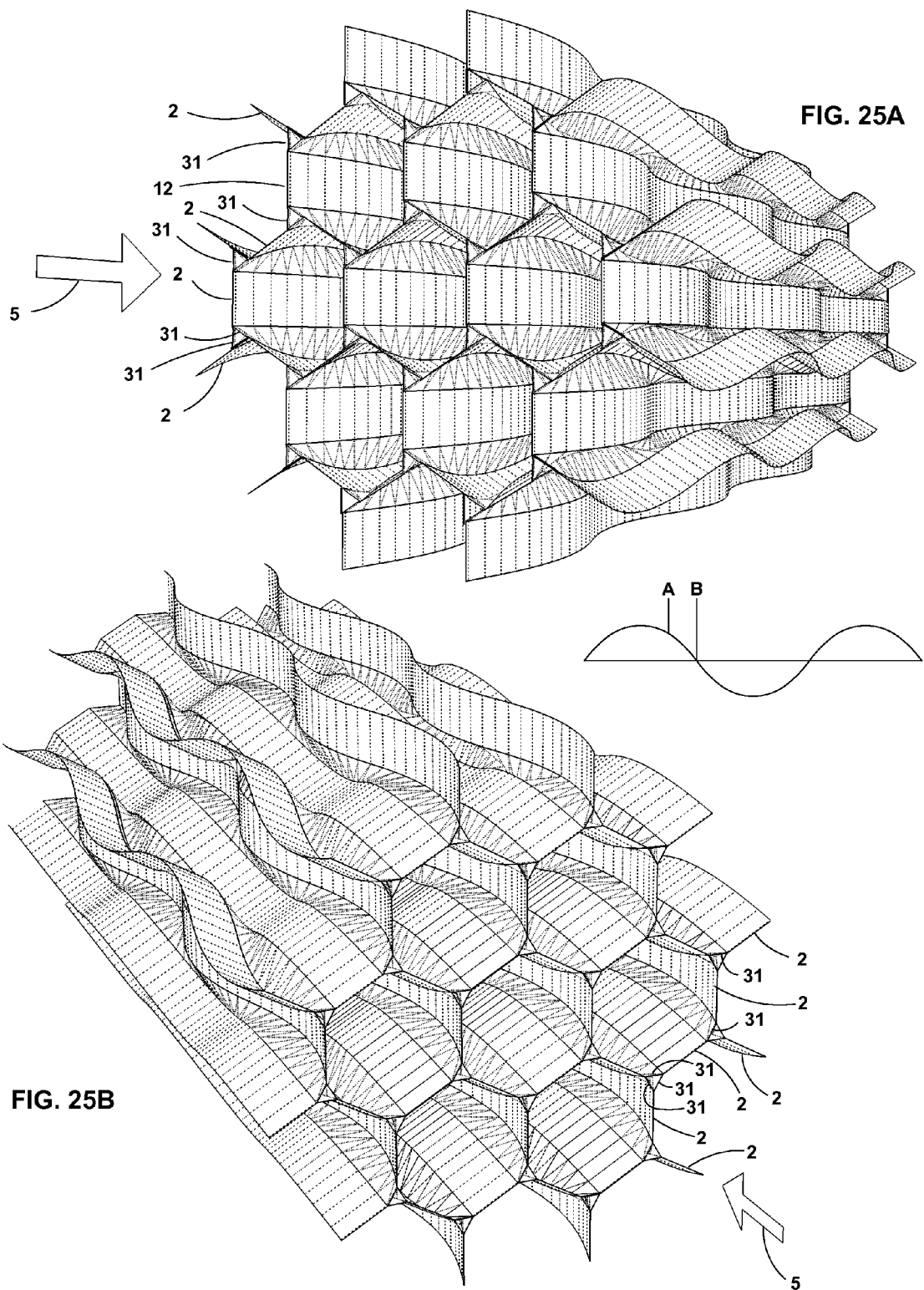
FIGS. 25A-B illustrate two sections cuts through a dodecahedral honeycomb formed by a plurality of dodecahedron-shaped tubes, each tube comprised of a ring of fronds and connecting strips, at two different positions within a cycle of operation, in accordance with still another embodiment of the present invention.
Figure 27A:
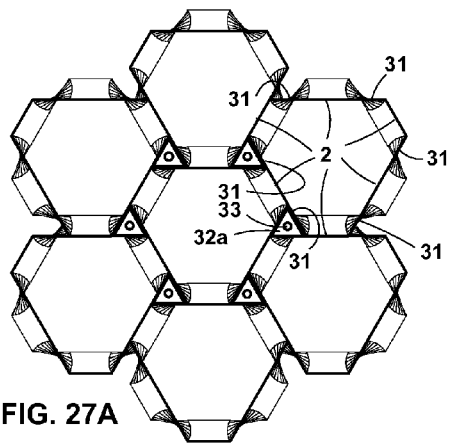
FIGS. 27A-E illustrate a series of sections cut through the dodecahedral honeycomb at a given position, during one half cycle of operation, in accordance with another embodiment of the present invention, and FIG. 27F locates that position within the one half cycle of operation.
Figure 27B:
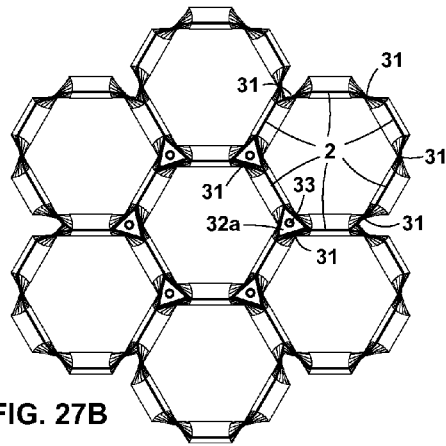
Figure 27C:
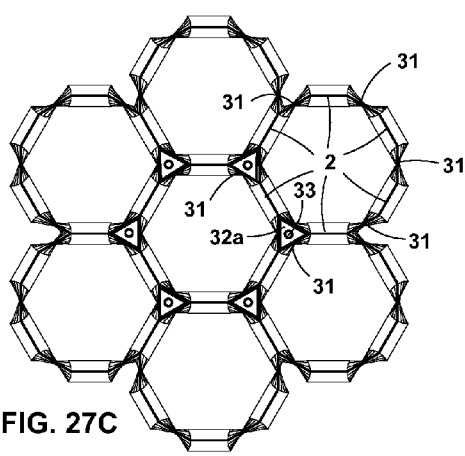
Figure 27D:
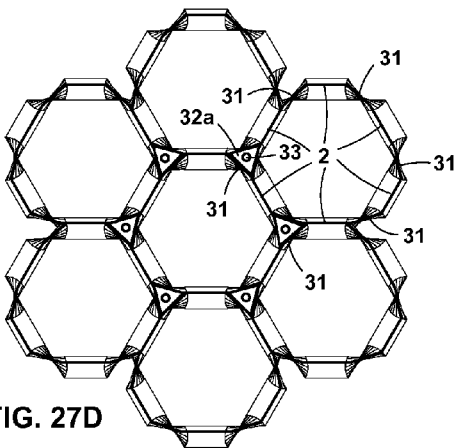
Figure 27E:
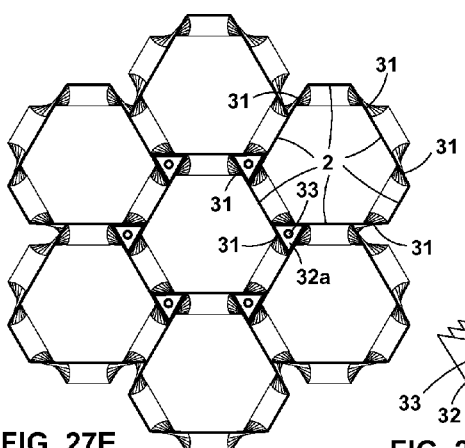
Figure 27F:
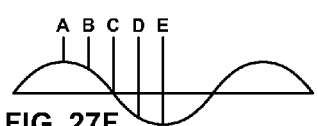

FIGS. 25A-B illustrate two sections cuts through a dodecahedral honeycomb formed by a plurality of dodecahedral tubes 30 at a given point, in accordance with an embodiment of the present invention. Each dodecahedral tube 30 shares one of its six fronds 2 with a frond 2 from each of the six dodecahedral tubes 30 surrounding it. The junctions of three dodecahedral rings 30 form a plurality of triangular cross-sections, which include three connecting elastic strips 31 connecting to one frond 2 from each of the three dodecahedral tubes 30. Since each dodecahedral tube 30 shares fronds 2 with six surrounding dodecahedral tubes 30, synchronicity of the wave undulations in all the dodecahedral tubes 30 is maintained during each cycle of operation.

FIGS. 26 A-I illustrate a series of sections cut through the dodecahedral honeycomb at a given position, during one cycle of operation, in accordance with an embodiment of the present invention. A cycle of operation is defined as the travel of a single wave from outset through transition to its original position. FIG. 26J illustrates points of section cuts during this cycle of operation. Each cross-section taking the form of a triangle is closed by a plurality of plates 32 stacked along the longitudinal axis. During a cycle of operation, the plates 32 rotate clockwise and counter-clockwise in a manner that correlates to the phases of the fronds 2 attached to each of these plates 32. With reference to FIGS. 26 A-I, the plates 32 are elastic, and therefore, shrink and expand during each cycle of operation.

FIGS. 27A-E illustrate a series of sections cut through the dodecahedral honeycomb at a given position, during one half cycle of operation, in accordance with another embodiment of the present invention, in which the plates 32a are rigid. During operation, the size of each plate 32a remains constant, thereby necessitating a slight stretching and shrinking of the width of the fronds 2 with the rotation of the plates 32a.

The eighth restraining component is a plurality of hollow tubes 33 passing through the plurality of rigid plates 32a of each triangular cross-section along the longitudinal axis. The hollow tubes 33 allow rotational flexing, but are non-elastic along their longitudinal axis and are capable of receiving high tension strains. These tubes 33 act as a restraining component that keeps the potential energy of the applied force 72 within the fronds 2, thereby preventing the fronds 2 from straightening-out and losing their wave undulations. The tubes 33 also serve as principal conduits for electrical wiring associated with the transfer of harnessed electricity.

Figures 28A, 28B, 28C:
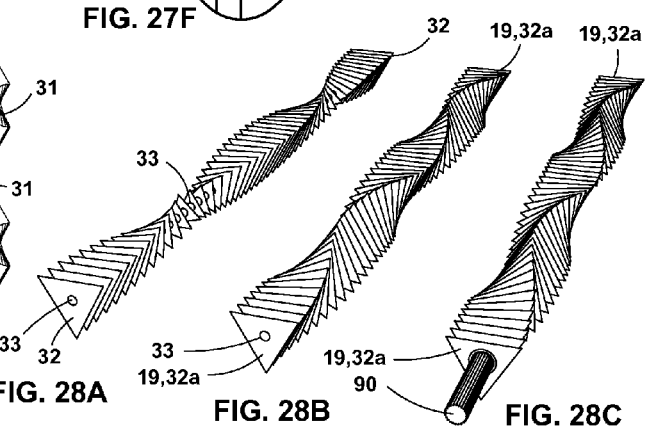
FIG. 28A illustrates the arrangement of elastic plates in accordance with an embodiment of the present invention.
FIG. 28B illustrates the arrangement of non-elastic plates, in accordance with another embodiment of the present invention.
FIG. 28C illustrates the mechanical coupling of rigid plates to an axle for mechanical power output, in accordance with an embodiment of the present invention.

FIG. 28A illustrates the arrangement and sizes relative to each other, of elastic plates 32, in accordance with an embodiment of the dodecahedral honeycomb described above. FIG. 28B illustrates the arrangement of non-elastic plates 32a, in accordance with another dodecahedral embodiment. The sizes of the plates 32a relative to the lengths of the fronds 2 in cross-section, and the degree of clockwise and counter-clockwise rotation can vary. All such variations are consistent with the principles laid out in the present invention, though not specified in detail.

Figure 28D:
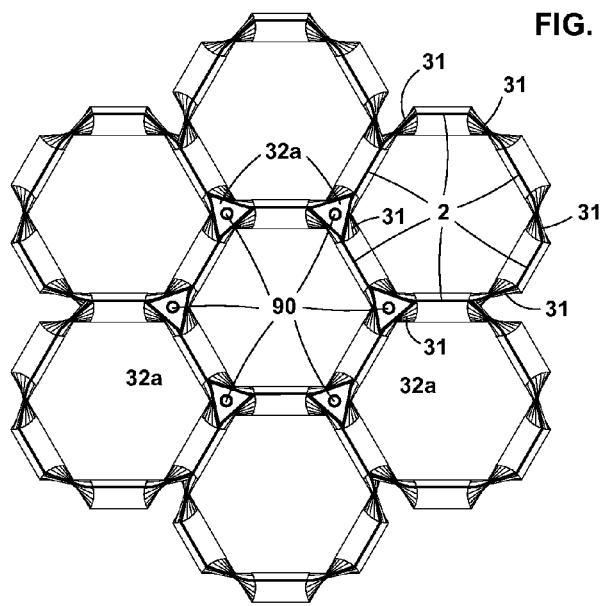
FIG. 28D illustrates the relationship of a dodecahedral tube with rigid plates and an axle to surrounding dodecahedral tubes in an embodiment of the present invention.

FIG. 28C illustrates the defining component of yet another embodiment in which the rigid plates 32a are mechanically coupled via a ratchet system to an axle 90, thereby transferring the rotational movement of the plates 32a clockwise and counter-clockwise, into a uni-directional rotation of the axle 90, FIG. 12F. The axle is mechanically coupled to an electromagnetic generator or other power-receiving output device. The relationship of a dodecahedral tube 30 with rigid plates 32a and axle 90 to surrounding dodecahedral tubes is shown in FIG. 28D. In embodiments where an axle 90 is present, the axle 90 forms the fifth restraining component.

Figure 29:
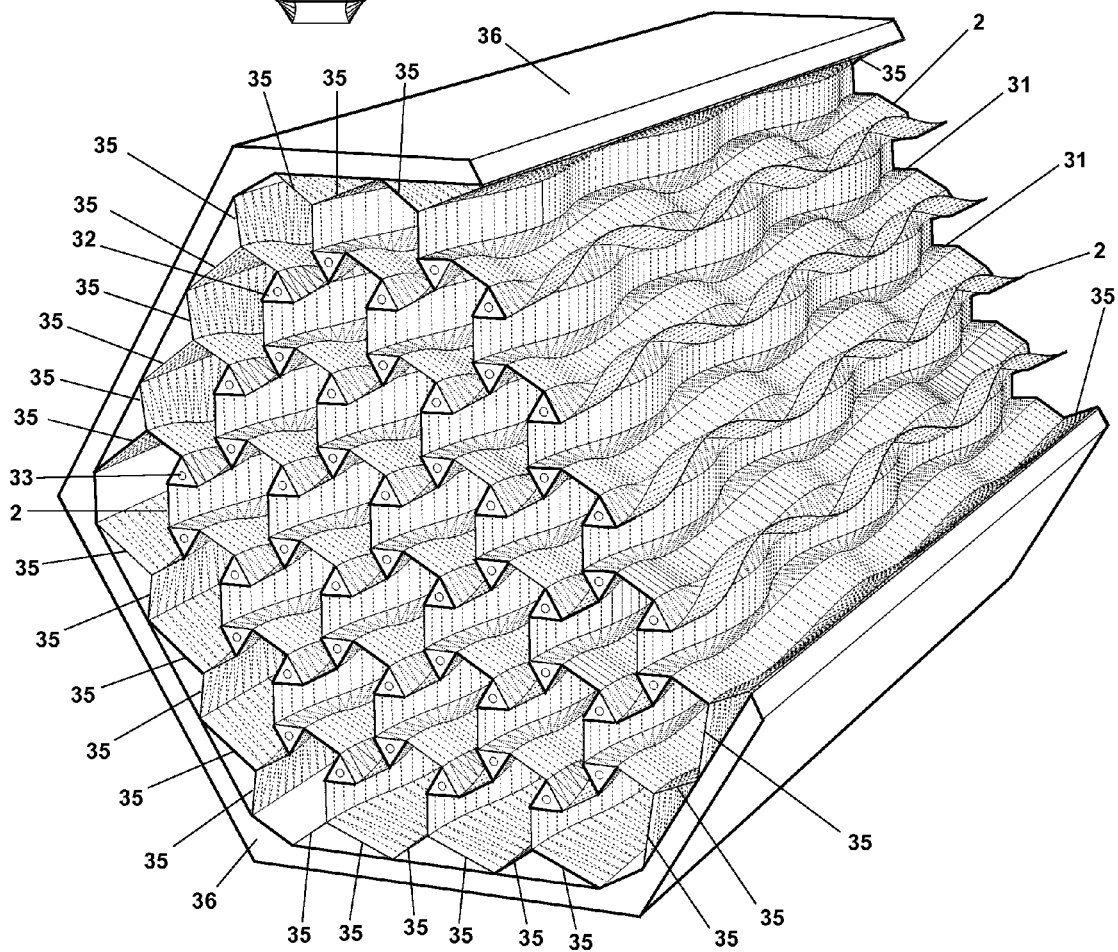
FIG. 29 illustrates how the dodecahedral honeycomb is restrained, in accordance with an embodiment of the present invention.

FIG. 29 illustrates how the dodecahedral honeycomb embodiment is restrained, in accordance with an embodiment of the present invention. The dodecahedral honeycomb is restrained by an ninth restraining component from the restraining components. The ninth restraining component is a polygonal outer-casing 36 or rigid frame. Further, the open central portions of the dodecahedral tubes 30 that receive the flow of fluid can be closed with a tenth restraining component, such that each dodecahedral tube 30 surrounds a corresponding tenth restraining component. The tenth restraining component can be rigid polygonal tubes 27 as described above, where said rigid tubes 27 are fixed to each other and to the polygonal outer-casing 36 via secondary members 29. These rigid tubes are closed with a cap 28, similar to the polygonal ring embodiment shown in FIGS. 23A-C. The maximum degree of undulations of the fronds 2 of the dodecahedral tubes 30 aligns with the spaces between rigid polygonal tube 27 and adjacent rigid polygonal tubes 27, thereby restricting the available paths down which the fluid can travel to the spaces occupied by the fronds 2.

Depending on the speed of water flow and on the number of dodecahedral tubes 30 in the dodecahedral honeycomb embodiment, an additional secondary structure connecting all rigid polygonal tube 27 and fixed to the polygonal rigid outer-casing 36. This would be a familiar structure of beams or trusses and is not shown here for simplicity's sake.

Dodecahedral tubes 30 that are at the extremity of the honeycomb share fronds 2 with four instead of six other dodecahedral tubes 30. These edge-condition dodecahedral tubes 30 are continuously connected via flexible or elastic crenated strips 3 to the polygonal outer-casing 36.

Figure 29A:
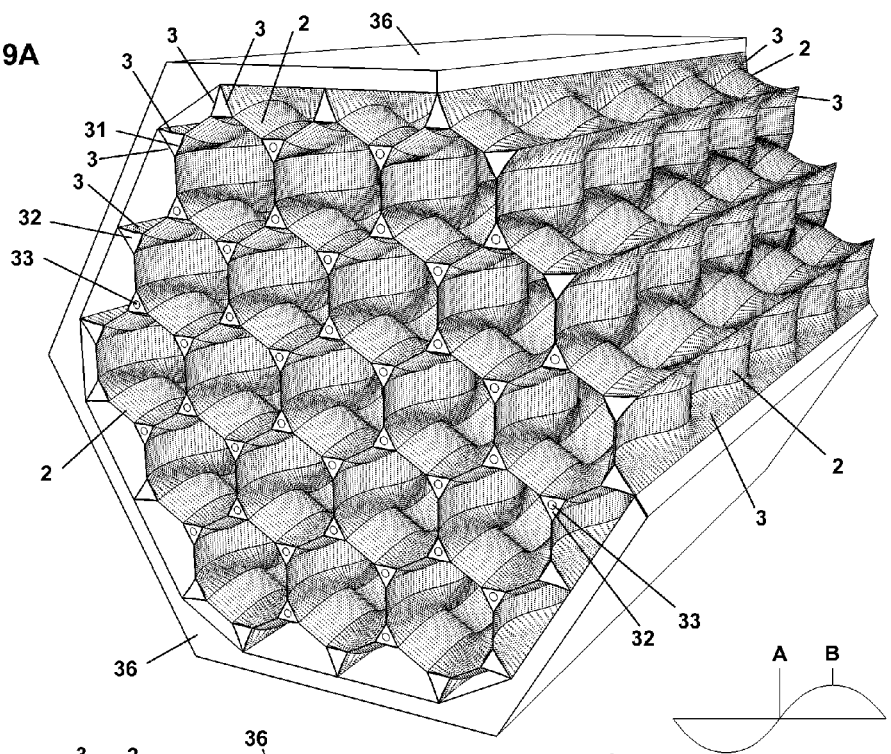
FIGS. 29A-B illustrate how the dodecahedral honeycomb is attached to a polygonal outer-casing, in accordance with yet another embodiment of the present invention.
Figure 29B:
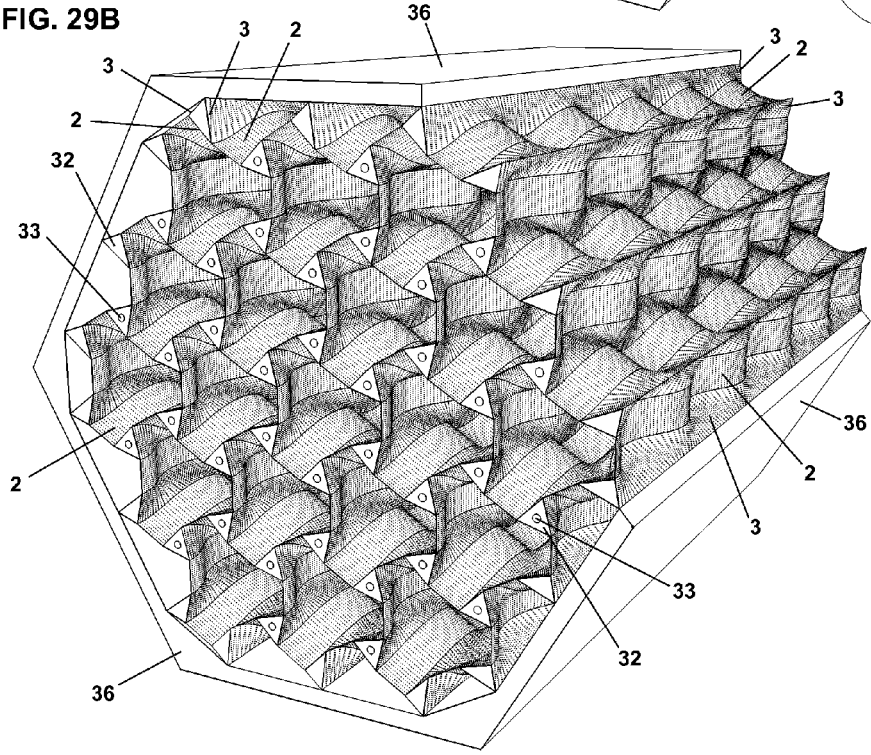

FIGS. 29A-B illustrate how the dodecahedral honeycomb is attached to the polygonal outer-casing 36, in accordance with yet another embodiment of the present invention. Each edge-conditional dodecahedral tube is connected via two flexible or elastic crenated strips 3 to the polygonal outer-casing 36. The two crenated strips 3 are also connected to longitudinal edges of a flexible or elastic strip 31 which connects one frond 2 to another frond 2 within a single dodecahedral tube 30. The two flexible or elastic crenated strips 3 and the flexible or elastic strips 31 form a triangular cross-section, which rotates partially clockwise and counter-clockwise during operation.

The number of dodecahedral tubes 30 that can be included in a dodecahedral honeycomb depends on material strengths, the fluid flow speed and other parameters. Depending on these parameters, a secondary supporting frame can be affixed to the polygonal outer-casing 36 at the upstream-end of the mechanism as described above. In embodiments without the rigid polygonal tube 27, this supporting frame can be attached to each dodecahedral tubes 30 via the hollow tubes 33, transferring operating loads from the fronds 2 and hollow tubes 33 to the polygonal outer-casing 36.

FIGS. 30A-B illustrate the minimum length of the dodecahedral tubes 30, in accordance with an embodiment of the present invention. The minimum length of the dodecahedral tubes 30 utilizes one half of a cycle of operation. It should be noted here that the maximum length of the dodecahedral tubes 30 and the maximum number of wave undulations are not determined.

Pattern: Octagonal Honeycomb

Figure 30C:
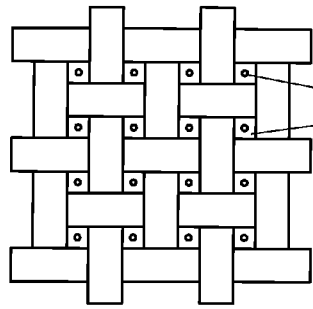
FIGS. 30C-G illustrate a series of sections cut through the same point during one half of a cycle of operation, in accordance with another embodiment of the present invention.
Figure 30D:
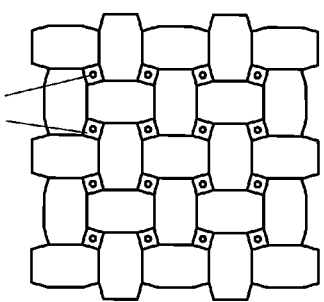
Figure 30E:
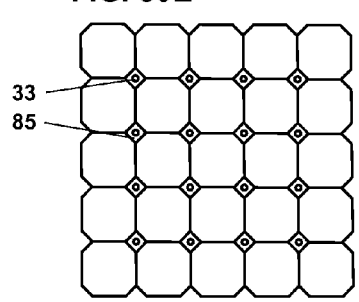
Figure 30F:
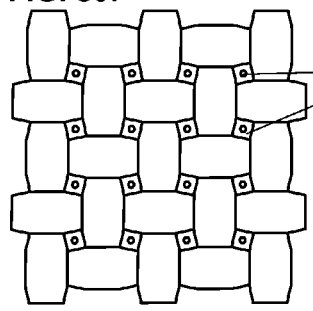
Figure 30G:
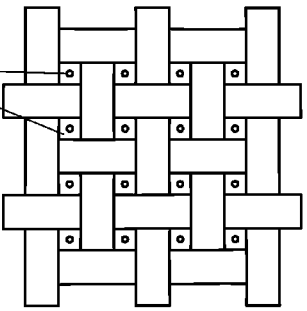
Figure 30H:
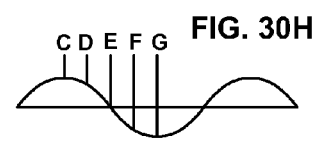
FIG. 30H illustrates the position of a series of section cuts within half a cycle of operation, in accordance with an embodiment of the present invention.
Figure 30J:
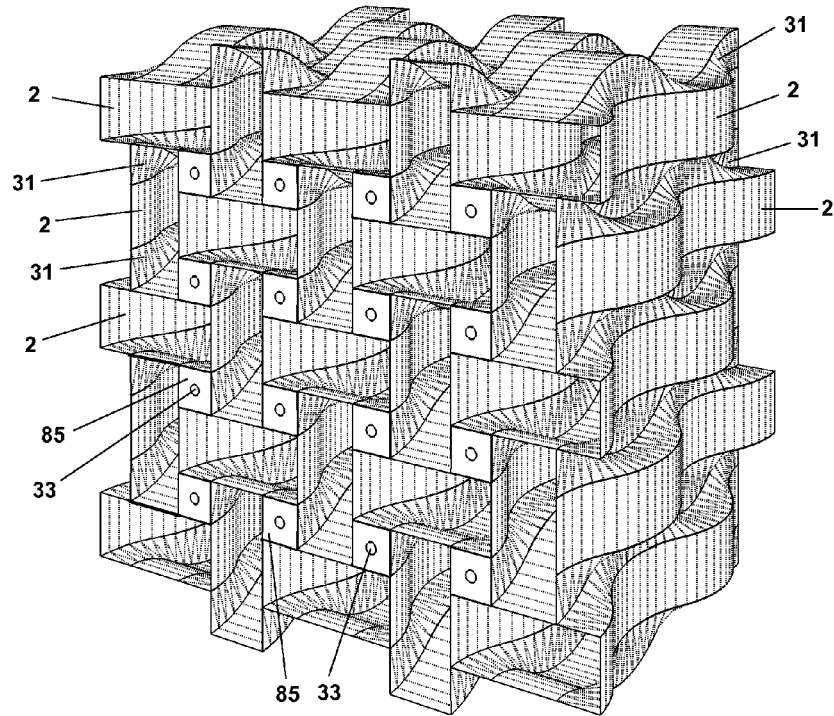
FIGS. 30A-B illustrate the preferred minimum portion of the wave cycle utilized for dodecahedron-shaped tubes, in accordance with another embodiment of the present invention.

The octagonal honeycomb embodiment illustrated in FIG. 30J is included to demonstrate that embodiments of the present invention comprised of fronds 2 arranged into tubes are not limited to the dodecahedral honeycomb embodiment, and that tubes with any number of sides are included in the scope of this invention. In this embodiment, four fronds 2 are arranged in a ring connected to four elastic connecting strips 31. The fronds 2 are each connected to one another via connecting strips 31, creating an octagonal tube. Four connecting strips together form a small square tube, which may be open to the flow of water or closed by elastic plates 85, which are repeated in a series parallel to each other and along the length of the axis of the square tube. These plates 85 rotate clockwise and counter-clockwise as the wave undulations pass along the fronds 2. Passing through these plates and secured to each are small hollow tubes 33 described above as the eighth restraining component in the dodecahedral honeycomb embodiment.

These tubes 33 allow twisting clockwise and counter-clockwise but are non-elastic in their longitudinal direction, preventing the fronds from lengthening to their relaxed states.

FIGS. 30C-30G illustrate a series of sections cut through the same point during one half of a cycle of operation, in accordance with this octagonal honeycomb embodiment of the present invention. FIG. 30H illustrates the position of a series of section cuts within this half a cycle of operation. If these plates 85 described above are rigid, and mechanically coupled through a ratchet mechanism to an axle 90, the rotational movements of the plates clockwise and counter-clockwise can be used to rotate the axles 90, whereby rotational movement in one direction is mechanically coupled to an electromagnetic generator or other power-receiving output device.

As mentioned above, a second group of patterns consists of two different hexagonal honeycomb embodiments and a concentric ring embodiment. Whereas in the first group the frond 2 is a component in all embodiments of the group, there are no fronds in this second group. The widths of ribbons comprising the fronds of the first group remain constant under operation in some described embodiments, and change only slightly in others. Therefore, the sides of tubes comprised of fronds remain fairly constant in width, changing primarily in position, during each cycle of operation. By contrast in this second group described as hexagonal honeycombs and concentric rings, wave bulges in the material comprising the tubes cause the material to expand and contract both longitudinally and laterally. Therefore, the diameters of the tubes comprising these embodiments increase and decrease during each cycle of operation.

FIGS. 31A-D illustrate how wave undulations are formed in a circular tube 37. It should be noted here that an example of a circular tube has been taken, instead of a hexagonal tube for simplicity's sake, but the principles described here apply to the hexagonal tubes of the hexagonal honeycomb embodiments as well as the circular tubes of the concentric ring embodiments. If an elastic circular tube 37 of a given length 37a has a first force 37c applied perpendicular to the longitudinal axis of the circular tube 37, such that the force 37c bulges-out the circular tube 37 about its circumference, the circular tube 37 will shorten in length. The circular tube 37 will return to its original shape and length, when the first force 37c is removed. However, if a second force 37d is applied such that the longitudinal dimension of the circular tube 37 is restrained, the circular tube 37 is prevented from returning to its original shape. Therefore, the first force 37c remains as potential energy within the circular tube 37. If a sufficient third force 37e is then applied in a direction parallel to the axis of the circular tube 37, and therefore, obliquely to the face of the wave undulation, the position of the wave undulation will travel in the direction of this third force 37e. When the wave undulation moves off the end of the circular tube 37, the potential energy stored in the circular tube 37 from the first force 37c has not been not removed from the circular tube 37. Therefore, a new wave undulation emerges so that the potential energy of the circular tube 37 remains constant, as long as the circular tube 37 is restrained from returning to its original shape.

FIGS. 31E-G illustrate a plurality of circular tubes 37 are arranged parallel to each other. The circular tubes 37 are placed adjacent to one another so that one tube 37 is surrounded by other tube 37, running parallel to it. The first force 37c is applied perpendicular to the axis of the circular rings 37 in a series of evenly spaced locations, both inward and outwards, and in a manner so that each tube 37 has a series of wave undulations that are out-of-phase with tubes 37 adjacent to it. If the tubes 37 are restrained by the second force 37d as described above, the circular rings 37 are prevented from returning to their original shape. In this way, the first force 37c remains as potential energy within the tubes 37. If a sufficient third force 37e is applied in a direction parallel to the axis of the tubes 37, and therefore, obliquely to the faces of the wave undulations in the tubes 37, the positions of the wave undulations travel in the direction of this third force 37e. Since the potential energy held within the tubes 37 has not been removed after a wave undulation moves off the end of the tubes 37, a new wave undulation forms at the upstream end of each tube 37 as a wave undulation moves off the end of the tubes 37.

Because each tube is out-of-phase with all the tubes adjacent to it, the multiple undulations of a single tube resist converging into a single larger bulge in the tube, because each wave bulge one side of the mid-point of a wave cycle is isolated by adjacent wave bulges that are on the opposite side of the neutral axis. Therefore, when anchored in a flowing fluid whose movement is parallel to the longitudinal axis of the tube, the wave undulations will move along the tube in the direction of the moving fluid. As a series of wave undulations move along the tube, a corresponding series of strains in the material move along the tube, which are converted from mechanical strain within the material into electrical energy, when utilizing an appropriate material exhibiting an electrical response to mechanical strain within that material.

Pattern: First Hexagonal Honeycomb

FIG. 32 illustrates two distinct types of hexagonal tubes, in accordance with the first hexagonal honeycomb embodiment of the present invention. Six elastic sheets, or six elastic multi-layered sheet, or six elastic woven sheets or six elastic sheets of some other composite material, are connected continuously along their edges to form a hexagonal tube. A first force 37c is applied adjacent to the central axis of the hexagonal tubes so as to create undulations as described above and illustrated in FIGS. 31A-G. Two distinct types of hexagonal tubes, defined here as a Type A hexagonal tube 38 and a Type B hexagonal tube 39, are created by different application of the first force 37c, creating a series of wave undulations along their longitudinal axes. Because these hexagonal tubes are pre-stressed as and restrained described above and as shown in FIGS. 31A-G, they maintain a series of wave undulations along their longitudinal axes. The force 37e of fluid flowing through the polygonal rings causes the positions of the wave undulations to travel down the polygonal tubes in the direction of the fluid flow.

The hexagon defined by a section cut through the Type A hexagonal tube 38 is an equilateral hexagon. During once cycle of operation, the diameter of the Type A hexagon section cut expands and contracts as the wave undulation passes through the region of the section cut.

The sides of the hexagon defined by a section cut through the Type B hexagonal tube 39 vary in size and in proportion to each other over time during one cycle of operation. Each of the six sides of this hexagon lengthens and shortens in synchronization with two other sides of the hexagon. Therefore, at all times during operation, three sides of the hexagon are at one equal length and three sides of the hexagon are at another equal length. Three sides 46 of the hexagon formed by a section cut through the Type B hexagonal tube 39 stretch laterally only, in accordance with an embodiment of the present invention. A hollow tube 47 capable of withstanding high tensile forces passes through the longitudinal axis of each of these three sides 46. These hollow tubes 47 are an eleventh restraining component which, being in tension, maintains the force 37d, thereby preventing the Type B hexagonal tube 39 from lengthening and returning to its relaxed, non-undulating state. The hollow tubes 47 also serve as a principle conduit for electrical wiring associated with the transfer of harnessed electricity.

FIG. 32A illustrates the position of section cuts during one cycle of operation; and FIGS. 33A-I illustrate a corresponding series of sections cut through the same point during one cycle of operation.

FIG. 34A and FIG. 35 illustrate how a first hexagonal honeycomb is formed by a plurality of Type A hexagonal tubes 38 and a plurality of Type B hexagonal tubes 39, in accordance with this embodiment of the present invention. Each hexagonal tube shares each of its six sides with one side of the six polygonal rings that surround it. Each Type A hexagonal tube 38 is surrounded by six Type B hexagonal tubes 39, and shares one of its sides with one side each of these six Type B hexagonal tubes 39. Each Type B hexagonal tube 39 shares three of its sides with one side of three Type A hexagonal tubes 38, and shares its other three sides with one side of three Type B hexagonal tubes 39.

Since the Type B hexagonal tubes 39 are restrained and share sides with Type A hexagonal tubes 38, the Type A hexagonal tubes 38 are also restrained. Further, the wave undulations of the Type A hexagonal tubes 38 and Type B hexagonal tubes 39 are out-of-phase with each other. FIGS. 34A-C illustrate a series of sections cut through the honeycomb at the same point, during one half of a cycle of operation.

Half of the outermost hexagonal tubes 41 are bisected by an elastic membrane 42 and half of the outermost hexagonal tubes 43 share one of their six sides with the elastic membrane 42. Beyond this elastic membrane is a rigid outer-casing 44 which takes the form of an extruded hexagon. Flexible strips 45 connect the elastic membrane 42 to this rigid outer-casing 44. The edges of the flexible strips 45 that connect to the rigid outer-casing 44 form straight lines, while the edges of the flexible strips 45 that connect to the elastic membrane 42 form waves corresponding to the connecting hexagonal tubes on the other side of the elastic membrane 42.

Depending on the material strengths, the fluid flow speed and other parameters, a secondary supporting structure or frame is affixed to the rigid outer-casing 44 at the upstream-end, and is also fixed to the upstream end of the hollow tubes 47, thereby transferring loads from the small rigid tubes 47 to the rigid outer-casing 44. This secondary supporting structure or frame would be of a familiar beam or truss design and is not illustrated here for simplicity.

Pattern: Second Hexagonal Honeycomb

FIG. 36 illustrates three distinct types of polygonal rings, in accordance with yet another embodiment of the present invention, the second hexagonal honeycomb. Six elastic sheets, or six elastic multi-layered sheet, or six elastic woven sheets or six elastic sheets of some other composite material, are connected continuously along their edges to form a hexagonal tube. Two distinct types of hexagonal tubes, defined here as a Type C hexagonal tube 49 and Type E hexagonal tube 50 are created by different application of the first force 37c, creating a series of wave undulations along their longitudinal axes. Because these hexagonal tubes are pre-stressed and restrained as described above and as shown in FIGS. 31A-G, they maintain a series of wave undulations along their longitudinal axes. An addition third hexagonal tube, defined here as a Type D hexagonal tube 51 is formed as above except that one side of the tube is comprised of a rigid material, which acts as a twelfth restraining component. Each hexagonal tube takes the form of a hexagon in cross-section.

FIG. 37 illustrates how a hexagonal honeycomb is formed by a plurality of Type C hexagonal tubes 49, a plurality of Type D hexagonal tubes 50 and a plurality of Type E hexagonal tubes 51, in accordance with this embodiment of the present invention.

The Type C hexagonal tube 49 includes six fronds 52 connected along their edges. Each frond undulates in a wave and grows wider and narrower in synchronicity with the other fronds of the Type C hexagonal tube 49, thereby creating a series of wave undulations along the length of the Type C hexagonal tube 49. The force of fluid flowing through the Type C hexagonal tube 49 causes these wave undulations to travel along the length of the Type C hexagonal tube 49 in the direction of the fluid flow. A cross-section cut through this Type C hexagonal tube 49 takes the form of an equilateral hexagon, whose sides lengthen and shorten in synchronicity with each other as the diameter of the hexagon expands and contracts during each cycle of operation.

The Type D hexagonal tube 50 takes the cross-sectional form of a hexagon having one side 53 which remains constant in length during operation, but is varied in position, and is connected to the corners of two Type C hexagonal tubes 49. The Type D hexagonal tube 50 includes a seventh restraining component from the restraining components in the form of its one non-elastic side 54. The non-elastic side 54 of the Type D hexagonal tube hexagon is constant in length and fixed in position during operation, and is shared with an adjacent Type D hexagonal tube 50. Two sides 55 of the Type D hexagonal tube hexagon vary in length during operation and are shared with two adjacent Type E hexagonal tube 51. The other two sides 56 of the Type D hexagonal tube hexagon vary in length during operation and are shared with two adjacent Type C hexagonal tubes 49.

The Type E hexagonal tube 51 takes the cross-sectional form of a hexagon having two sides 57 of varying lengths during operation that are shared with two adjacent Type C hexagonal tubes 49. The other four sides 58 of the Type E hexagonal tube hexagon are of varying length during operation and are shared with four Type D hexagonal tubes 50.

The wave undulations of each Type C hexagonal tube 49 are out-of-phase with the wave undulations of the four closest adjacent Type C hexagonal tubes 49, being separated from these adjacent Type C hexagonal tubes 49 by Type D hexagonal tubes 50 and Type E hexagonal tubes 51, as shown in FIG. 37.

Further, a thirteenth restraining component, the non-elastic side 54 of the Type D hexagonal tube 50, prevents the tubes from lengthening to their unstressed non-undulating state. The side 54 is capable of withstanding high tension loads without lengthening. Principle electrical conduits associated with the transfer of harnessed electricity pass along or through the side 54 of the Type D hexagonal tube 50.

FIGS. 38-39 illustrate another embodiment of the present invention, which is an adaptation of the second hexagonal honeycomb embodiment. The Type C hexagonal tubes 49 are open at both ends allowing fluid to flow through, while the Type D hexagonal tubes 50 and the Type E hexagonal tubes 51 are closed. The Type D hexagonal tubes 50 and the Type E hexagonal tubes 51 may be closed by a plurality of elastic plates 59a spaced along the longitudinal axis of the hexagonal tubes.

FIG. 40 illustrates how the honeycomb is restrained externally by a fourteenth restraining component in the form of a rigid outer-casing 47a, which encloses the hexagonal tubes. The outermost hexagonal tubes of this hexagonal honeycomb embodiment are fixed to the rigid outer-casing 47*a* with flexible strips 47*b*. Depending on the material strengths, the fluid flow speed and other parameters, a secondary supporting frame structure is affixed to the rigid outer-casing 47*a* at the upstream-end, and is also affixed to the sides 54 of the Type D polygonal rings 50 at the upstream-end, thereby transferring loads from the sides 54 to the rigid outer-casing 47*a*. This secondary supporting structure would be of a familiar beam or truss design and is not illustrated here for simplicity.

Pattern: Concentric Rings

In accordance with still another embodiment of the present invention, a plurality of concentric tubes is coupled to internal and external restraining components. FIG. 41 illustrates principal components of this embodiment, defined as rigid tube 60, radial membranes 61, small hollow tubes 63, and a plurality of concentric tubes 62, one within the other take the form in cross-section of concentric rings. The rigid tube 60 is a fifteenth restraining component, the radial membranes 61 are a sixteenth restraining component, and the small hollow tubes 63 are a seventeenth restraining component, in accordance with the present invention.

A force 37*c* as described above is applied to the concentric tubes 62 in a manner so as to form a controlled series of bulge undulations along the lengths of the concentric tubes 62. The diameter of these concentric tubes 62 is therefore larger at the bulges. In this stressed state, the radial membranes are mechanically coupled to each concentric tube 62 continuously along a tangent line of each concentric tube 62. The radial membranes 61 are mechanically coupled along their outer edges and on their longitudinal axis to the restraining component of the rigid tube 60

FIGS. 42-43 illustrate a longitudinal section cut through the concentric ring embodiment. The diameters of the concentric tubes 62 vary along the lengths of each concentric tube 62 in a periodic manner, such that the longitudinal section presents sinusoidal wave undulations.

FIG. 44 illustrates how the restraining components restrain the concentric tubes 62, in accordance with an embodiment of the present invention. The restraining components further include a plurality of hollow tubes 63 attached to a secondary supporting frame 64 which is itself attached to the rigid tube 60. These hollow tubes 63 are fixed to radial membranes 61, which are themselves fixed to the concentric tubes 62. These hollow tubes 63 are capable of withstanding high tension strains without deformation. Therefore, these hollow tubes 63 maintain the approximate positions of the concentric tubes 62 under the force of flowing fluid.

As described above, the concentric tubes are pre-stressed from their relaxed state so as to form wave undulations along their lengths. The hollow tubes 63 and radial membranes 61 prevent the polygonal rings from lengthening and returning to their unstressed, relaxed state. The hollow tubes 63 also provide a conduit for electrical wiring associated with retrieval of harnessed electricity.

The radial membranes 61 are elastic in a direction perpendicular to the faces of attached polygonal rings. The radial membranes 61 are non-elastic in the direction parallel to the longitudinal axis of the concentric tubes 62. Therefore, the radial membranes 61 are able to receive tensile loads. This property of the radial membranes 61 can be achieved in a number of ways. For example, non-elastic cables or strands running parallel to the longitudinal axis may be embedded within the radial membranes 61.

The concentric tubes 62 can be configured in various ways. FIGS. 45-50 illustrate longitudinal sections cut through the concentric tubes 62, in accordance with various embodiments of the present invention. With reference to FIG. 45, the wave undulations of each concentric tube 62 are out-of-phase with the adjacent concentric tube 62 within it and surrounding it.

With reference to FIG. 46, each concentric tube 62 is in-phase with a first adjacent concentric tube 62 and is out-of-phase with a second adjacent concentric tube 62. The space between the two in-phase concentric tubes is open to the flow of the fluid, while the space between the two out-of-phase concentric tubes is closed. The space between the two out-of-phase concentric tubes may be closed with an elastic plate 65, such that the fluid passes only between the two in-phase concentric tubes. Alternatively, the space between the two out-of-phase concentric tubes may be closed with elastic plates. These two in-phase concentric tubes 62 are arranged close to each together, thereby forcing the fluid to act more directly upon the concentric tubes 62.

With reference to FIG. 47, the concentric tubes 62 are in-phase with each other. In such a case, the radial membrane alone acts as the restraining component, maintaining the occurrence of the wave undulations in the polygonal rings. The central concentric tube 62 is closed with an elastic plate 65. The space between the outer-most concentric tube 62 and the rigid tube 60 is also closed.

With reference to FIG. 48, each concentric tube 62 is one-half-out-of-phase with the adjacent concentric tubes 62 within it and surrounding it.

With reference to FIG. 49, each concentric tube 62 is one-half-out-of-phase with the adjacent concentric tubes 62 within it and surrounding it, while wave undulations of a first half of each concentric tube 62 are one-half-out-of-phase with wave undulations of a second half of the concentric tube 62.

With reference to FIG. 50, each concentric tube 62 is in-phase with adjacent polygonal rings within it and surrounding it, while wave undulations of a first half of concentric tubes 62 are one-half-out-of-phase with wave undulations of a second half of concentric tube 62.

In accordance with another embodiment of the present invention, the concentric tubes 62 are configured in a way that a first point on the section cut of a concentric tube 62 is out-of-phase with a second point 180 degrees from the first point within the section cut. In such a case, the wave undulations along the polygonal ring take the form of a spiral traveling along the length of the concentric tube 62.

The concentric rings 62 are suitable for an application where the flowing fluid is restricted, such as in a pipe or tunnel. The concentric ring embodiments are also suitable for a dammed hydro-electric installation.

Embodiments of the present invention that do not utilize mechanical action to rotate an axle do not specify in detail how electrical energy is harnessed and which parts components of these embodiments generate electrical energy under operation. Electrical energy may be extracted from any component of the embodiments which is flexed, stretched, compressed or twisted during operation of the mechanism, thereby creating physical strains within the material of the mechanism. Embodiments of the present invention cover the use of any materials which may be employed, existing or to be discovered or invented, that generate electrical energy when flexed, stretched, compressed or twisted, or otherwise receive internal material strains, during the operations described herein.

There has thus been shown and described novel mechanisms for extracting power from a moving fluid, with undulating sheets of material exhibiting an electrical response to physical strains, and undulating sheets coupled to a mechanical device that turns an electromagnetic dynamo or other output device, and which fulfill all the objects and advantages sought therefore. Many changes, modifications, variations and other uses and applications of the subject invention will, however, become apparent to those skilled in the art after considering these specifications and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A power extraction apparatus for extracting power from a flowing fluid, comprising:
   a base member fixed relative to the flowing fluid;
   a flexible article connected to the base member that is disposed in contact with the flowing fluid, having at least one contact surface permanently configured with a persistently maintained deformation projecting transverse to a longitudinal axis of the flexible article, the longitudinal axis being oriented substantially parallel to a primary flow direction of the flowing fluid, wherein the at least one persistently maintained deformation is maintained regardless of the flowing fluid and dynamically undulates in response to forces imposed by the flowing fluid; and
   an undulating motion power extraction component coupled to undulations of the at least one persistent deformation to extract power therefrom.

2. The apparatus of claim 1, wherein the at least one persistent deformation extends longitudinally along the longitudinal axis of the flexible article.

3. The apparatus of claim 1, further comprising:
   at least one deformation retaining component connected to the flexible article, wherein the at least one persistent deformation is maintained by the at least one deformation retaining component.

4. The apparatus of claim 3, wherein the flexible article comprises a ribbon, the deformation retaining component comprises a crenated strip having a straight edge and an undulating edge, and
   wherein the ribbon is connected along one edge to the undulating edge of the crenated strip.

5. The apparatus of claim 4, wherein the deformation retaining component further comprises:
   a support member connected to the straight edge of the crenated strip, wherein the support member exhibits at least one of rigidity and tensility.

6. The apparatus of claim 4, further comprising a second crenated strip having a second straight edge and a second undulating edge and connected to a second edge of the ribbon along the second undulating edge.

7. The apparatus of claim 1, wherein the flexible article comprises a first tube, and the at least one persistent deformation comprises a first persistent bulge in a cross-section of the first tube.

8. The apparatus of claim 7, further comprising
   at least one deformation retaining component connected to the first tube, wherein the first persistent bulge is maintained by the at least one deformation retaining component.

9. The apparatus of claim 7, further comprising a second tube situated substantially concentric with the first tube and having at least one second persistent deformation comprising a second persistent bulge in a cross-section of the second tube.

10. The apparatus of claim 9, wherein the first tube and the second tube are each attached to a support frame.

11. The apparatus of claim 9, wherein undulations of the first persistent bulge in the first tube are substantially in phase with undulations of the second persistent bulge in the second tube.

12. The apparatus of claim 9, wherein undulations of the first persistent bulge in the first tube are substantially out of phase with undulations of the second persistent bulge in the second tube.

13. The apparatus of claim 7, further comprising:
   a second tube connected along its side with a side of the first tube and having at least one second persistent deformation comprising a second persistent bulge in a cross-section of the second tube.

14. The apparatus of claim 1, wherein the undulating motion power extraction component is an electrical power extraction component.

15. The apparatus of claim 14, wherein the flexible article comprises electroactive material, and wherein the electrical power extraction component comprises electrodes electrically coupled to the electroactive material to withdraw the electrical power from the undulations of the electroactive material.

16. The apparatus of claim 15, wherein the electrodes extract electrical power associated with strains of the electroactive material caused by excitation of the undulations.

17. The apparatus of claim 16, wherein the electroactive material comprises electroactive polymers.

18. The apparatus of claim 1, wherein the undulating motion power extraction component is a mechanical power extraction component.

19. The apparatus of claim 18, wherein the mechanical power extraction component comprises an electromechanical generator mechanically coupled to the flexible article to convert the mechanical power associated with the undulations to electrical power.

20. The apparatus of claim 18, wherein the mechanical power extraction component comprises a ratcheted axle coupled to undulations of the at least one persistent deformation.

21. The apparatus of claim 18, wherein the mechanical power extraction component is a pump.

22. A system for extracting power from a flowing fluid, comprising:
   means for converting motion of the flowing fluid into undulations of at least one persistently maintained deformation of a contact surface of a flexible article disposed in contact with the flowing fluid, wherein the at least one persistently maintained deformation is maintained regardless of the flowing fluid; and
   means for extracting power from the undulations of the at least one persistent deformation.

23. A method for extracting power from a flowing fluid, comprising:
   forming at least one persistently maintained deformation in a flexible article;
   coupling the at least one persistently maintained deformation to at least one undulating motion power extraction component;
   disposing the flexible article in a flowing fluid such that the at least persistently maintained deformation has a projection transverse to a primary flow direction of the flowing fluid; and extracting power from undulations of the at least one persistent deformation caused by the flowing fluid using the at least one undulating motion power extraction component.

24. A method of forming an apparatus for extracting power from a flowing fluid, comprising:

forming a deformation in a flexible article, wherein the deformation is excitable by a flowing fluid in contact with the flexible article to undulate in response to forces imposed by the flowing fluid;

securing the deformation with a first deformation retaining component to create a persistently maintained deformation ; and coupling an undulating motion power extraction component to the flexible article, wherein the undulating motion power extraction component is configured to extract power from dynamic undulations of the persistently maintained deformation.

\* \* \* \* \*